US008460112B2

(12) United States Patent
Masuda et al.

(10) Patent No.: US 8,460,112 B2
(45) Date of Patent: Jun. 11, 2013

(54) COMPUTER-READABLE STORAGE MEDIUM, INFORMATION PROCESSING APPARATUS, INFORMATION PROCESSING SYSTEM, AND INFORMATION PROCESSING METHOD

(75) Inventors: Junichi Masuda, Setagaya-ku (JP); Katsumi Ohno, Setagaya-ku (JP)

(73) Assignees: Nintendo Co., Ltd., Kyoto (JP); Game Freak, Inc., Tokyo (JP)

( * ) Notice: Subject to any disclaimer, the term of this patent is extended or adjusted under 35 U.S.C. 154(b) by 33 days.

(21) Appl. No.: 13/022,355

(22) Filed: Feb. 7, 2011

(65) Prior Publication Data
US 2012/0010000 A1 Jan. 12, 2012

(30) Foreign Application Priority Data

Jul. 7, 2010 (JP) ................................. 2010-155190
Sep. 15, 2010 (JP) ................................. 2010-207068

(51) Int. Cl.
*A63F 9/24* (2006.01)
(52) U.S. Cl.
USPC ................................. 463/42; 463/39; 463/40
(58) Field of Classification Search
USPC .................................................... 463/39–44
See application file for complete search history.

(56) References Cited

FOREIGN PATENT DOCUMENTS

| EP | 1 107 512 | 6/2001 |
|---|---|---|
| EP | 1 617 604 | 1/2006 |
| EP | 1 720 316 | 11/2006 |
| JP | 2005-28103 | 2/2005 |
| JP | 2010-55537 | 3/2010 |

OTHER PUBLICATIONS

Wireless Networking Configuration Guide, http://www.jmu.edu/computing/desktop/wireless/wm_library/OfficialWireless-WindowsXP.pdf, Oct. 7, 2009, pp. 1-3.*
Internet Archive Wayback Machine, Screenshot, created May 4, 2012, referencing Wireless Networking Configuartion Guide, Oct. 7, 2009.*

* cited by examiner

*Primary Examiner* — Omkar Deodhar
(74) *Attorney, Agent, or Firm* — Nixon & Vanderhye PC

(57) ABSTRACT

A game apparatus constantly broadcasts beacons at predetermined intervals by means of a local communication module during game processing being executed. The beacons include various pieces of information such as information relating to the player, information indicating a game status, and messages. The game apparatus receives beacons from one or more other game apparatuses present in an area near the game apparatus, and displays profiles of the players of the other game apparatuses, the game statuses of the other game apparatuses, or the like, based on the various pieces of information included in the beacons.

17 Claims, 38 Drawing Sheets

F I G. 3
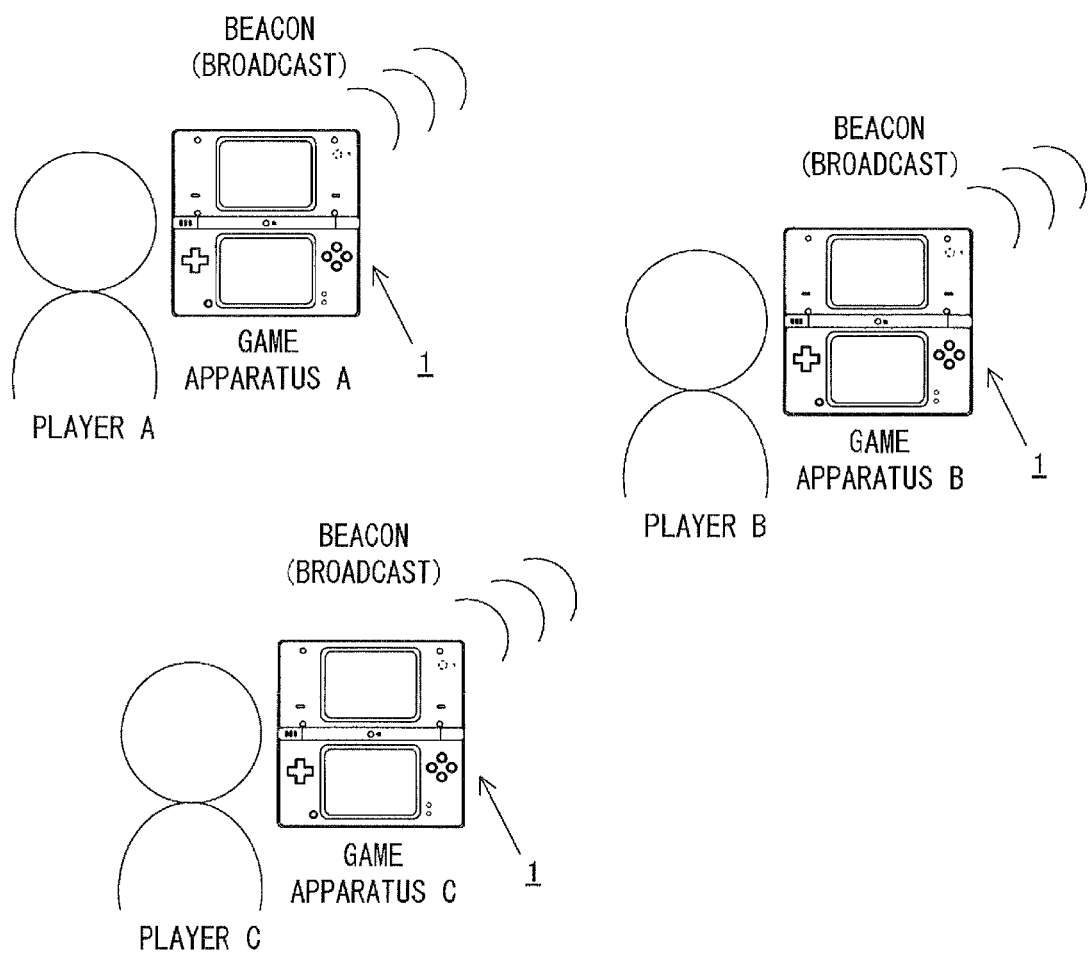

FIG. 7

| STATUS ICON | MESSAGE | DISPLAY TIMING |
|---|---|---|
| :) | [PLAYER NAME] IS NEARBY | WHEN INFORMATION ON OTHER PLAYER IS ADDED TO OTHER PLAYER LIST SCREEN |
| ✡ | [PLAYER NAME] HAS STARTED A BATTLE WITH A WILD [MONSTER NAME]! | WHEN OTHER PLAYER HAS STARTED A BATTLE WITH A WILD MONSTER |
| Win! | [PLAYER NAME] HAS WON A BATTLE WITH A WILD [MONSTER NAME]! | WHEN OTHER PLAYER HAS WON A BATTLE WITH A WILD MONSTER |
| ◎ | [PLAYER NAME] HAS CAUGHT A WILD [MONSTER NAME]! | WHEN OTHER PLAYER HAS CAUGHT A WILD MONSTER |
| Lv↑ | LEVEL OF [MONSTER NAME] ACCOMPANYING [PLAYER NAME] HAS INCREASED! | WHEN LEVEL OF MONSTER ACCOMPANYING OTHER PLAYER HAS INCREASED |
| ▷ | DO YOU USE [SPECIAL POWER NAME] ACTIVATED BY [PLAYER NAME]? | WHEN OTHER PLAYER HAS ACTIVATED SPECIAL POWER |
| ! | PLAY TIME OF [PLAYER NAME] EXCEEDS [PLAY TIME]! | WHEN PLAY TIME OF OTHER PLAYER EXCEEDS REQUIRED TIME (10 HOURS, 30 HOURS, 50 HOURS, 100 HOURS) |
| :) | [PLAYER NAME] THANKS YOU! | WHEN APPRECIATION IS CONVEYED BY OTHER PLAYER |
| >< | STRENGTH OF [MONSTER NAME] ACCOMPANYING [PLAYER NAME] BECOMES WEAK! | WHEN STRENGTH OF MONSTER ACCOMPANYING OTHER PLAYER IS DECREASED TO HALF OR LESS OF THE MAXIMUM POWER |
| :) | [PLAYER NAME] SAID "[QUICK WORD MESSAGE]!" | WHEN QUICK WORD MESSAGE IS RECEIVED FROM OTHER PLAYER |

| SPECIAL POWER NAME | EFFECT | EFFECTIVE TIME |
|---|---|---|
| STRENGTH RECOVERING POWER | STRENGTH OF MONSTER RECOVERS | SECOND |
| BARGAIN POWER | ITEMS IN SHOP ARE SOLD AT HALF PRICES | 3 MINUTES |
| EXPERIENCE POINTS GAINING POWER | OBTAINED EXPERIENCE POINTS IS DOUBLED | 3 MINUTES |
| ⋮ | ⋮ | ⋮ |

F I G. 2 2
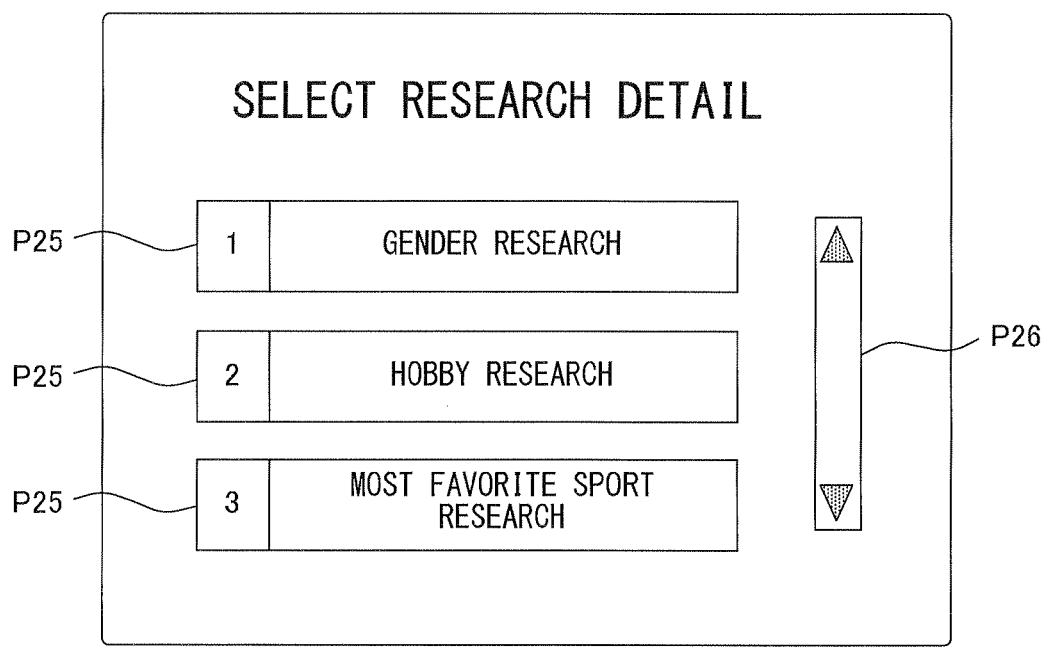

FIG. 24
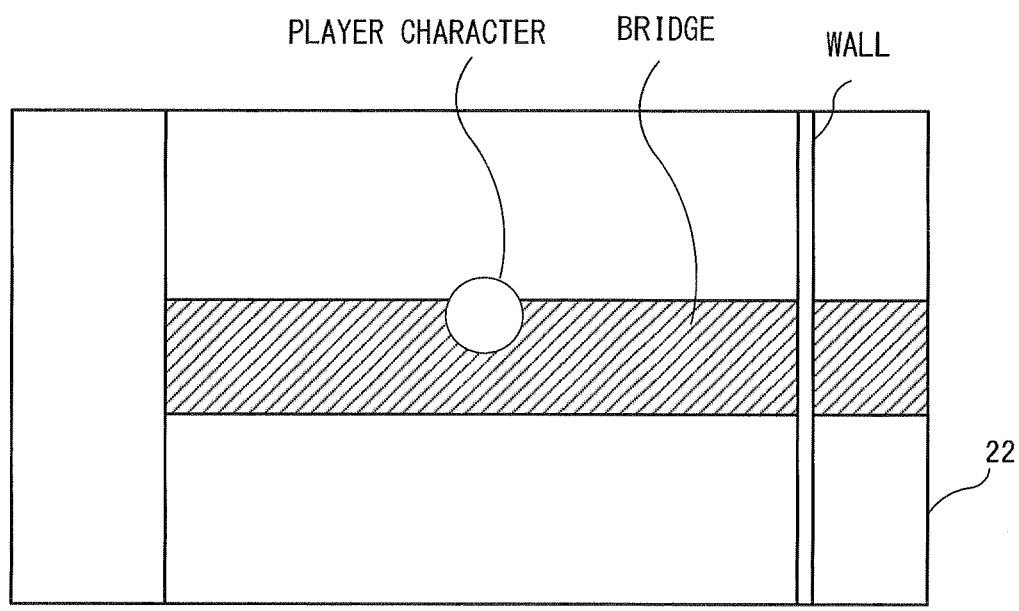
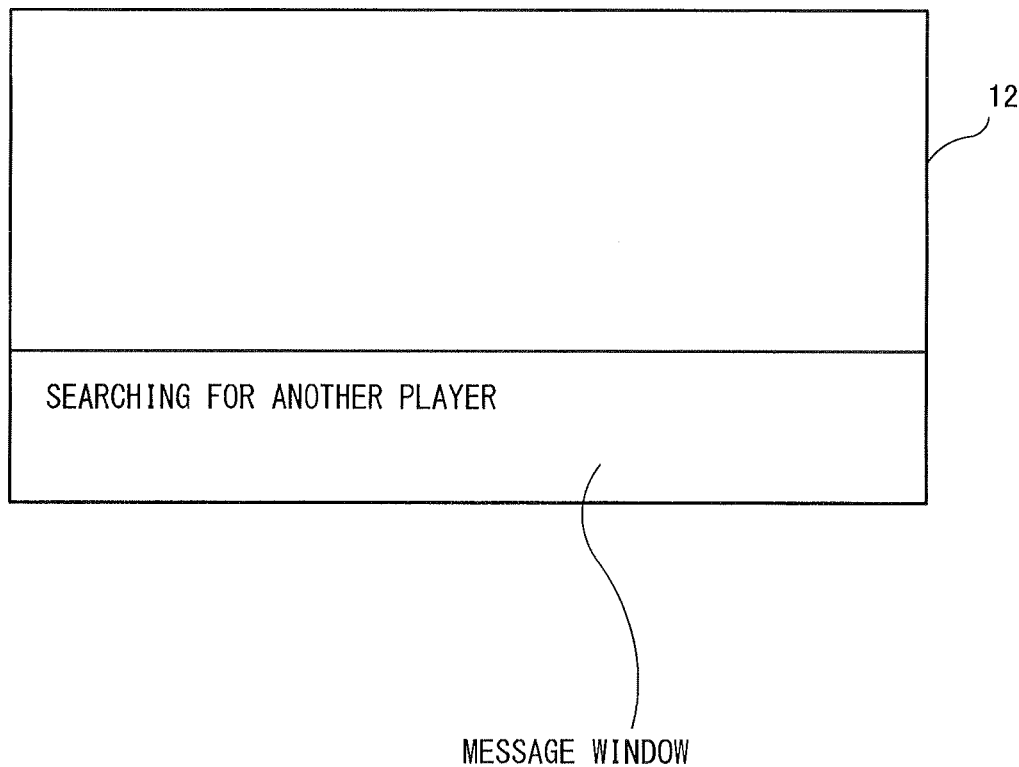

FIG. 29

COMMON TRANSMISSION DATA
- GAME SERVICE ID
- NUMBER OF CURRENT PARTICIPANTS
- MAXIMUM NUMBER OF PARTICIPANTS
- ERROR STATUS
- BEACON TYPE
- GAME APPARATUS TYPE
- ⋮

INDIVIDUAL TRANSMISSION DATA
- ACTIVATING SPECIAL POWER ID
- GENDER
- NUMBER OF PEOPLE HAVING PASSED
- CURRENT POSITION
- NUMBER OF TIMES OF BEING APPRECIATED
- TRANSMISSION NUMBER
- RESEARCHER RANK
- COLOR OF GAME APPARATUS
- PLAY TIME
- PLAYER ID
- PLAYER NAME
- MONSTER NUMBER
- PROFILE INFORMATION
- QUESTIONNAIRE ANSWER
- ⋮

310

COMPUTER-READABLE STORAGE MEDIUM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-207068, filed Sep. 15, 2010, is incorporated herein by reference.

BACKGROUND

1. Field

Example embodiments of the present invention relate to a computer-readable storage medium, an information processing apparatus, an information processing system, and an information processing method, and more particularly relates to a computer-readable storage medium, an information processing apparatus, an information processing system, and an information processing method which employ a wireless communication function.

2. Description of the Background Art

Conventionally known are game apparatuses that communicate by means of wireless communication with other terminals which are present in a communicable range.

For example, Japanese Laid-Open Patent Publication No. 2005-28103 (Hereinafter referred to as Patent Literature 1) discloses a technique in which game apparatuses, which are present within a communicable range, transmit exchange conditions for mutually exchanging game data when a communication state is established therebetween and exchange mutually the game data when the exchange conditions meet each other. Accordingly, game data can be exchanged regardless of who performs such exchange and where such exchange takes place.

However, in Patent Literature 1, a player can only exchange game data with another player who satisfies exchange conditions. That is, it is not possible for the player to successively acquire the state of the other player.

SUMMARY

Therefore, example embodiments of the present invention provide a computer-readable storage medium, an information processing apparatus, an information processing system, and an information processing method which allows successive acquisition of information on another information processing apparatus present within a communicable range.

Example embodiments of the present invention have the following features to attain the object mentioned above.

An aspect of example embodiments of the present invention is a computer-readable storage medium having stored therein an information processing program causing a computer of an information processing apparatus having a wireless communication function to function as application execution means, transmission means, reception attempting means, and output means. The application execution means executes an application. The transmission means repeatedly transmits, while the application is being executed by the application execution means, data relating to the execution to other unspecified information processing apparatuses, by using the wireless communication function. The reception attempting means repeatedly attempts, while the application is being executed by the application execution means, reception of data from the other unspecified information processing apparatuses, by using the wireless communication function. The output means outputs, upon reception of the data from the other information processing apparatuses by the reception attempting means, the data sequentially.

With this configuration, an information processing apparatus can successively acquire information on other information processing apparatuses that are present in a communicable range with the information processing apparatus, and thus, the user of the information processing apparatus can recognize in real time information on the other information processing apparatus.

As a further aspect, the information processing program further causes the computer of the information processing apparatus to function as accumulation means for accumulating data from the other information processing apparatuses received by the reception attempting means, and the output means may output the data accumulated in the accumulation means in chronological order of reception of the data.

With this configuration, a game apparatus can successively accumulate and output data received from the other information processing apparatuses, and thus notify the user of sufficient information efficiently.

As a further aspect, the information processing program further causes the computer of the information processing apparatus to function as execution status determination means for determining whether a status of the execution by the application execution means satisfies one or more predetermined conditions. The transmission means may transmit, when the execution status determination means determines that the predetermined conditions are satisfied, data indicating the status of the execution. The output means may output the data indicating the status of the execution.

With this configuration, an information processing apparatus can notify other users that the status of the execution of an application on the information processing apparatus has satisfied a predetermined condition, and thus, the player can notify the other users of the status of the execution as appropriate.

As a further aspect, the transmission means may transmit the data indicating the status of the execution a plurality of numbers of times when the execution status determination means determines that the predetermined conditions are satisfied. The reception attempting means may attempt the reception of data a plurality of numbers of times, during a period when transmission by the transmission means is not being performed.

With this configuration, an information processing apparatus can securely notify the other users that the status of execution of an application on the information processing apparatus has satisfied a predetermined condition, and in addition, the player of the information processing apparatus can also securely receive such notification from the other users.

As a further aspect, when transmitting the data indicating the status of the execution the plurality of number of times, the transmission means may transmit the data by adding thereto common identification information each time, of the plurality of numbers of times, the data is transmitted. The information processing program may further cause the computer to function as: determination means for determining, when the reception attempting means has received a plurality of pieces of data from the other information processing apparatuses, whether identification information added to the plurality of pieces of data is identical; and cancellation means for cancelling the received plurality of pieces of data depending on a result of the determination by the determination means.

With this configuration, when the status of execution of an application on an information processing apparatus has satisfied, it is possible to prevent the other users from being notified that the predetermined condition has been satisfied a plurality of numbers of times.

As a further aspect, the one or more predetermined conditions used by the execution status determination means may comprise a plurality of conditions having assigned thereto priorities different from one another. The transmission means may transmit a piece of the data indicating the status of the execution which satisfies one of the plurality of the conditions having a relatively high priority more preferentially than another piece of the data which satisfies another one of the plurality of the conditions having a relatively low priority.

With this configuration, it is possible to notify the other users of information having a higher priority preferentially.

As a further aspect, the information processing program further causes the computer of the information processing apparatus to function as acceptance means for accepting an input by a user. The transmission means may transmit data relating to a change added to the application, based on the input accepted by the acceptance means. When the reception attempting means has received the data from the other information processing apparatuses, the application execution means may add to the application a change corresponding to the received data.

With this configuration, in accordance with the operation by a user of an information processing apparatus, it is possible to add a change to an application executed on another information processing apparatus that is present in communicable range with the information processing apparatus. For example, it is possible provide a game of helping the other user's play.

As a further aspect, the information processing program further causes the computer of the information processing apparatus to function as: collection means for collecting sum of the data from the other information processing apparatuses received by the reception attempting means until the sum of the data satisfies a predetermined condition; and change adding means for adding a change to the application executed by the application execution means when the sum collected by the collection means satisfies the predetermined condition.

With this configuration, an information processing apparatus collects the sum of pieces of information from a plurality of other information processing apparatuses present in a communicable range with the information processing apparatus until the sum reaches a predetermined condition, and when the sum has reached the predetermined condition, the information processing apparatus can add a change to an application thereon.

As a further aspect, the predetermined condition may represent the number of the other information processing apparatuses from which the data has been received. The change adding means may add the change to the application when the number of the other information processing apparatuses reaches a predetermined number.

With this configuration, the sum of pieces of information is collected from the set number of people, and thus such collection can be easily performed in a circumstance communication with many users is allowable.

As a further aspect, the predetermined condition may represent time. The change adding means may add the change to the application when the time reaches a predetermined value.

With this configuration, the sum of pieces of information is collected within a set period of time, and thus such collection can be performed even if it is difficult for a user to communication with many other users.

As a further aspect, the information processing program further causes the computer of the information processing apparatus to function as condition selection means for causing a user to select either a first condition indicating the number of the other information processing apparatuses from which the data has been received or a second condition indicating a duration. The collection means may collect the sum until the sum reaches the first condition or the second condition selected by the condition selection means.

With this configuration, a user can select the condition to complete the collection depending on the surrounding circumstance, and thus it is possible for a user to perform the collection regardless of whether the circumstance allows the user to communicate with many other users.

As a further aspect, the information processing apparatus may be a hand-held terminal. The wireless communication function may be a short-distance wireless communication.

With this configuration, it is possible to allow a user of the information processing apparatus who carries the information processing apparatus when s/he travel outside to communicate with other information processing apparatus carried by people passing by.

A second aspect of example embodiments of the present invention is an information processing apparatus having a wireless communication function, and the information processing apparatus comprises: application execution means, transmission means, reception attempting means, and output means. The application execution means executes an application. The transmission means repeatedly transmits, while the application is being executed by the application execution means, data relating to the execution to other unspecified information processing apparatuses, by using the wireless communication function. The reception attempting means repeatedly attempts, while the application is being executed by the application execution means, reception of data from the other unspecified information processing apparatuses, by using the wireless communication function. The output means outputs, upon reception of the data from the other information processing apparatuses by the reception attempting means, the data sequentially.

A third aspect of example embodiments of the present invention is an information processing system having a wireless communication function, and the information processing system comprises: application execution means, transmission means, reception attempting means, and output means. The application execution means executes an application. The transmission means repeatedly transmits, while the application is being executed by the application execution means, data relating to the execution to other unspecified information processing apparatuses, by using the wireless communication function. The reception attempting means repeatedly attempts, while the application is being executed by the application execution means, reception of data from the other unspecified information processing apparatuses, by using the wireless communication function. The output means outputs, upon reception of the data from the other information processing apparatuses by the reception attempting means, the data sequentially.

A fourth aspect of example embodiments of the present invention is an information processing method using a wireless communication function, and the method comprises: an application executing step, a transmission step, a reception attempting step, and an output step. The application executing step executes an application. The transmission step repeatedly transmits, while the application is being executed in the application executing step, data relating to the execution to other unspecified information processing apparatuses, by using the wireless communication function. The reception attempting step repeatedly attempts, while the application is being executed in the application executing step, reception of data from the other unspecified information processing apparatuses, by using the wireless communication function. The output step outputs, upon reception of the data from the other information processing apparatuses in the reception attempting step, the data sequentially.

According to example embodiments of the present invention, it is possible to successively acquire information on another information processing apparatus present within a communicable range.

These and other objects, features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 3 is a diagram illustrating a plurality of game apparatuses operated by the respective players;

FIG. 7 shows examples of status icons and messages;

FIG. 22 illustrates an example of an image displayed on the lower LCD;

FIG. 24 illustrates an example of a game screen assumed in this embodiment;

FIG. 29 shows in detail beacon data;

DESCRIPTION OF THE EXAMPLE EMBODIMENTS

Hereinafter, an embodiment of the present invention will be described with reference to the drawings. It should be noted that the present invention is not limited to this embodiment.

<Hardware Configuration>

Figure 1:
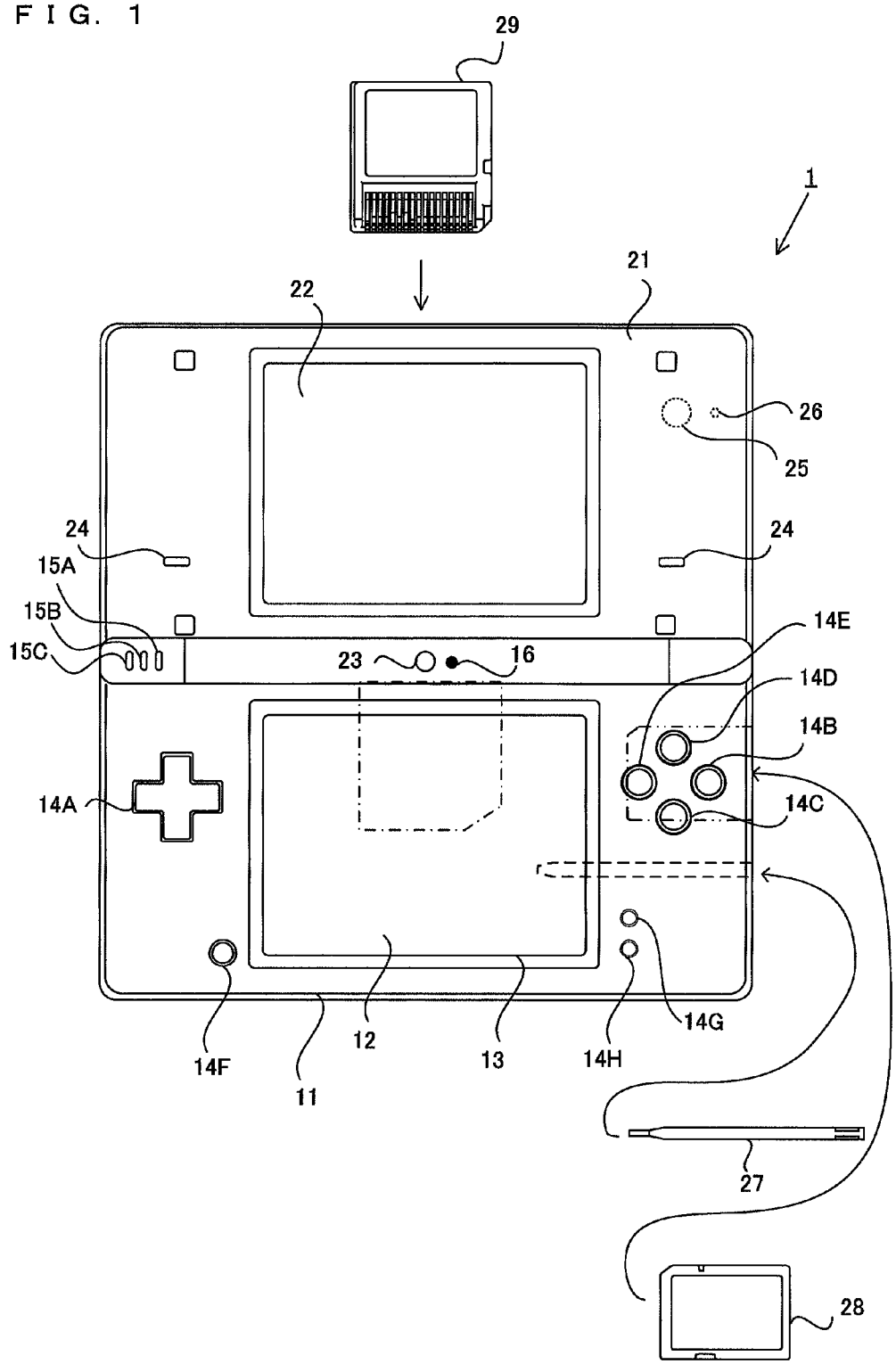
FIG. 1 is an external view of a game apparatus 1 according to an embodiment of the present invention.

In FIG. 1, a game apparatus 1 is a foldable hand-held game apparatus in an opened status. The game apparatus 1 is configured to have such a size as to be held by a user with both hands or one hand in the opened state.

The game apparatus 1 includes a lower housing 11 and an upper housing 21. The lower housing 11 and the upper housing 21 are connected to each other so as to be capable of being opened or closed (foldable). In the example of FIG. 1, the lower housing 11 and the upper housing 21 are each formed in a plate-like shape of a horizontally long rectangle, and foldably connected to each other at long side portions thereof. Usually, the user uses the game apparatus 1 in the opened state. When not using the game apparatus 1, the user keeps the game apparatus 1 in a closed state. In the example shown in FIG. 1, in addition to the closed state and the opened state, the game apparatus 1 is capable of maintaining an angle between the lower housing 11 and the upper housing 21 at any angle ranging between the closed state and the opened state by frictional force generated at a connection portion and the like. In other words, the upper housing 21 can be stationary at any angle with respect to the lower housing 11.

In the lower housing 11, a lower LCD (Liquid Crystal Display) 12 is provided. The lower LCD 12 has a horizontally long shape, and is located such that a long side direction thereof corresponds to a long side direction of the lower housing 11. It should be noted that although an LCD is used as a display device provided in the game apparatus 1 in this embodiment, any other display devices such as a display device using an EL (Electro Luminescence) and the like may be used. In addition, the game apparatus 1 can use a display device of any resolution. Although details will be described below, the lower LCD 12 is used mainly for displaying an image taken by an inner camera 23 or an outer camera 25 in real time.

In the lower housing 11, operation buttons 14A to 14K and a touch panel 13 are provided as input devices. As shown in FIG. 1, among the operation buttons 14A to 14K, the direction input button 14A, the operation button 14B, the operation button 14C, the operation button 14D, the operation button 14E, the power button 14F, the start button 14G, and the select button 14H are provided on an inner main surface of the lower housing 11 which is located inside when the upper housing 21 and the lower housing 11 are folded. The direction input button 14A is used, for example, for a selection operation and the like. The operation buttons 14B to 14E are used, for example, for a determination operation, a cancellation operation, and the like. The power button 14F is used for turning on or off the power of the game apparatus 1. In the example shown in FIG. 1, the direction input button 14A and the power button 14F are provided on the inner main surface of the lower housing 11 and on one of a left side and a right side (on the left side in FIG. 1) of the lower LCD 12 provided at around the center of the inner main surface of the lower housing 11. Further, the operation buttons 14B to 14E, the start button 14G, and the select button 14H are provided on the inner main surface of the lower housing 11 and on the other of the left side and the right side (on the right side in FIG. 1) of the lower LCD 12. The direction input button 14A, the operation buttons 14B to 14E, the start button 14G, and the select button 14H are used for performing various operations on the game apparatus 1.

It should be noted that the operation buttons 14I to 14K are omitted in FIG. 1. For example, the L button 14I is provided at a left end of an upper surface of the lower housing 11, and the R button 14J is provided at a right end of the upper surface of the lower housing 11. The L button 14I and the R button 14J are used, for example, for performing a photographing instruction operation (shutter operation) on the game apparatus 1. In addition, the volume button 14K is provided on a left side surface of the lower housing 11. The volume button 14K is used for adjusting volume of speakers of the game apparatus 1.

The game apparatus 1 further includes the touch panel 13 as another input device in addition to the operation buttons 14A to 14K. The touch panel 13 is mounted on the lower LCD 12 so as to cover the screen of the lower LCD 12. In this embodiment, the touch panel 13 is, for example, a resistive film type touch panel. However, the touch panel 13 is not limited to the resistive film type, but any press-type touch panel may be used. The touch panel 13 used in this embodiment has the same resolution (detection accuracy) as that of the lower LCD 12. However, the resolution of the touch panel 13 and that of the lower LCD 12 may not necessarily be the same with each other. In a right side surface of the lower housing 11, an insertion opening (indicated by a dashed line in FIG. 1) is provided. The insertion opening is capable of accommodating a stylus pen 27 which is used for performing an operation on the touch panel 13. Although an input onto the touch panel 13 is usually performed using the stylus pen 27, in addition to the stylus pen 27, a finger of the user can be used for operating the touch panel 13.

In the right side surface of the lower housing 11, an insertion opening (indicated by a two-dot chain line in FIG. 1) is formed for accommodating a memory card 28. Inside the insertion opening, a connector (not shown) is provided for electrically connecting the game apparatus 1 to the memory card 28. The memory card 28 is, for example, a Secure Digital (SD) memory card, and detachably mounted on the connector. The memory card 28 is used, for example, for storing an image taken by the game apparatus 1, and loading an image generated by another apparatus into the game apparatus 1.

Further, in the upper surface of the lower housing 11, an insertion opening (indicated by a chain line in FIG. 1) is formed for accommodating a cartridge 29. Inside the insertion opening, a connector (not shown) is provided for electrically connecting the game apparatus 1 to the cartridge 29. The cartridge 29 is a storage medium storing a game program and the like, and detachably mounted in the insertion opening provided in the lower housing 11.

Three LEDs 15A to 15C are mounted on a left side part of the connection portion where the lower housing 11 and the upper housing 21 are connected to each other. The game apparatus 1 is capable of performing wireless communication with another apparatus, and the first LED 15A is lit up while the power of the game apparatus 1 is ON. The second LED 15B is lit up while the game apparatus 1 is being charged. The third LED 15C is lit up while wireless communication is established. Thus, by the three LEDs 15A to 15C, a state of ON/OFF of the power of the game apparatus 1, a state of charge of the game apparatus 1, and a state of communication establishment of the game apparatus 1 can be notified to the user.

Meanwhile, in the upper housing 21, an upper LCD 22 is provided. The upper LCD 22 has a horizontally long shape, and is located such that a long side direction thereof corresponds to a long side direction of the upper housing 21. In a similar manner to that of the lower LCD 12, a display device of another type having any resolution may be used instead of the upper LCD 22. A touch panel may be provided so as to cover the upper LCD 22. On the upper LCD 22, for example, an operation explanation screen for teaching the user roles of the operation buttons 14A to 14K and the touch panel 13 is displayed.

In the upper housing 21, two cameras (the inner camera 23 and the outer camera 25) are provided. As shown in FIG. 1, the inner camera 23 is mounted in an inner main surface in the vicinity of the connection portion of the upper housing 21. On the other hand, the outer camera 25 is mounted in a surface opposite to the inner main surface in which the inner camera 23 is mounted, namely, in an outer main surface of the upper housing 21 (which is the surface located on the outside of the game apparatus 1 in the closed state, and the back surface of the upper housing 21 shown in FIG. 1). In FIG. 1, the outer camera 25 is indicated by a dotted line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. In other words, in this embodiment, the two cameras 23 and 25 are provided such that the imaging directions thereof are opposite to each other. For example, the user can take an image of a view seen from the game apparatus 1 toward the user with the inner camera 23 as well as an image of a view seen from the game apparatus 1 in a direction opposite to the user with the outer camera 25.

In the inner main surface in the vicinity of the connection portion, a microphone (a microphone 42 shown in FIG. 2) is accommodated as a voice input device. In the inner main surface in the vicinity of the connection portion, a microphone hole 16 is formed to allow the microphone 42 to detect sound outside the game apparatus 1. The accommodating position of the microphone 42 and the position of the microphone hole 16 are not necessarily in the connection portion. For example, the microphone 42 may be accommodated in the lower housing 11, and the microphone hole 16 may be formed in the lower housing 11 so as to correspond to the accommodating position of the microphone 42.

In the outer main surface of the upper housing 21, a fourth LED 26 (indicated by a dashed line in FIG. 1) is mounted. The fourth LED 26 is lit up at a time when photographing is performed (when the shutter button is pressed) with the outer camera 25. Further, the fourth LED 26 is lit up while a moving picture is being taken by the outer camera 25. By the fourth LED 26, it is notified to an object person whose image is taken and people around the object person that photographing is performed (being performed) by the game apparatus 1.

Sound holes 24 are formed in the inner main surface of the upper housing 21 and on left and right sides, respectively, of the upper LCD 22 provided at around the center of the inner main surface of the upper housing 21. The speakers are accommodated in the upper housing 21 and at the back of the sound holes 24. The sound holes 24 are for releasing sound from the speakers to the outside of the game apparatus 1 therethrough.

As described above, the inner camera 23 and the outer camera 25 which are components for taking an image, and the upper LCD 22 which is display means for displaying, for example, an operation explanation screen at the time of photographing are provided in the upper housing 21. On the other hand, the input devices for performing an operation input on the game apparatus 1 (the touch panel 13 and the buttons 14A to 14K), and the lower LCD 12 which is display means for displaying the game screen are provided in the lower housing 11. Accordingly, when using the game apparatus 1, the user can hold the lower housing 11 and perform an input on the input device while seeing a taken image (an image taken by one of the cameras) displayed on the lower LCD 12.

Figure 2:
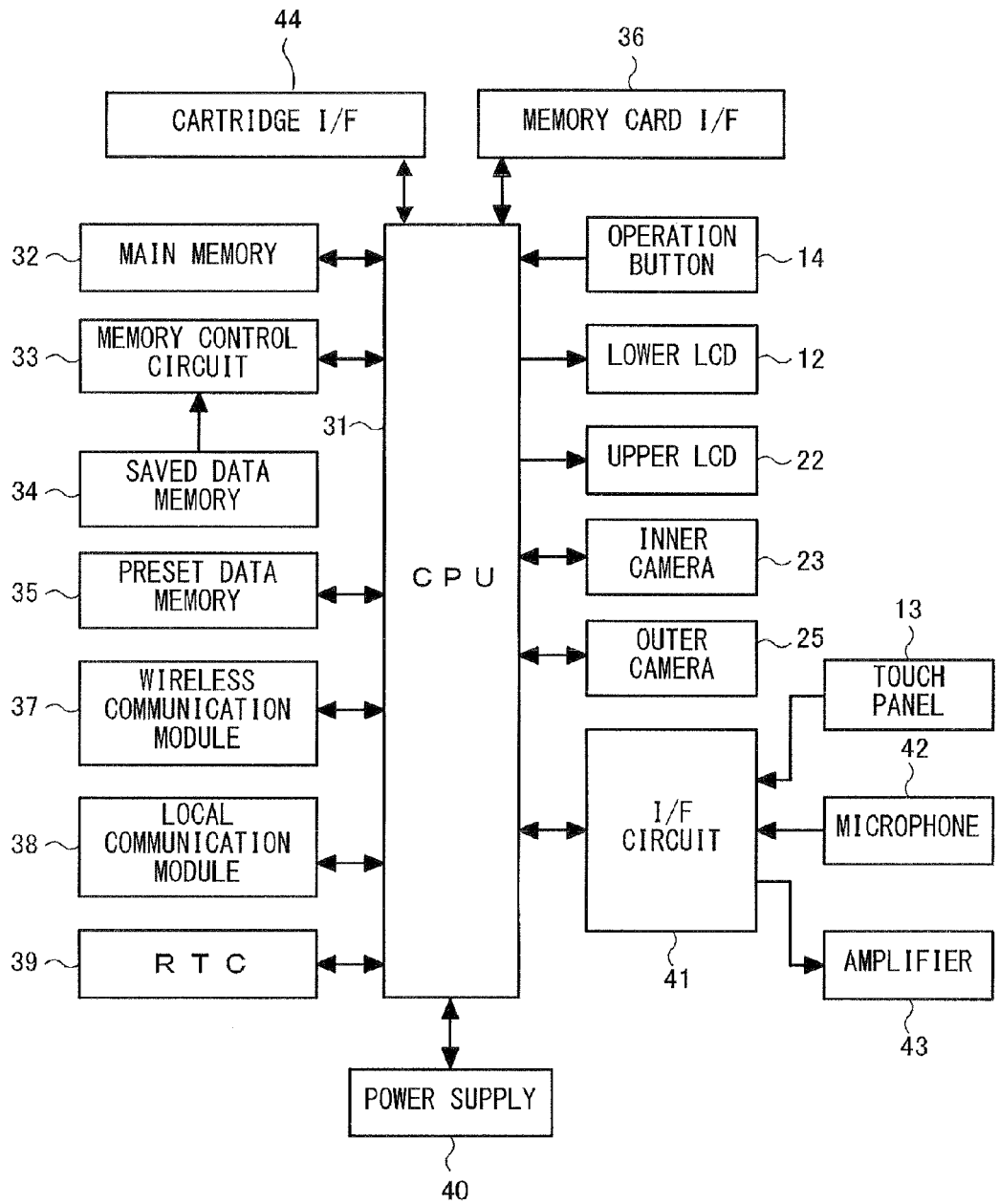
FIG. 2 is a block diagram of the game apparatus 1 according to an embodiment of the present invention.

Now, an internal configuration of the game apparatus 1 is described with reference to FIG. 2. FIG. 2 is a block diagram showing an example of the internal configuration of the game apparatus 1.

As shown in FIG. 2, the game apparatus 1 includes electronic components including a CPU 31, a main memory 32, a memory control circuit 33, a saved data memory 34, a preset data memory 35, a memory card interface (memory card I/F) 36 and a cartridge I/F 44, a wireless communication module 37, a local communication module 38, a real time clock (RTC) 39, a power circuit 40, an interface circuit (I/F circuit) 41, and the like. These electronic components are mounted on an electronic circuit substrate and accommodated in the lower housing 11 (or may be accommodated in the upper housing 21).

The CPU 31 is information processing means for executing a predetermined program. In this embodiment, the predetermined program is stored in a memory (e.g., the saved data memory 34) within the game apparatus 1 or in the memory card 28 and/or the cartridge 29, and the CPU 31 performs below-described game processing by executing the predetermined program. It should be noted that a program executed by the CPU 31 may be stored in advance in a memory within the game apparatus 1, may be obtained from the memory card 28 and/or the cartridge 29, or may be obtained from another apparatus by means of communication with said another apparatus. For example, a program may be obtained by means of download via the Internet from a predetermined server, or may be obtained by downloading a predetermined program stored in a stationary game apparatus through communication therewith.

The main memory 32, the memory control circuit 33, and the preset data memory 35 are connected to the CPU 31. The saved data memory 34 is connected to the memory control circuit 33. The main memory 32 is storage means used as a work area and a buffer area of the CPU 31. In other words, the main memory 32 stores various data used in the game processing, and also stores a program obtained from the outside (the memory cards 28, the cartridge 29, another apparatus, and the like). In this embodiment, for example, a Pseudo-SRAM (PSRAM) is used as the main memory 32. The saved data memory 34 is storage means for storing a program executed by the CPU 31, data of images taken by the inner camera 23 and the outer camera 25, and the like. The saved data memory 34 is constructed of a nonvolatile storage medium, for example, a NAND flash memory, in this embodiment. The memory control circuit 33 is a circuit for controlling reading of data from the saved data memory 34 or writing of data to the saved data memory 34 in accordance with an instruction from the CPU 31. The preset data memory 35 is storage means for storing data (preset data) of various parameters and the like which are set in advance in the game apparatus 1. A flash memory connected to the CPU 31 via a Serial Peripheral Interface (SPI) bus can be used as the preset data memory 35.

The memory card I/F 36 is connected to the CPU 31. The memory card I/F 36 reads data from the memory card 28 mounted on the connector or writes data to the memory card 28 in accordance with an instruction from the CPU 31. In this embodiment, data of images taken by the outer camera 25 is written to the memory card 28, and image data stored in the memory card 28 is read from the memory card 28 to be stored in the saved data memory 34.

The cartridge I/F 44 is connected to the CPU 31. The cartridge I/F 44 reads out data from the cartridge 29 mounted to the connector or writes data to the cartridge 29 in accordance with an instruction from the CPU 31. In this embodiment, an application program executable by the information processing apparatus 10 is read out from the cartridge 29 to be executed by the CPU 31, and data regarding the application program (e.g. saved data of a game and the like) is written to the cartridge 29.

A game program of example embodiments of the present invention may be supplied to a computer system not only through an external storage medium such as the cartridge 29 or the like, but also through a wired or wireless communication line. Further, the game program may be stored in advance in a nonvolatile storage medium mounted in a computer system. Not only the nonvolatile storage medium, but also a CD-ROM, a DVD, or any other analogous optical disc type storage media may be used as an information storage medium having stored therein a game program.

The wireless communication module 37 functions to connect to a wireless LAN device, for example, by a method conformed to the standard of IEEE802.11.b/g. The local communication module 38 functions to wirelessly communicate with a game apparatus of the same type by a predetermined communication method. The wireless communication module 37 and the local communication module 38 are connected to the CPU 31. The CPU 31 is capable of receiving data from and transmitting data to another apparatus via the Internet using the wireless communication module 37, and capable of receiving data from and transmitting data to another game apparatus of the same type using the local communication module 38.

The RTC 39 and the power circuit 40 are connected to the CPU 31. The RTC 39 counts a time, and outputs the time to the CPU 31. For example, the CPU 31 is capable of calculating a current time (date) and the like based on the time counted by the RTC 39. The power circuit 40 controls electric power from a power supply (typically, a battery accommodated in the lower housing 11) of the game apparatus 1 to supply the electric power to each electronic component of the game apparatus 1.

The game apparatus 1 includes the microphone 42 and an amplifier 43. The microphone 42 and the amplifier 43 are connected to the I/F circuit 41. The microphone 42 detects voice produced by the user toward the game apparatus 1, and outputs a sound signal indicating the voice to the I/F circuit 41. The amplifier 43 amplifies the sound signal from the I/F circuit 41, and causes the speakers (not shown) to output the sound signal. The I/F circuit 41 is connected to the CPU 31.

The touch panel 13 is connected to the I/F circuit 41. The I/F circuit 41 includes a sound control circuit for controlling the microphone 42 and the amplifier 43 (the speakers), and a touch panel control circuit for controlling the touch panel 13. The sound control circuit performs A/D conversion or D/A conversion of the sound signal, and converts the sound signal into sound data in a predetermined format. The touch panel control circuit generates touch position data in a predetermined format based on a signal from the touch panel 13, and outputs the touch position data to the CPU 31. For example, the touch position data is data indicating coordinates of a position at which an input is performed on an input surface of the touch panel 13. The touch panel control circuit reads a signal from the touch panel 13 and generates touch position data every predetermined period of time. The CPU 31 is capable of recognizing a position at which an input is performed on the touch panel 13 by obtaining the touch position data.

Operation buttons 14 include the above operation buttons 14A to 14K, and is connected to the CPU 31. The operation buttons 14 output operation data indicating an input state of each of the buttons 14A to 14K (whether or not each button is pressed) to the CPU 31. The CPU 31 obtains the operation data from the operation button 14, and performs processing in accordance with an input performed onto the operation button 14.

The inner camera 23 and the outer camera 25 are connected to the CPU 31. Each of the inner camera 23 and the outer camera 25 takes an image in accordance with an instruction from the CPU 31, and outputs data of the taken image to the CPU 31. In this embodiment, the CPU 31 gives an imaging instruction to the inner camera 23 or the outer camera 25, and the camera which has received the imaging instruction takes an image and transmits image data to the CPU 31.

The lower LCD 12 and the upper LCD 22 are connected to the CPU 31. Each of the lower LCD 12 and the upper LCD 22 displays an image thereon in accordance with an instruction from the CPU 31.

<Outline of Operation of Game Apparatus>

Hereinafter, an outline of operation of the game apparatus 1 will be described.

In this embodiment, one player basically operates a game apparatus (game apparatus 1). In the description below, game apparatuses operated by players A, B, and C are sometimes referred to as game apparatuses A, B, and C, respectively, for convenience.

If a player activates a game apparatus with a memory card 28 including a game program mounted thereinto, the game program will be executed, and game processing will starts. In the game processing, a game world is displayed on the upper LCD 22 or lower LCD 12, and the player can operate a player character present in the game world by means of the operation buttons 14, the touch panel 13, or the like. In the description hereinbelow, player characters operated by the players A, B, and C are sometimes referred to as player characters A, B, and C, respectively, for convenience.

Immediately after the player has started the game, basically, game processing of a single play mode progresses. The single play mode is a game processing mode where only one player character is present in a game world of a game being played on a game apparatus (e.g., a state where only the player character A operated by the player A is present in a game world of a game being played on the game apparatus A). If a predetermined condition is satisfied during the game processing in the single play mode, game processing in a multi play mode will start. The multi play mode is a game processing mode where a plurality of player characters are present in a world of a game being played on a game apparatus (e.g., a state where the player characters A and B operated by the players A and B are present in a game world of a game being played on the game apparatus A). In the game processing in the multi play mode like this is realized by a plurality of the game apparatuses 1 performing mutual communication via their local communication modules 38.

<Single Play Mode>

Hereinafter, with reference to the accompanying drawings, an outline of the game processing in the single play mode will be described.

In this embodiment, as illustrated in FIG. 3, the game apparatus 1 constantly transmits beacons to other unspecified game apparatuses via the local communication module 38 during its game processing (regardless of being in the single play mode or in the multi play mode). This transmission may be performed based on a passive scanning mode, or on an active scanning mode. That is, a game apparatus may transmit (broadcast) beacons to other unspecified apparatuses at predetermined intervals. Alternatively, a game apparatus may transmit a probe request packet to other unspecified apparatuses at predetermined intervals, and other game apparatuses that have received the packet may transmit beacons. Namely, in example embodiments of the present invention, search for other apparatuses may be performed in the active scanning mode, or in the passive scanning mode. As will be described later, the beacons include various pieces of information such as player information, game status information, and messages. In the single play mode, the following functions can be realized with the use of the beacons constantly transmitted during a game play.

Profile display function
Game support function
Communication function

Research mission function

The profile display function enables display, on a screen of a game apparatus, of profiles of other players who play games in an area near the game apparatus (e.g., in a range where beacons can be received from other game apparatuses). For example, when the player A plays a game with the game apparatus A, and the player B plays a game with the game apparatus B in an area near the game apparatus A, it is possible to display the profile of the player B on the screen of the game apparatus A (e.g., on the upper LCD 22).

The game support function enables support of another player who plays in an area near the game apparatus. For example, under a state where the player A is playing a game with the game apparatus A, and the player B is playing a game with the game apparatus B in an area near the game apparatus A, when the player A activates a specific effect by using a specific parameter (e.g., a special item obtainable in the game world) in the game world of the game played by the player A (hereinafter referred to as the "game world of the player A" or "game world A", the same effect emerges in the game world of the player B even if the player B does not use the special item or parameter. For example, when the player A recovers the power of a monster accompanying the player character A as a mate, the same effect will emerge in the game world of the player B playing the game in the area near the player A (i.e., the power of a monster accompanying the player character B as a mate recovers). Further, for example, when the player A uses a specific parameter to halve, for a certain period of time, the selling price of an item sold in a shop in the game world A, the same effect emerges in the game world of the player B playing the game in the area near the player A (i.e., the selling price of the item sold in the game world B is also halved for the certain period of time).

The communication function enables display, on the screen of the game apparatus, of messages from other players playing in an area near the game apparatus, and enables transmission of messages to such other players. For example, the function makes it possible, when the player A is playing a game with the game apparatus A, and the player B is playing a game with the game apparatus B in an area near the game apparatus A, to display a message sent from the player B to the player A on the screen of the game apparatus A, or to display a message from the player A to the player B on a screen of the game apparatus B.

The research mission function causes a player character in a game world to act as a researcher to perform various researches upon a research request by a research company in the game world. The research is performed by a player in the real world visiting congested places such as stations and shops with his/her game apparatus 1 carried so as to allow the game apparatus 1 to receive beacons transmitted from other game apparatuses carried by other players (as will be described below, the beacons include information on profiles and tastes of other players). When the result of the research is reported to the research company, the rank of the player character, as a researcher increases, leading to a change in the game development. Or, the player character will obtain an item which allows the player to progress the game advantageously.

Hereinafter, with reference to examples of game images, an outline of the game processing in the single play mode will be described.

Figure 4:
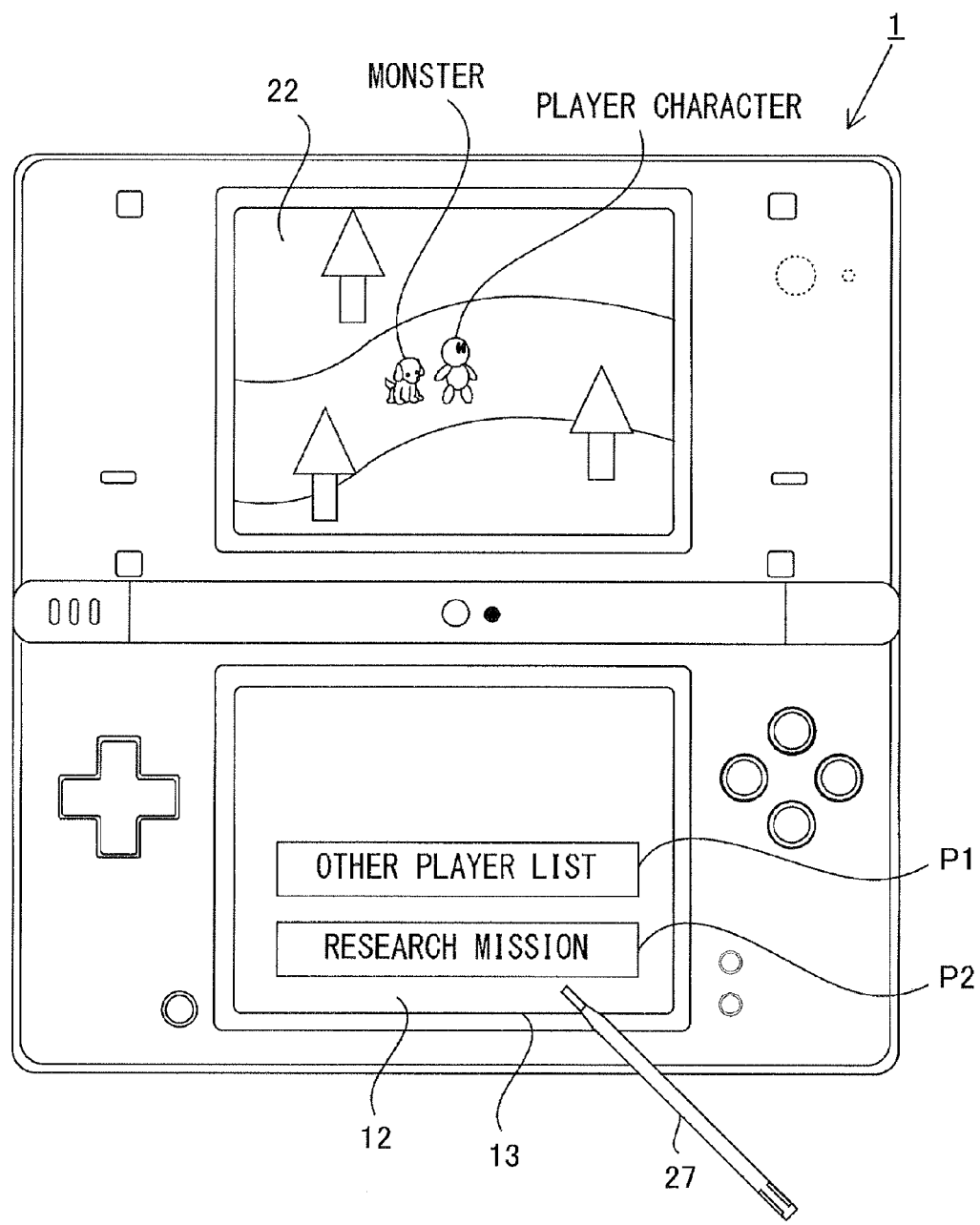
FIG. 4 illustrates an example of an image displayed on an upper LCD and a lower LCD.

FIG. 4 illustrates an example of an image displayed on the upper LCD 22 and the lower LCD 12 of a game apparatus 1 immediately after a game starts. On the upper LCD 22, a game world including a player character is displayed. The player character is accompanied by a monster as a mate, and can cause the mate monster to battle with a wild monster by giving an order to the mate monster. The player can play the game by operating, for example, the operation buttons 14 and thereby operating the player character. On the lower LCD 12, an "other player list" button image P1 for display a list of other players playing in an area near the game apparatus, and a "research mission" button image P2 for performing the research are displayed. When these button images P1 and P2 are touched with a stylus pen 27, the player can invoke functions corresponding to the button images P1 and P2. The research mission function may be invoked by causing the player character in the game world to speak to a specific person (e.g., a director of the research company) instead of by touching the "research mission" button image P2.

Figure 5:
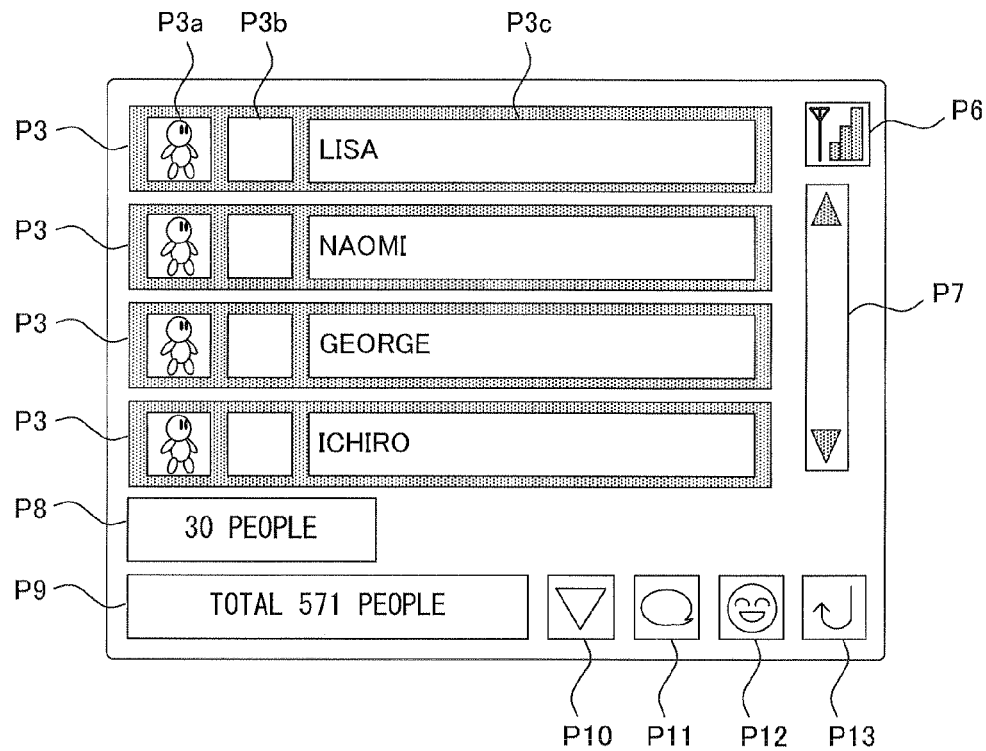
FIG. 5 illustrates an example of an image displayed on the lower LCD.

FIG. 5 illustrates an example of an image of the other player list which is displayed on the lower LCD 12 when the "other player list" button image P1 in FIG. 4 has been touched. Even if the image of the other player list is being displayed on the lower LCD 12, the player can continue playing the game by operating the operation buttons 14, for example, while seeing a game image displayed on the upper LCD 22.

In the single play mode, the game apparatus 1 can constantly receive beacons from other game apparatuses, in essence. When the game apparatus 1 receives beacons from other game apparatuses through the local communication module 38, it analyzes information included in the beacons. The beacons include player names, greeting messages, profile information, information indicating the game statuses, and the like.

When the game apparatus 1 has received beacons from another game apparatus, it accumulates information relating to the player of the other game apparatus, based on the beacons, into the saved data memory 34, for example. In other player information windows P3 in the other player list image, information on players ("hereinafter referred to as players having passed in the past") of game apparatuses from which beacons have been received in the past is displayed. Up to four other player information windows P3 are displayable on the lower LCD 12 at a time. If the player touches the scroll icon P7, the player can scroll the other player information windows P3, and can see up to 30 other player information windows P3. The other player information window P3 includes a player icon display region P3$a$, a status icon display region P3$b$, and a player name display region P3$c$.

When the game apparatus 1 has received beacons from another game apparatus, it automatically displays on its screen information included in the beacons. Accordingly, information from other unspecified game apparatuses present near the game apparatus 1 is automatically displayed successively on the screen during a game play. Since the information is displayed simultaneously with the player's own game screen, the player can recognize information of other players nearby, while playing a game, and can have an experience as if the player plays the game together with someone else (an unspecified person) even when the player plays the game alone. In addition, information from a plurality of game apparatuses present near the game apparatus 1 is automatically displayed on the screen of the game apparatus 1 successively. Accordingly, the player can have an experience as if the player plays a game together with many people.

A reception status icon P6 indicates a reception status of beacons that is analyzed based on a beacon of the best reception condition among beacons received from one or more game apparatuses present nearby.

A information display region P8 indicates the number of the other player information windows P3 the player can currently see in the main screen of the other player list.

In the information display region P9, various pieces of information are displayed depending on the situations. In an example illustrated in FIG. 6, the total number of the players having passed in the past is displayed. The total number of the players having passed in the past can be calculated by obtaining identifiers of players of other game apparatuses based on the beacons from the other game apparatuses, and by accumulating the identifiers into the saved data memory 34, for example, of the game apparatus 1.

A special power icon P10 is to be used to activate special power.

A quick word message icon P11 is to be used to send a quick word message to another player.

A thank-you icon P12 is to be used to convey the player's appreciation to another player.

A return icon P13 is to be used to return to a previous screen.

Figure 6:
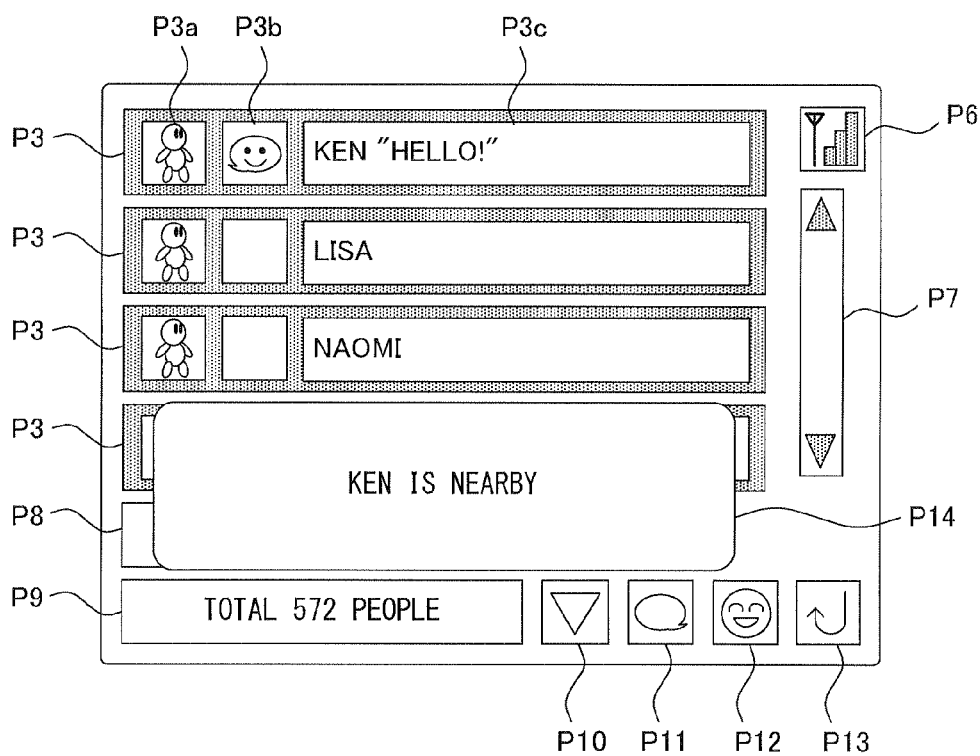
FIG. 6 illustrates an example of an image displayed on the lower LCD.

For example, in a state where the other player list image shown in FIG. 5 is displayed on the lower LCD 12 of the game apparatus 1 of Nana (a player name), when a game apparatus 1 of Ken who is playing a game in the single play mode, in the same manner as Nana, approaches an area near Nana's game apparatus 1, Nana's game apparatus 1 becomes able to receive beacons from Ken's game apparatus 1 (Similarly, Ken's game apparatus 1 becomes able to receive beacons from Nana's game apparatus 1). Beacons from Ken's game apparatus 1 include the player name (Ken), a greeting message, and the like, and thus, Nana's game apparatus 1 adds Ken's information to the other player list image displayed on the lower LCD 12, as illustrated in FIG. 6. In the status icon display region P3b of Ken, a status icon indicating such the current status is displayed, and in the player name display region P3c relating to Ken, Ken's name and a greeting message are displayed. Further, a message window P14 appears, and a message indicating the current status is displayed in the message window P14. In an example in FIG. 6, Ken's name and his greeting message are displayed concurrently in the player name display region P3c relating to Ken. However, in another example, Ken's name and his greeting message may be displayed alternately in the player name display region P3c relating to Ken.

FIG. 7 illustrates examples of status icons displayed in the status icon display region P3b and messages displayable in the message window P14, and also illustrates timings at which the icons and messages are to be displayed. Bracketed information in the messages ([player name], [monster name], [special power name], [play time], [quick word message], and the like) is the information obtained from beacons.

As illustrated in FIG. 7, based on data transmitted from unspecified game apparatuses present nearby, various messages indicating game statuses are automatically displayed on the screen of a game apparatus 1. Accordingly, game statuses of other unspecified players present near the game apparatus 1 are automatically successively displayed on the screen of the game apparatus 1 during a game play, and the player can have an experience as if s/he plays the game together with someone else (unspecified players). In addition, as will be described later, with the game support function, the player can see the game statuses of other unspecified players nearby and help the unspecified players. Namely, the player can have an experience as if s/he plays the game together with many more other unspecified players.

Figure 8:
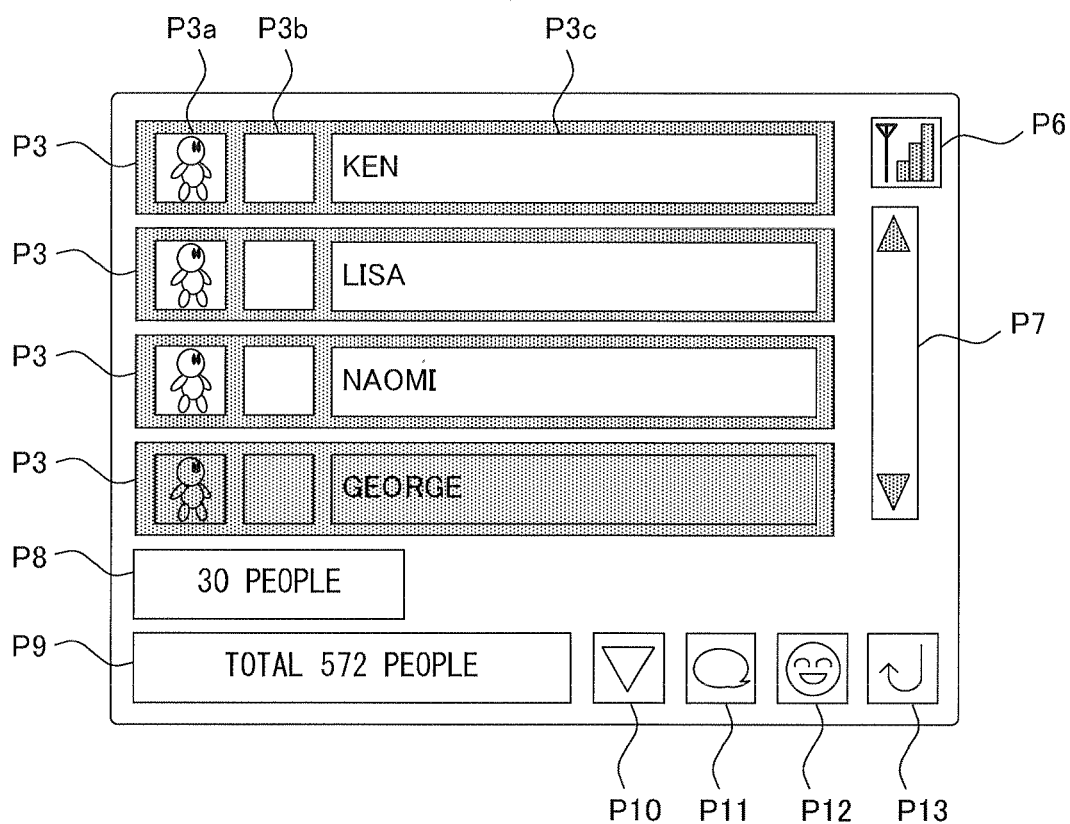
FIG. 8 illustrates an example of an image displayed on the lower LCD.

Of the other player information windows P3 included in the other player list image, an other player information window P3 that corresponds to a game apparatus from which beacons cannot be obtained for a predetermined period of time or more (e.g., for 180 seconds or more) is displayed darkly as indicated in FIG. 8, which notifies the player that the other player has moved away from the player.

<Profile Display Function>

Figure 9:
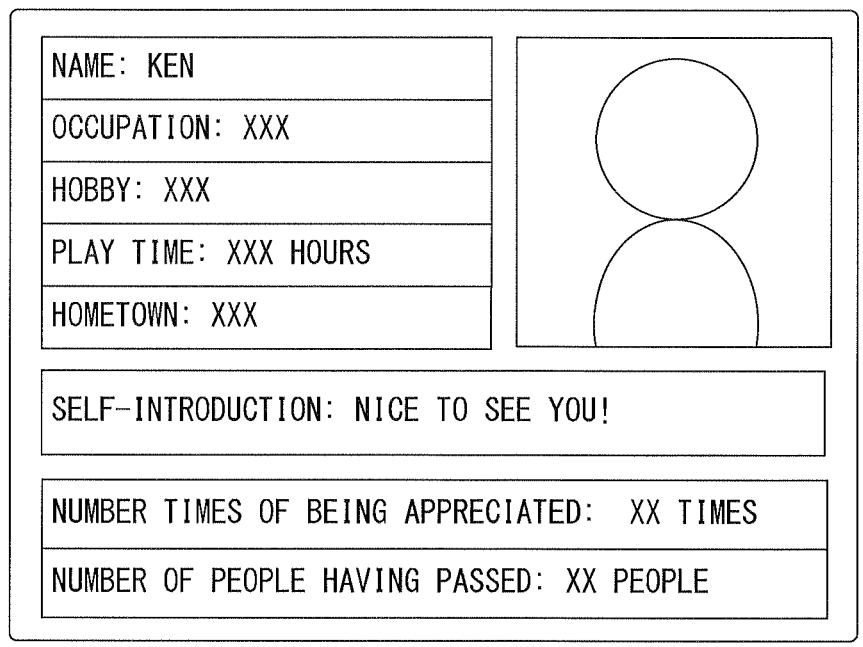
FIG. 9 illustrates an example of an image displayed on the upper LCD.
Figure 10:
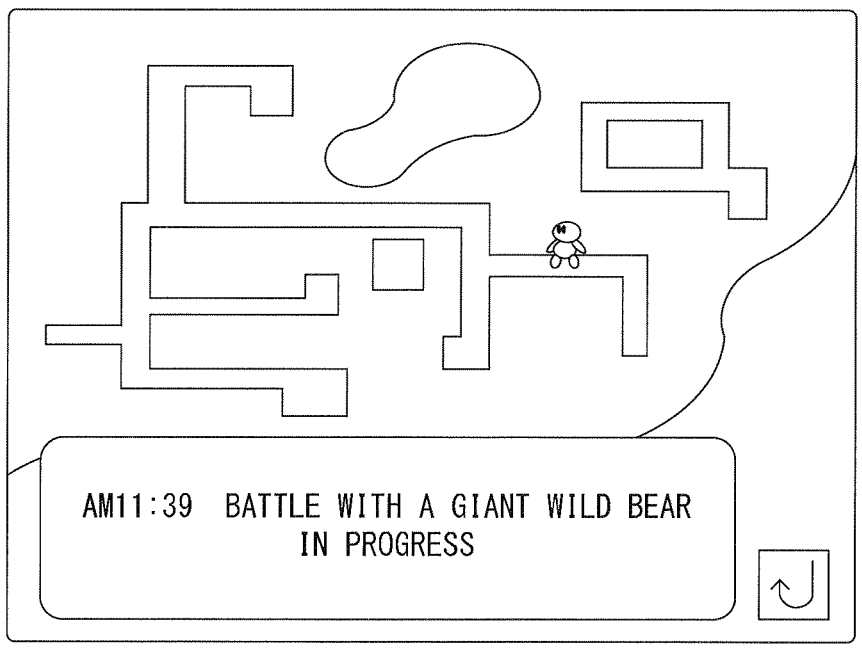
FIG. 10 illustrates an example of an image displayed on the lower LCD.

If the player touches any of the other player information windows P3 included in the other player list image, the player can see the profile or the like of another player corresponding to the touched other player information window P3. For example, when the player touches the other player information window P3 relating to Ken, Ken's profile is displayed on the upper LCD 22, as illustrated in FIG. 9. In addition, on the lower LCD 12, as illustrated in FIG. 10, a map indicating a current position of a player character operated by Ken in a game being played by Ken and a window indicating the game status are displayed. The time displayed in the game status window represents the time when beacons were last received from Ken's game apparatus 1. That is, the game status displayed in the game status window represents a game status at the time when beacons were last received from Ken's game apparatus 1. Information necessary to generate images illustrated in FIG. 9 and FIG. 10 (e.g., Ken's profile, his play time, a self-introduction text, the number of times of being appreciated, the number of people having passed, the current position of Ken's player character, and Ken's game status) is obtained from the beacons transmitted from Ken's game apparatus 1.

As described above, a player playing a game in the single play mode can see, in real time, profiles of other players who are also playing games in the single play modes in the area near the player.

<Game Support Function>

Figure 11:
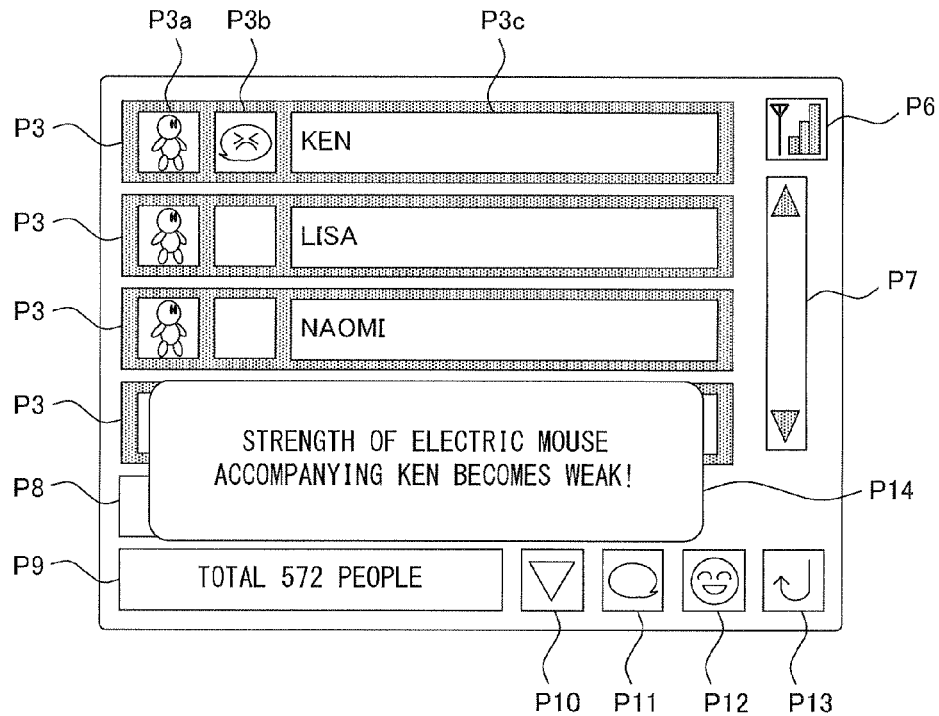
FIG. 11 illustrates an example of an image displayed on the lower LCD.
Figure 12:
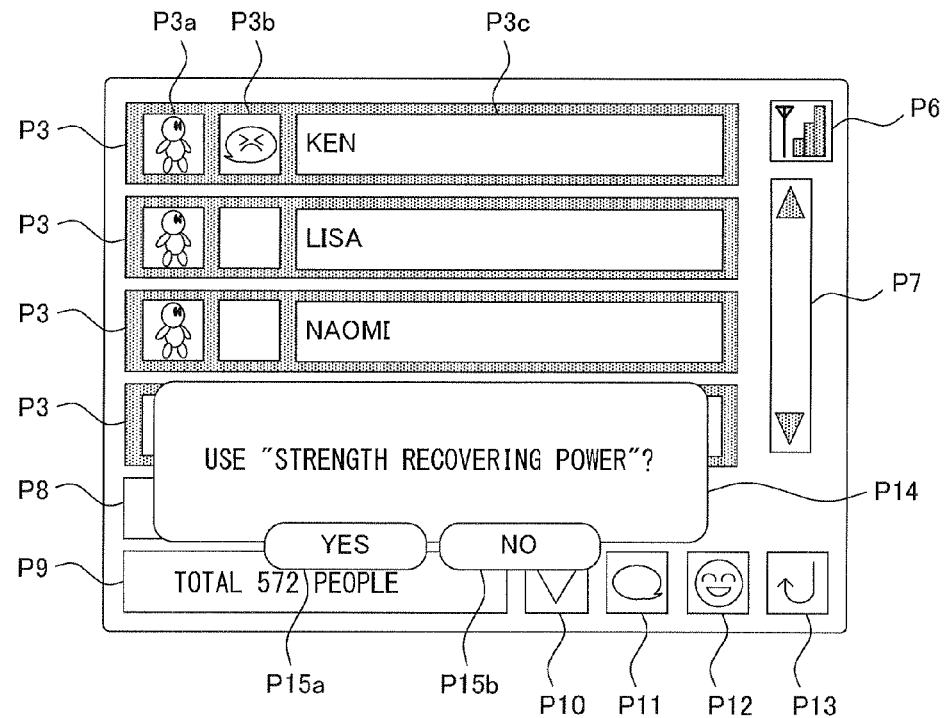
FIG. 12 illustrates an example of an image displayed on the lower LCD.
Figures 13, 14:
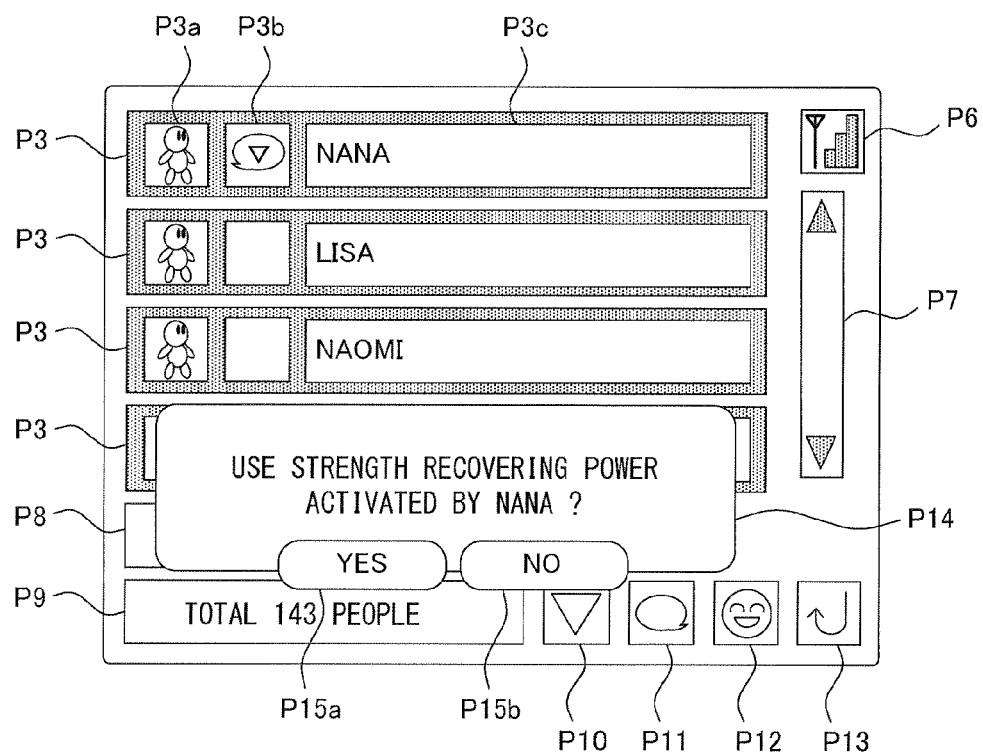
FIG. 13 shows examples of special power.
FIG. 14 illustrates an example of an image displayed on the lower LCD.

FIG. 11 illustrates an image of the other player list displayed on the lower LCD 12 of Nana's game apparatus 1 when the strength of an electric mouse (monster name) accompanying Ken (a player character operated by Ken) is halved from its maximum level. In this case, if Nana touches the special power icon P10 to use the special power called "strength recovering power", the power of the monster accompanying Nana can be recovered, and the power of Ken's electric mouse can also be recovered. FIG. 12 illustrates an image of the other player list displayed on the lower LCD 12 of Nana's game apparatus 1 immediately after Nana has touched the special power icon P10. In the image of the other player list, button images P15a and P15b for confirmation are displayed. As illustrated in FIG. 13, there are several types of special powers players can use in the game world, and the effect and effective time vary depending on the special powers. For example, when a player use the "strength recovering power", the strength of the mate monster recovers in a second. Further, when a player uses a "bargain power", items in a shop will be sold at half price for three minutes from the start of use of the power. In this embodiment, if a player specifies a special power that s/he wishes to use in advance, s/he can use the specified special power promptly by touching the special power icon P10.

In FIG. 12, if Nana touches the button image P15a of "Yes", the strength of the monster (for example, see FIG. 4) accompanying Nana will recover, and in addition, information indicating that Nana has used the "strength recovering power" is to be sent over beacons from the game apparatus 1 of Nana to other game apparatuses which are being used to play games in the single play mode in the area near the game apparatus 1 of Nana.

FIG. 14 illustrates the other player list image displayed on the lower LCD 12 of Ken's game apparatus 1 immediately after he has received the beacons from Nana's game apparatus 1. In the other player list image in FIG. 14, the other player information window P3 relating to Nana is displayed. In its status icon display region P3b, a status icon indicating that Nana has used the special power is displayed, and in its message window P14, a message inquiring whether to use the "strength recovering power" activated by Nana is displayed.

In FIG. 14, when Ken touches the button image P15a of "Yes", the power of the electric mouse accompanying Ken will recover.

In this manner, with the use of the special power, a player can support another player who is playing a game near the player. The above description has illustrated a case where when a player uses the special power of his/her own, another player who is playing a game near the player can also use the special power. However, it may be set such that a player can support another player in using the special power even if the player himself/herself does not use his/her own special power.

Figure 15:
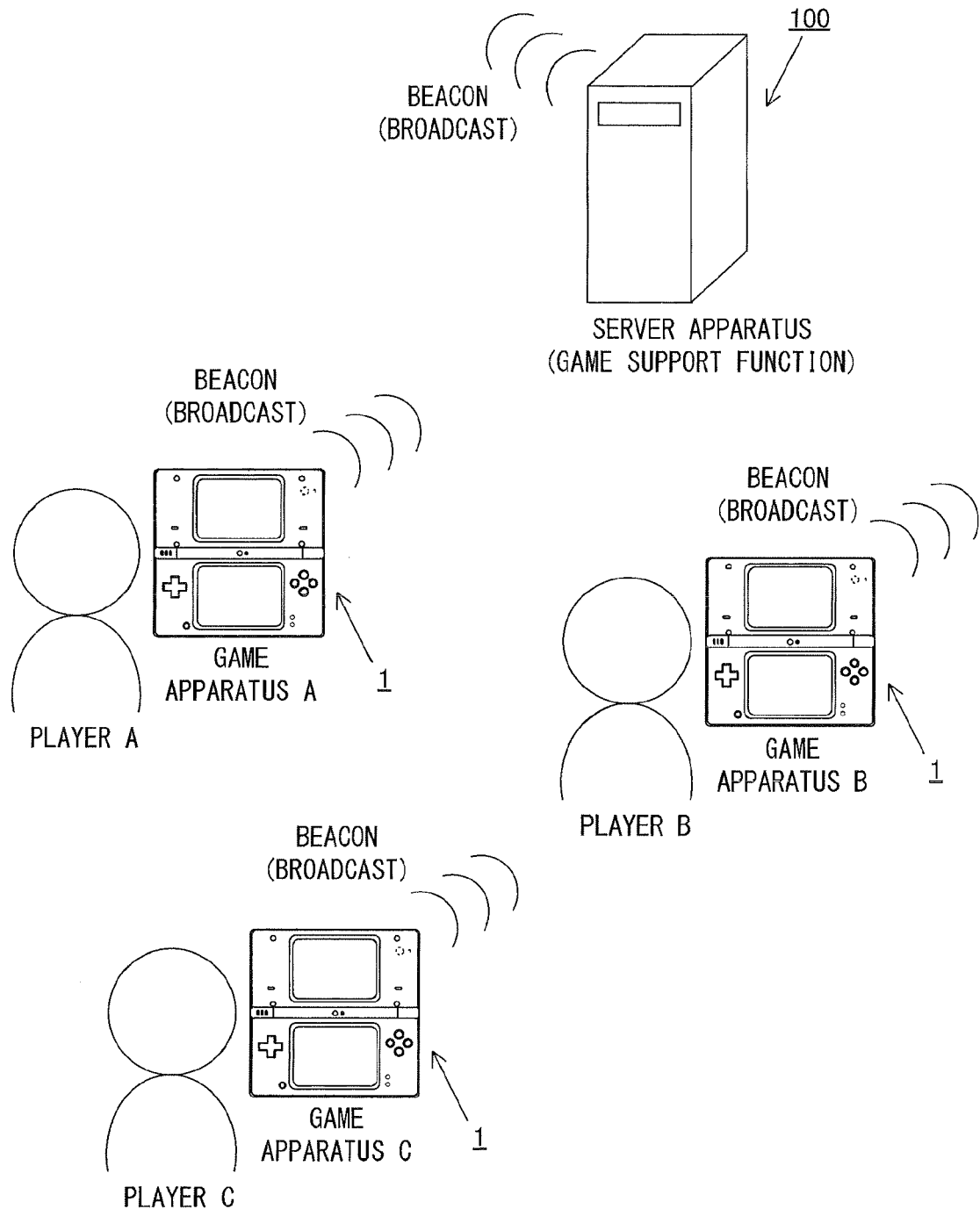
FIG. 15 is a diagram illustrating a server, and a plurality of game apparatuses operated by the respective players.

Instead of players mutual supporting as described above, the following setting may be possible. That is, as illustrated in FIG. 15, a server apparatus 100 is set in a shop or an event site for supporting players playing games nearby, for example, and the server apparatus 100 automatically transmits, at a predetermined time (e.g., at predetermined time intervals), beacons indicating that the server apparatus 100 has activated special power (e.g., "experience points gaining power"). When the game apparatus 1 of a player who is playing a game near in the area near the server apparatus 100 has received the beacons from the server apparatus 100, a message is displayed on the game apparatus 1 inquiring whether to use the special power activated by the server apparatus 100. When the player agrees to use the special power, s/he can obtain the effect of the special power. If the server apparatus 100 is set in shops or event sites, the shops and event sites can expect to attract a larger number of people.

<Communication Function>

Figure 16:
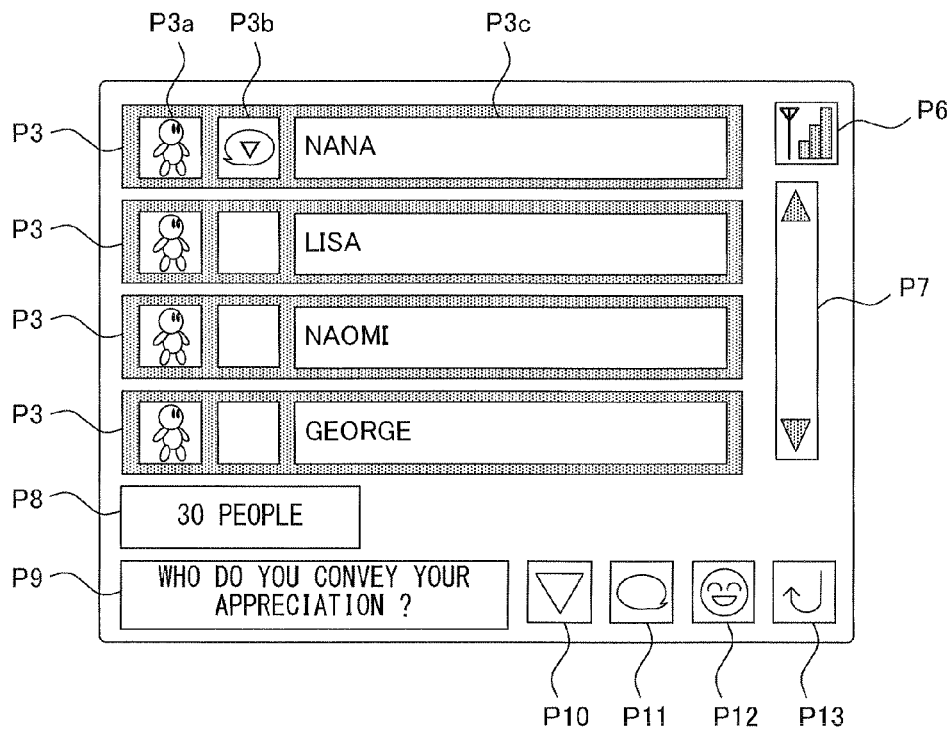
FIG. 16 is a diagram illustrating an example of an image displayed on the lower LCD.

If Ken wishes to convey his appreciation to Nana for Nana's activation of the "strength recovering power", Ken touches the thank-you icon P12 displayed on the lower LCD 12 of Ken's game apparatus 1, and touches the other player information window P3 relating to Nana, thereby to convey his appreciation to Nana. FIG. 16 illustrates the other player list image displayed on the lower LCD 12 of Ken's game apparatus 1 immediately after Ken has touched the thank-you icon P12. In the information display region P9, a message is displayed to encourage the player (Ken, in this case) to select a person to whom the player's appreciation is to be conveyed. Here, when Ken touches the other player information window P3 relating to Nana, information indicating appreciation to Nana will be sent over beacons from Ken's game apparatus 1 to Nana's game apparatus 1. Since the beacons are broadcast, the beacons are also sent to other game apparatuses 1 than Nana's. However, since the beacons include the information indicating appreciation to Nana, the other game apparatuses 1 than Nana's will ignore the information.

Figure 17:
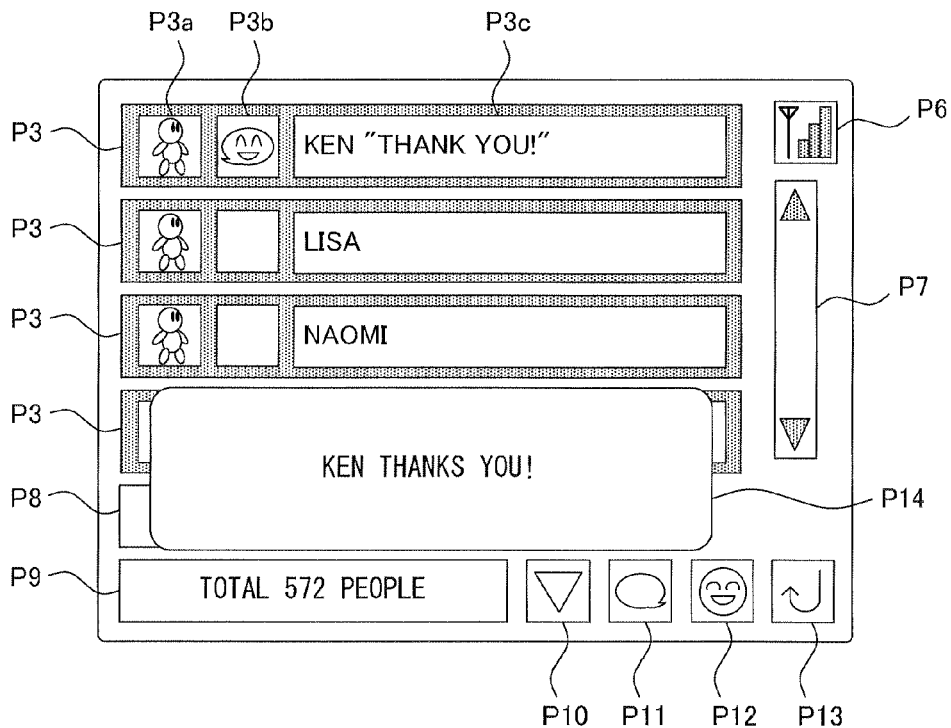
FIG. 17 illustrates an example of an image displayed on the lower LCD.

FIG. 17 illustrates the other player list image displayed on the lower LCD 12 of Nana's game apparatus 1 immediately after Nana's game apparatus 1 has received the above-described beacons. In the status icon display region P3b in the other player information window P3 relating to Ken, a status icon indicating that Ken has conveyed his appreciation is displayed, and in the player name display region P3c relating to Ken, Ken's name and a thank-you message are displayed. In addition, in the message window P14, a message indicating that Ken has conveyed his appreciation is displayed. In the saved data memory 34 of the game apparatus 1, for example, the "number of times of being appreciated by other players" is stored, and when a player is appreciated by other players as described above, the value of the stored "number of times of being appreciated by other players" is updated (incremented). The "number of times of being appreciated by other players" may be made known to other players, over beacons, as a part of the player's profile. In addition, depending on the value, the game development may be changed.

Figure 18:
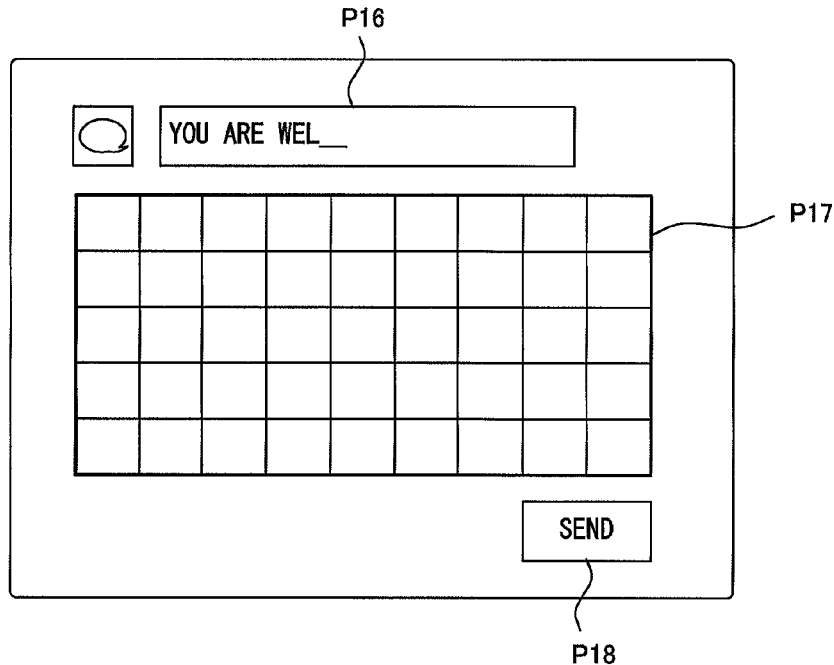
FIG. 18 illustrates an example of an image displayed on the lower LCD.

As the greeting message (see FIG. 6) and the thank-you message (see FIG. 17) described above, text registered in advance by a player to his/her game apparatus 1 is used. However, without limiting to such a fixed message, a player can freely edit the text thereby to send the text to other players. For example, in the other player list image displayed on the lower LCD 12 of Nana's game apparatus 1 shown in FIG. 17, when Nana touches the quick word message icon P11 and selects Ken as a person to whom a quick word message is to be sent (i.e., touches the other player information window P3 relating to Ken), a message input image as indicated in FIG. 18 is displayed on the lower LCD 12 of Nana's game apparatus 1. The message input image includes: a currently inputted text display region P16 which displays text being inputted; a software keyboard image P17 for enabling character inputting; and a send button image P18 for enabling message sending upon completion of message inputting. When Nana has completed message inputting, and has touched the send button image P18, information indicating a quick word message to Ken is sent from Nana's game apparatus 1 to Ken's game apparatus 1 over beacons. It should be noted that since the beacons are broadcast, game apparatuses 1 other Ken's than also receive the beacons. However, the beacons include information indicating the quick word message to Ken, and thus the game apparatuses 1 other than Ken's can ignore the information.

Figure 19:
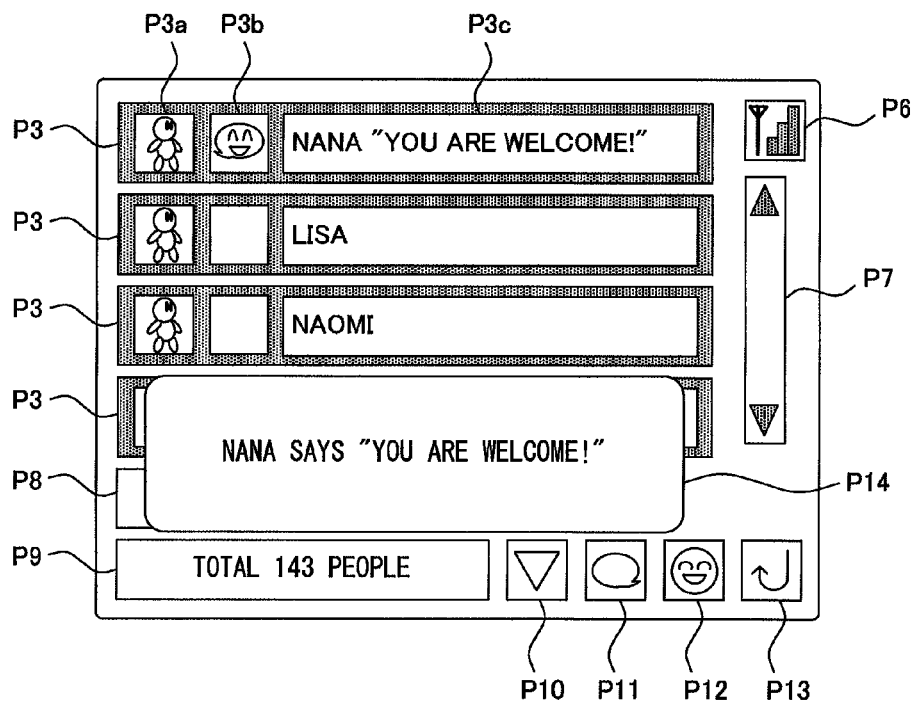
FIG. 19 illustrates an example of an image displayed on the lower LCD.

FIG. 19 illustrates the other player list image displayed on the lower LCD 12 of Ken's game apparatus 1 immediately after the game apparatus 1 receives the beacons. In the status icon display region P3b of the other player information window P3 relating to Nana, a status icon is displayed indicating that a quick word message has been received from Nana, and in the player name display region P3c relating to Nana, Nana's name and her quick word message are displayed. In addition, in the message window P14, a message indicating that a quick word message has been received from Nana is displayed.

In this manner, the player can communicate in real time with other players who are playing games near the player if necessary.

<Research Mission Function>

Figure 20:
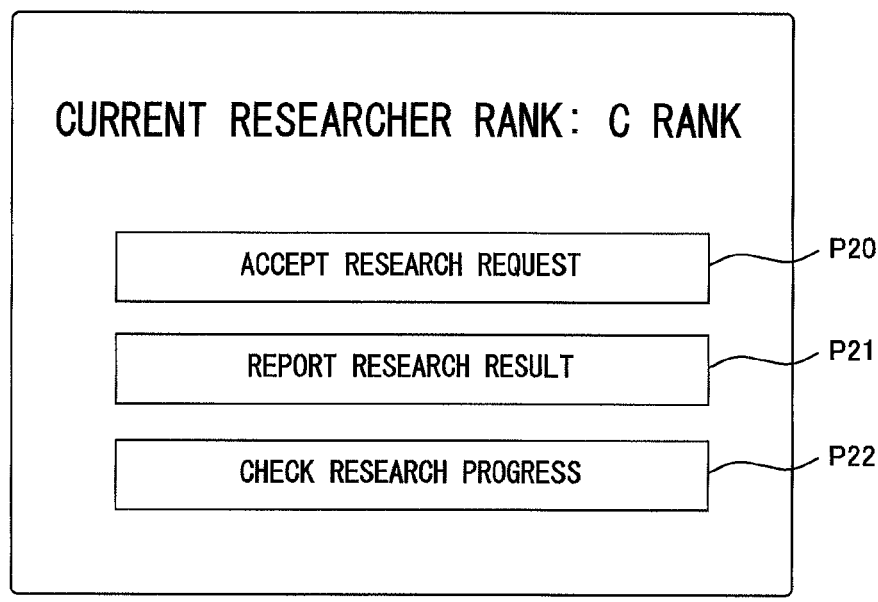
FIG. 20 illustrates an example of an image displayed on the lower LCD.

FIG. 20 illustrates an example of a main image of a research mission displayed on the lower LCD 12 when the "research mission" button image P2 in FIG. 4 is touched. In the main image of the research mission, the player's current researcher rank, and three button images P20 to P22 are displayed. The researcher rank indicates the level of skill as a researcher. The more requests for research a player accepts and the more reports the player provides as the research results, the higher the research rank of the player increases from C rank, B rank, A rank, to S rank. The button image P20 is to be touched when a player accepts a request for research. The button image P21 is to be touched when a player reports a research result. The button image P22 is to be touched when a player checks the progress of a research.

Figure 21:
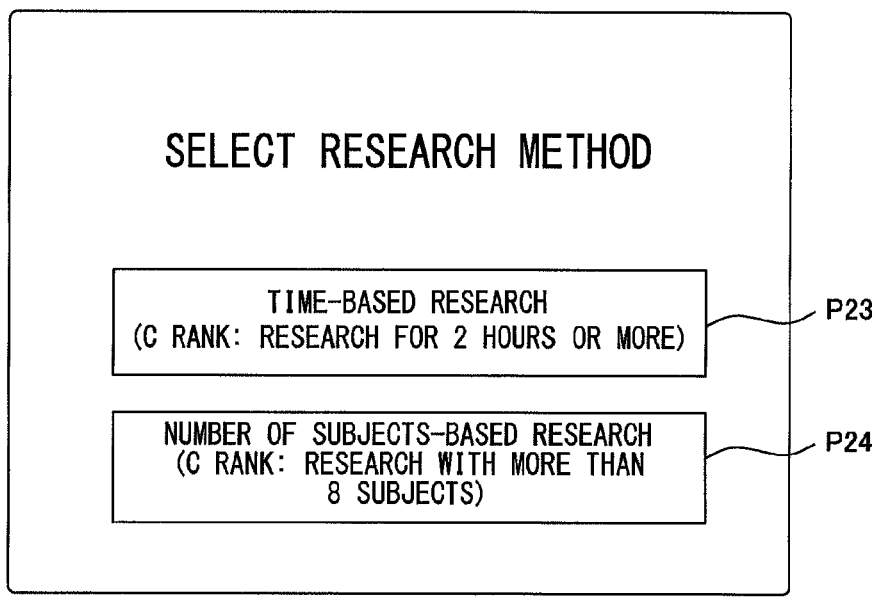
FIG. 21 illustrates an example of an image displayed on the lower LCD.

In FIG. 20, when a player touches the button image P20, an image on the lower LCD 12 changes to show a research method selection screen, as indicated in FIG. 21. In this embodiment, the player can arbitrarily select a desired research method from two types of research methods, either a "time-based research" or a "number of subjects-based research". The "time-based research" is a research method that is to be conducted for a required period of time (the required period of time becomes longer if the researcher rank becomes higher). The "number of subjects-based research" is a research method that is to be conducted with a required number of research subjects (the required number of research subjects increases if the researcher rank becomes higher). As described above, a research is performed by a player in the real world visiting congested places such as stations and shops with his/her game apparatus 1 carried so as to allow the game apparatus 1 to receive beacons transmitted from game apparatuses carried by other players. Therefore, those players who have many opportunities to approach other players carrying their game apparatuses may be able to complete researching very quickly by selecting the "number of subjects-based research". Meanwhile, those players who have fewer opportunities to approach other players carrying their game apparatuses are likely to have difficulty in completing researching in the case of the "number of subjects-based research". In this embodiment, in order not to cause the latter players significant disadvantages, it is set such that players can select either the "time-based research" or the "number of subjects-based research". Therefore, even if the research has been conducted with a small number of subjects, a player can complete researching after a required period of time has elapsed.

In FIG. 21, if the player touches either the button image P23 indicating the "time-based research" or the button image P24 indicating the "number of subjects-based research", the image on the lower LCD 12 will change to a research detail selection screen, as illustrated in FIG. 22. In the research detail selection screen, a plurality of button images P25 indicating the research details are displayed. By touching a scroll icon P26 as necessary, the player can check all the research details that are currently available to the player. The player selects a desired research detail from these research details, and touches the button image P25 corresponding to the selected research detail, thereby accepting a research request of the selected research detail.

When the player has accepted the research request relating to any of the research details, the game apparatus 1 continuously performs, from that point of time, an information collection process to collect, from beacons transmitted from other game apparatuses, information on the research detail until the research ends. The information collection process may also be performed while the game apparatus 1 is in a sleeping state. The collected information is accumulated, for example, in the saved data memory 34 of the game apparatus 1.

In FIG. 20, if the player touches the button image P21, a graph will be displayed, or the researcher rank will increase depending on the player's research result stored in the saved data memory 34.

In this manner, the player receives a research request made in the game world, and collects information as if s/he actually conducts an questionnaire research in the real world.

<Multi Play Mode>

Next, an outline of the game processing in the above-described multi play mode will be described further in detail. In the multi play mode, a player character of a player enters a game world of another player playing a game nearby, or a player character of another player enters the player's game world, whereby a state is created where a plurality of player characters are concurrently present in a game world of a game being currently played.

Figure 23:
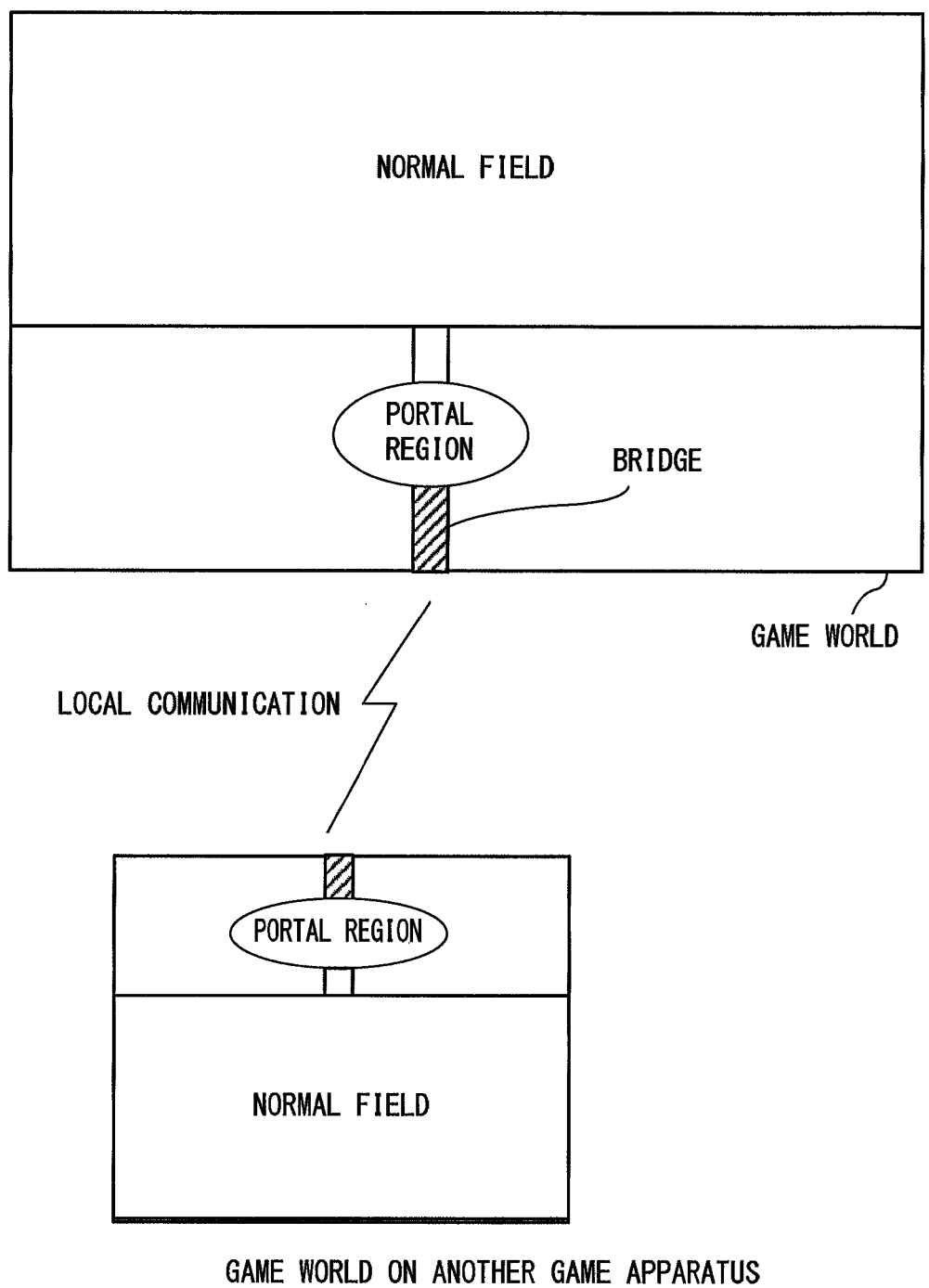
FIG. 23 is a schematic view illustrating a concept of a portal region.

In this embodiment, a predetermined region is set in a game world as a portal region leading to the game world of another player. FIG. 23 is a schematic view indicating a concept of the portal region. FIG. 23 illustrates a game world including a normal field which is a basic scene where a game progresses, and the above-described portal region. In addition, the portal region is connected to a "bridge" (the bridge is regarded as a part of the portal region). This embodiment indicates that the bridge leads to a game world of another game apparatus. Further, in this embodiment, when causing the player character to pass the bridge, the player can feel as if s/he plays a game of causing the player character to enter the world of another game apparatus.

An outline of operation for connection with another game apparatus will be described. In this embodiment, when the player A of the game apparatus A moves the player character operated by himself/herself into the portal region during a game, for example, and further moves the player character onto the bridge, the game apparatus A searches for another game apparatus present within a range communicable with the game apparatus A. As a result, if the game apparatus B has been found, for example, the game apparatus A makes a connection request for a connection with the game apparatus B. Unless the current game status of the game apparatus B indicates communication impossibility, a connection will be established between the game apparatus A and the game apparatus B via the local communication modules 38. Upon establishment of the connection, the respective game apparatuses transmit and receive positional information or the like of the player characters operated in the respective game world thereby to mutually reflect the details of their counterparts. Accordingly, both in the game apparatus A and game apparatus B, the multi play mode is realized where the character operated by the player A and the character operated by the player B are present together. Hereinafter, a mode of connecting game apparatuses directly using a short-distance communication is called a "local connection" or a "local communication". In this embodiment, a unique protocol is to be used for the local connection.

Here, in this embodiment, the local connection is established without obtaining connection acceptance or connection permission by the player B (e.g., display or the like of a connect confirmation message). That is, when a connection request is made by the game apparatus A played by the player A, the game apparatus B establishes a connection with the game apparatus A without asking the player B whether to perform any input operation. Thus, the player B is not required to perform any special operation for connection establishment. That is, a predetermined operation procedure for starting a connection with the game apparatus A is not required to be performed on the game apparatus B. From the player B's viewpoint, the player A makes a connection with the game apparatus B, while the player B does not notice it, and the game world of the player B is penetrated by the player A. That is, each player constantly plays games while feeling that there is a possibility of a network game taking place with an unspecified player playing nearby even if the player plays a game on his/her own. Further, in this embodiment, a network game starts without being noticed by another player, and thus, the player can feel as if a network game constantly takes place. In this embodiment, when the player A performs an operation of any specific procedure (specifically, when the player A moves the player character into the portal region), a search for another game apparatus starts. However, a search for another game apparatus for connection establishment may be started automatically during a game play even if the player A does not perform an operation of a specific procedure. For example, an automatic search for another game apparatus may be started when a predetermined period of time has elapsed after a game starts regardless of the operation by the player (without permission by the player), and thereby a connection may be established and a network game may be started.

In the following description, the situation like the player A is referred to as a penetrating side, and the situation like the player B is referred to as a penetrated side. Further, a process for establishing a local connection on the penetrating side is referred to as a penetrating side connection process, and a process for establishing a local connection on the penetrated side is referred to as a penetrated side connection process.

Next, with reference to an example of a game screen at the time of establishing a local connection, how a game screen changes along with the connection process will be described specifically. An example of a screen described below is a screen on the game apparatus A played by the player A, i.e., the penetrating side. FIG. 24 is a diagram illustrating a situation where the player character operated by the player A has moved onto the bridge in the portal region. In FIG. 24, a screen showing an overhead view of a game world is displayed on the upper LCD 22, and a screen showing various information including a message window is displayed on the lower LCD 12. In the game screen on the upper LCD 22, a bridge and a wall are displayed. Due to the wall, the player character cannot move ahead of the wall (in the right direction in FIG. 24) in this state (that is, the player character is yet to penetrate into the game world of another game apparatus).

Figure 25:
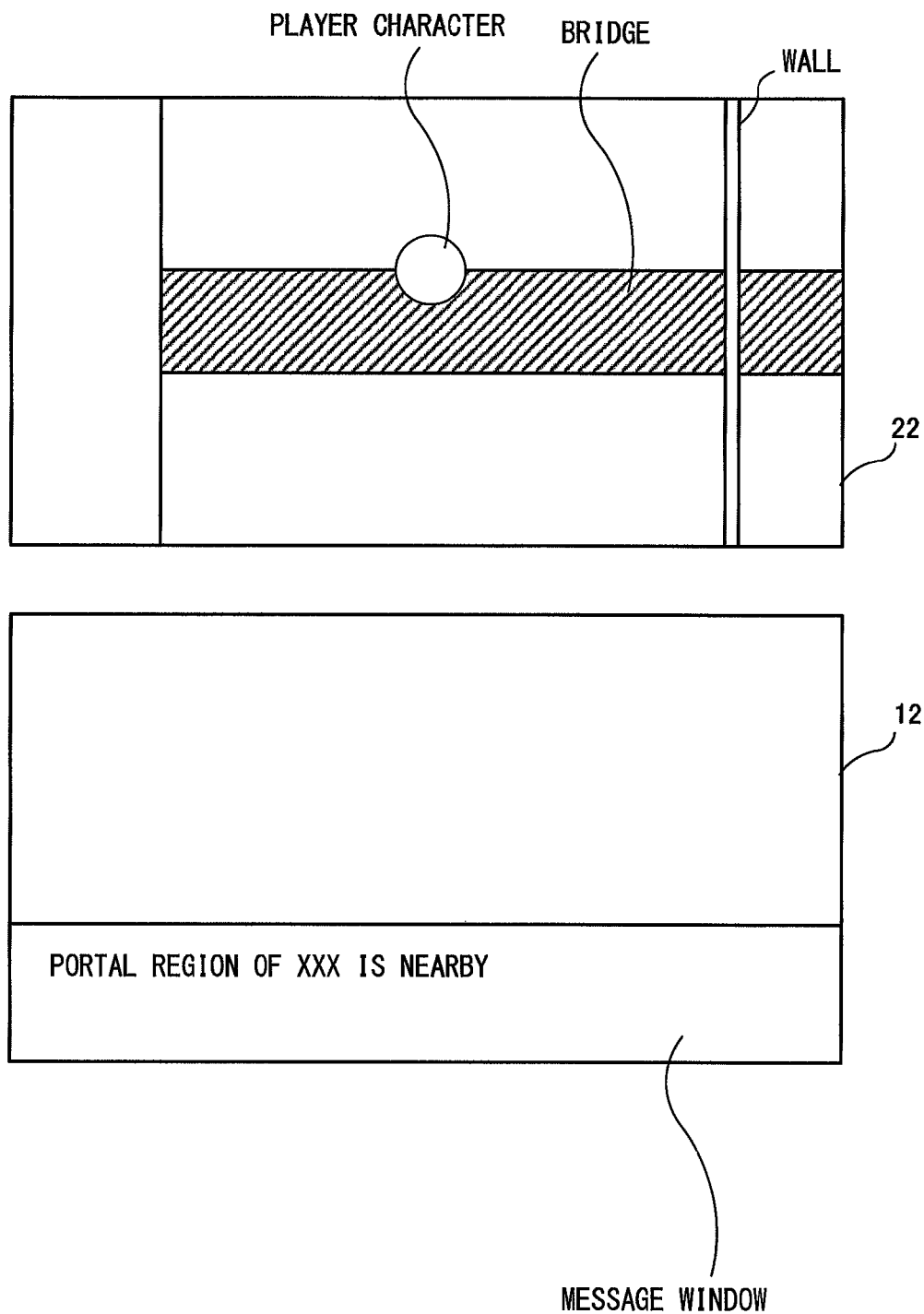
FIG. 25 illustrates an example of a game screen assumed in this embodiment.

In this embodiment, the bridge functions as a gate to the world of another game apparatus (hereinafter sometimes referred to as a gate region). When the player character steps on the bridge, a process of searching for another game apparatus (penetrating side connection process) is performed. At this time, a message indicating that a search for another game apparatus is being performed is displayed on the message window. As a result of the search, if another game apparatus, e.g., the game apparatus B has been found, a message indicating that another game apparatus has been found is displayed, as indicated in FIG. 25. The message is composed of character strings including the name of the player B, and for example, is composed of character strings stating "the portal region of the player B is present nearby".

Figure 26:
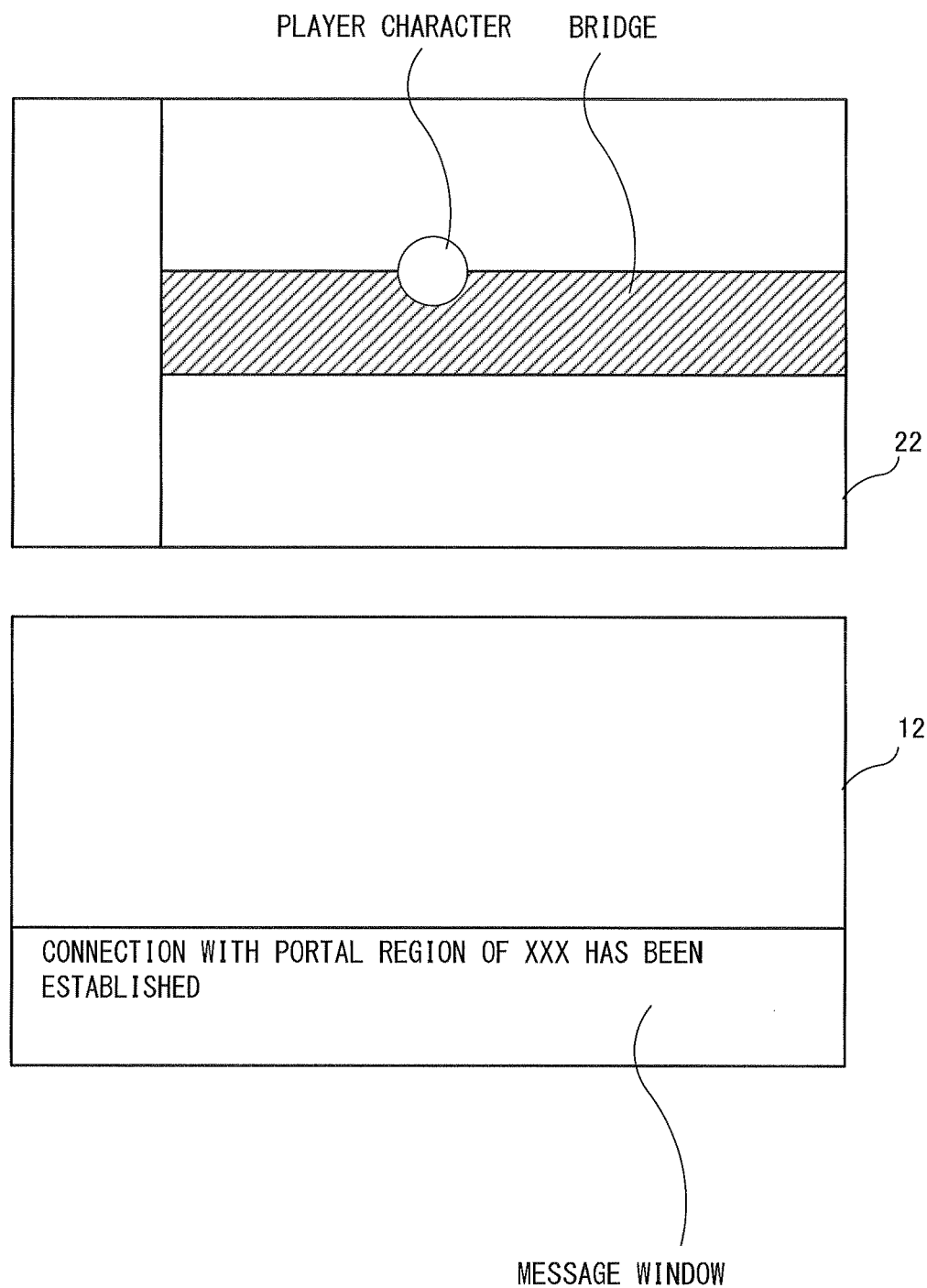
FIG. 26 illustrates an example of a game screen assumed in this embodiment.

Thereafter, a local connection process is performed between the game apparatus A and the game apparatus B (the penetrating side connection process is performed on the game apparatus A side, and the penetrated side connection process is performed on the game apparatus B side). Upon establishment of the local connection, as indicated in FIG. 26, a message indicating that a connection has been established is displayed on the message window. Further, the wall disappears from the game screen on the upper LCD 22. Accordingly, the player character can move ahead of the bridge (in the right direction in FIG. 24). In the game setting, the world of the other game apparatus is present ahead of the bridge, and thereby a multi play described below will be performed.

As an actual process, a game screen is displayed on game apparatus A by using the map data of the game included in a memory card or the like. Based on the information received from the game apparatus B (information indicating the position of a character or the like), the player character operated by the player B on the game apparatus B is displayed and moved on the screen of the game apparatus A. And, the player character operated by the player A is also displayed thereon, and thereby the process realizes the situation where the player character seems to being penetrating the game world of the game apparatus B. Similarly, on the game apparatus B side, based on the positional information or the like of the player character which has been transmitted from the game apparatus A, a process of displaying and moving, on the game apparatus B, the player character operated by the player A is performed.

Figure 27:
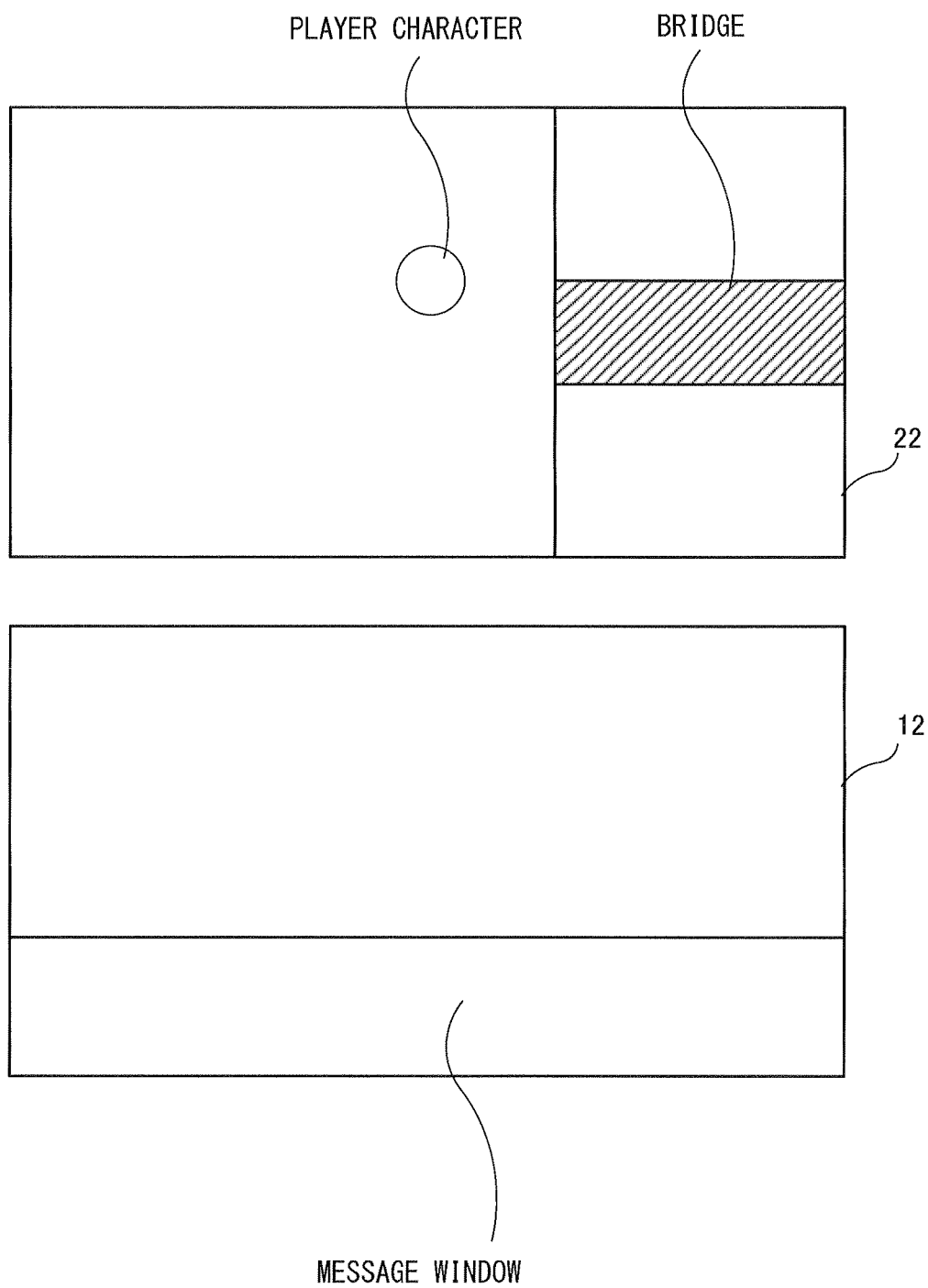
FIG. 27 illustrates an example of a game screen assumed in this embodiment.

Further, as indicated in FIG. 27, when the player character is moved outside the bridge, the process of searching for another game apparatus will discontinue. For example, if a player does not request a connection with another player displayed in the message window in the screen illustrated in FIG. 25, s/he can discontinue the connection process with the other player by quickly moving the player character outside the bridge.

Here, a screen displayed in the multi play mode will be described. On the game apparatus A on the penetrating side, the game world is displayed in a monochrome screen, and a character operated by the player B as described above is also displayed as appropriate on the game screen. On the other hand, on the game apparatus B of the player B, i.e., the penetrated side, a game screen is displayed as normal, and a player character operated by the player A is displayed therein as appropriate.

In this embodiment, the player A on the penetrating side is given a task called an "penetration mission" in a game, and to achieve the penetration mission is the main aim of the player A on the penetrating side. Examples of the penetration mission will be described below. First of all, an aim of the penetration mission is that the character of the player A on the penetrating side is spoken to by the character of the player B on the penetrated side. In this embodiment, if the character operated by the player A stands close to and faces the character operated player B, the character of the player A can be spoken to by the character of the player B. In this embodiment, an appearance of the character of the player A, the penetrating side, changes into a monster. If the character of the player B speaks to the monster, the player A can achieve the aim of the given penetration mission. If the player A has achieved the aim of the penetration mission, the player A will obtain a predetermined bonus in the game.

Further, as another example of the penetration mission, an aim of the penetration mission is that the player A hides a predetermined item within the game world of the player B while trying not to be spoken to by the player B, the penetrated side. In this case as well, the appearance of the character of the player A, the penetrating side, changes into a monster, and the character moves around in the game world of the player B with such an appearance. If the character of the player A has hidden the predetermined item at a specified place without being spoken to by the character of the player B, the player A can achieve the aim of the penetration mission. The item hidden like this can be available to the player B thereafter (after the end of the multi play mode or the like). In this case, a message from the player A can be included in the item.

Further, as another example, an aim of the penetration mission is that the character of the player A speaks to the character of the player B. Another aim of the penetration mission is that the character of the player A challenges the character of the player B to a battle, and actually fights a battle with it.

Further, as another example, an aim of the penetration mission is that the character of the player A speaks to the character of the player B which is fighting a battle. Here, if the character of the player B is fighting a battle, a battle mode screen is displayed on the game apparatus B. On the other hand, on the game apparatus A, an icon indicating that the character of the player B is fighting a battle is displayed on or near the character operated by the player B. Display of this icon makes the player A on the penetrating side notice that the character of the player B on the penetrated side is currently fighting a battle. Therefore, in this penetration mission, if the character of the player A approaches and speaks to the character of the player B on or near which the icon is displayed, the aim of the penetration mission can be achieved. On the game apparatus B, a predetermined process is performed such that when the player B is spoken to, the game develops advantageously to the player B (e.g., the character of the player A is displayed on the battle mode screen, and the character of the player B recovers the hit points).

In this manner, in this embodiment, a player of a game apparatus can establish a connection for a local communication with a game apparatus of another player on the penetrated side, within a range where communication is possible therebetween (a game apparatus of another player who is present relatively nearby, since the local connection is based on the short-distance communication), without allowing the player on the penetrated side to perform an operation for acceptance, connection, or the like on the game apparatus (on the penetrated side). Accordingly, for example, the player on the penetrated side can anticipate someone's penetration without the knowledge of the player. Thus, the player can obtain a new play sensation with a game which is played on a stand-alone game apparatus. In addition, from the viewpoint of the penetrating side, for example, the player can interfere with the game world of another player without the knowledge of the other player, thereby to surprise the other player. That is, the player on the penetrating side can also obtain a new sensation with a game which is played on a stand-alone game apparatus.

It should be noted that, in this embodiment, the local connection will be disconnected when a predetermined period of time has elapsed after the communication is established (e.g., three minutes). In other words, the player A is required to achieve the penetration mission within the predetermined period of time. Further, if the player B moves, for example, and the game apparatus B moves outside the range of the local communication with the game apparatus A, the local connection discontinues even before the predetermined period of time elapses. As a result, the penetration mission ends in failure.

Further, in this embodiment, the local connection can be made among up to three game apparatuses. Hereinafter, description will be made on the connection mode and game progress in the case where the players A and B, and the player C are connected to one another. As an example, a case will be assumed where the player A (game apparatus A) and the player B (game apparatus B) have established a local connection, and the player A is yet to start the penetration mission. In this state, it will be assumed that the player C (game apparatus C) enters a range communicable with the player A (game apparatus A). In this case, a local connection is established between the game apparatus A and the game apparatus C (from the viewpoint of the game apparatus A, the local connection with the game apparatus B, and the local connection with the game apparatus C are established concurrently). As a result, the player A can penetrate the worlds of the player B and the player C. In this state, it is set such that neither of the player B nor player C can enter the worlds of the other game apparatuses. For example, the game processing is set as appropriate such that characters of the players B and C cannot reach the portal region, or the bridge will not appear in their game worlds.

Here, in the following description, the player A (game apparatus A) in the above-described situation is referred to as a master (master unit), and the player B (game apparatus B) and the player C (game apparatus C) in the above-described situations are referred to as a slave (slave unit).

As described above, in the state where the local connection is established between the game apparatus A and the game apparatus B, and the local connection is also established between the game apparatus A and the game apparatus C, it will be assumed that the player A has penetrated the game world of the player B, and accepted the penetration mission. That is, it will be assumed that the player A becomes ready to start the penetration mission. At that time, the player C is notified that the player A is to start the penetration mission in the game world of the player B. Further, the player C is inquired of whether to join the mission. If the player C decides to join the penetration mission, a scene is displayed in the game screen on the game apparatus C where a character operated by the player C makes a space warp to the world of the player B. In the game screen on the game apparatus C, a screen is then displayed where the character operated by the player C has penetrated the world of the player B, and the character is displayed together with the character operated by the player A (in some cases, the character operated by the player B is also displayed). At that point of time, the player B is yet to notice the penetration by the players A and C.

Thereafter, the penetration mission by the players A and C starts. In this case, if one of them has achieved the penetration mission, the other is considered to have failed in the penetration mission. Hereinafter, the penetration mission performed by a plurality of players like this is sometimes referred to as a multiplayer penetration mission. Meanwhile, the penetration mission performed by the player A only is sometimes referred to as a single player penetration mission.

If the multiplayer penetration mission takes place, the communication between the game apparatus B and the game apparatus C is performed by transmitting and receiving various data therebetween via the game apparatus A. That is, the game apparatus A functions as a relay device in this case. For example, operation data indicating an operation performed by the player C using the game apparatus C is transmitted to the game apparatus A, and transmitted from the game apparatus A to the game apparatus B (with operation data indicating an operation by the player A added thereto). These pieces of data are then processed as appropriate on the game apparatus B. In this case, if any one communication is disconnected (e.g., if communication between the players A and B is disconnected), the other communication is also disconnected (i.e., communication between the players A and C is also disconnected).

Figure 28:
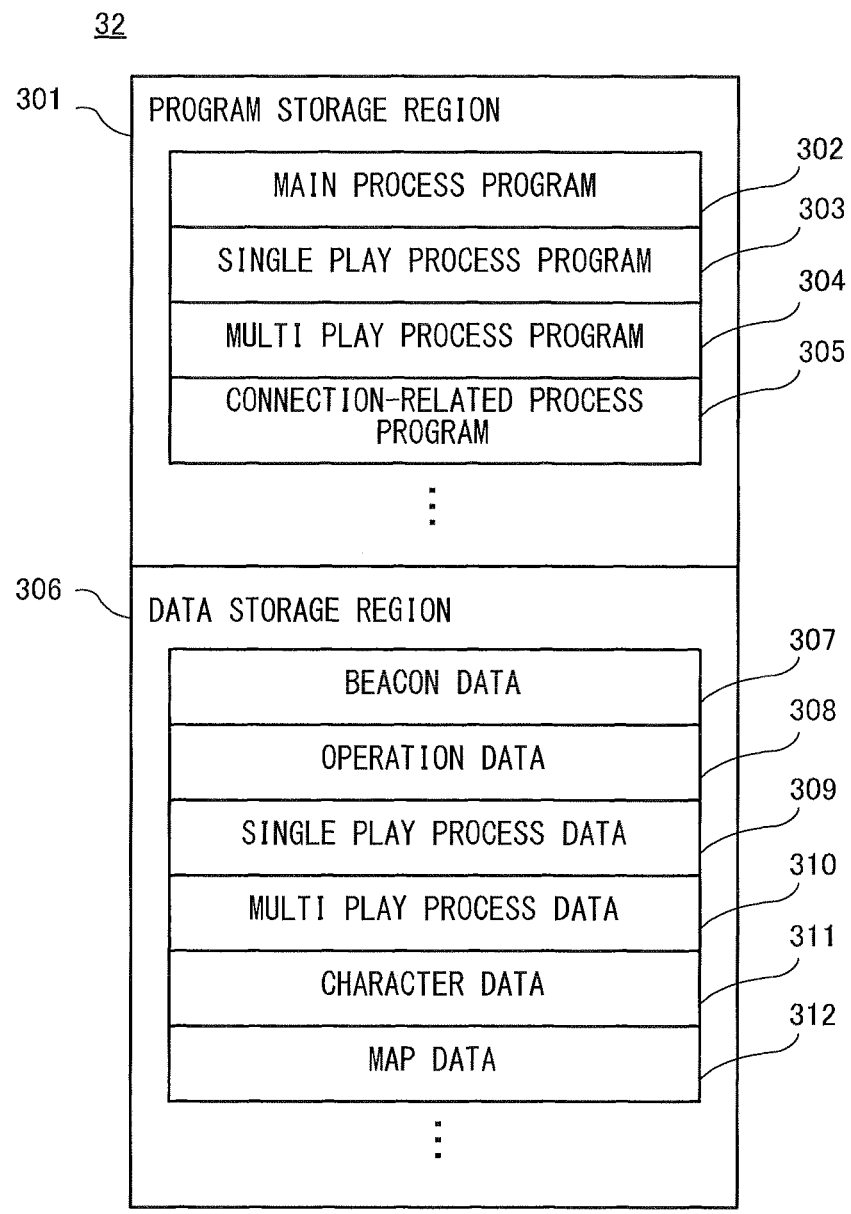
FIG. 28 shows a memory map of a main memory 32 of the game apparatus 1.

Next, the game processing executed on the game apparatus 1 will be described in detail. To begin with, data stored in the main memory 32 during the game processing will be described. FIG. 28 is a diagram showing a memory map of the main memory 32 of the game apparatus 1. In FIG. 28, the main memory 32 includes a program storage region 301 and a data storage region 306. Data in the program storage region 301 and data in the data storage region 306 are stored in a memory card 28 and transferred to be stored in the main memory 32 at execution of game programs.

The program storage region 301 stores therein various game programs executed by the CPU 31, and the game programs are composed of a main process program 302, a single play process program 303, a multi play process program 304, a connection-related process program 305, and the like.

The main process program 302 is a program for processes shown in a flowchart in FIG. 33 to be described later. The single play process program 303 causes the CPU 31 to execute processes in the single play mode, and the multi play process program 304 causes the CPU 31 to execute processes in the multi play mode. In addition, the connection-related process program 305 is a program for communication-related processes performed in this embodiment such as a process relating to a local communication with another game apparatus.

The data storage region 306 stores therein beacon data 307, operation data 308, single play process data 309, multi play process data 310, character data 311, map data 312, and the like.

FIG. 29 is a diagram indicating in detail the beacon data 307. The beacon data 307 includes common transmission data which is transmitted in common regardless of the types of the games (game programs), and individual transmission data which varies depending on the types of the games. In this embodiment, the common transmission data and the individual transmission data indicated in FIG. 29 are broadcast as beacons.

Here, details of the common transmission data used for a multi play mode process to be described later will be described specifically. To begin with, values are set in a "game service ID" to indicate for which processes in the game processing the details of beacons are to be used (purpose of use). In the example of this embodiment, the values are set to indicate whether the beacons are to be used for processes in the "single play mode" or the processes in the "multi play mode". Values are further set in the item of a "beacon type" so as to minutely classify the details of the beacons. That is, the "game service ID" is broad classification of the purpose of use of the beacons, whereas the "beacon type" is minute classification of the purpose of use of the beacons.

The "number of current participants" is data indicating the number of current participants in the case where a multiplayer play is performed using a local communication. In this embodiment, the number of current participants mainly indicates the number of participants in the "multi play mode". For example, if the player A is penetrating the world of the player B, the number of current participants is "two", and if the player C also joins the penetration mission, as described above, the number is "three".

A "maximum number of participants" is data indicating the maximum allowable number of players to participate in the multiplayer play. In this embodiment, up to three game apparatuses can be connected to one another concurrently in the "multi play mode", and thus the "maximum number of participants" is "three".

An "error status" is data indicating the details of a communication error when such a communication error occurs.

The "beacon type" is data indicating minute classification of the purpose of use of the beacons that have been broadly classified in the "game service ID". For example, if the "game service ID" indicates the use for processes in the "multi play mode", the following data is set as the "beacon type": "request for connection with another game apparatus"; "request for a connection establishment"; "request for disconnection"; "game details notice data"; "operation data (on another game apparatus or on its own game apparatus)"; and the like.

A "game apparatus type" is data indicating the type of a game apparatus that transmits beacons, and for example, whether the game apparatus is the "parent unit" or the "slave unit" is set as the type.

With reference back to FIG. 28, the operation data 308 is data indicating the details of the operation performed by a player on the game apparatus 1. The operation data 308 includes touch coordinate data indicating touch coordinates detected on the touch panel 13, operation button data indicating whether the operation buttons 14 are in pressed states.

Figure 30:
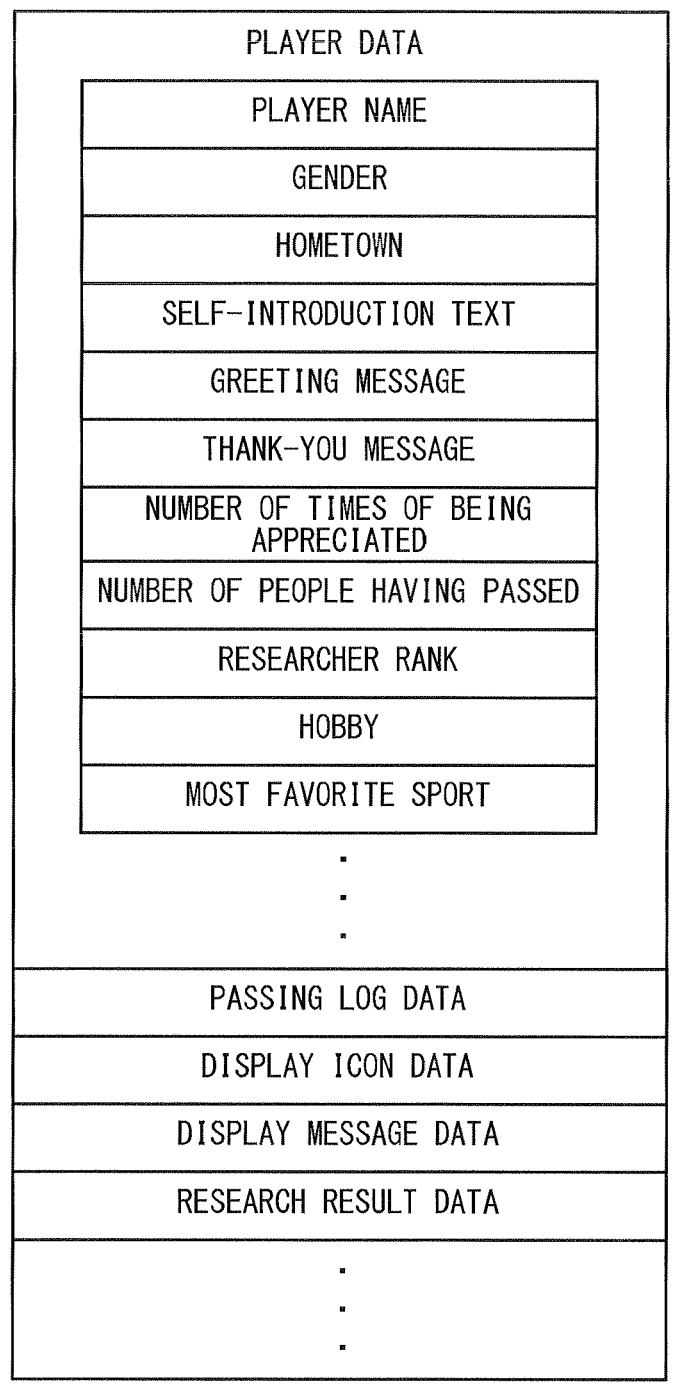
FIG. 30 shows in detail single play process data.

FIG. 30 is a diagram indicating in detail the single play process data 309. The single play process data 309 includes player data, passing log data, display icon data, display message data, research result data, and the like.

Data such as "player name", "gender", "self-introduction message", "greeting message", "thank-you message", "hobby", "favorite sport" included in the player data may be inputted, by the player by means of the touch panel 13 or the like, at the beginning of the game, or when the game progresses to some degrees and a predetermined condition is satisfied (e.g., when a character of the player has spoken to a certain non-player character in the game world).

Figure 31:
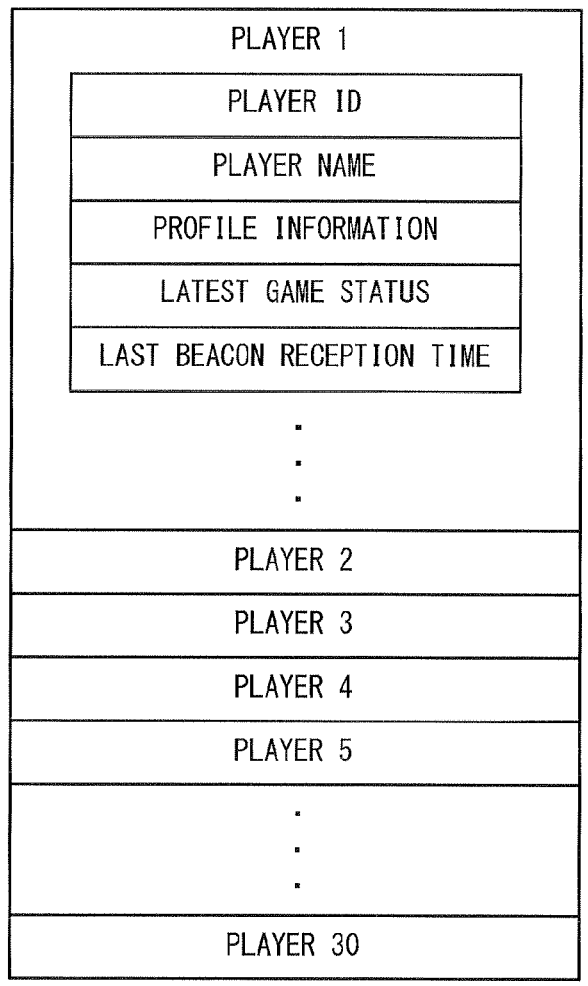
FIG. 31 shows in detail passing log data.

The passing log data enables display of the other player list image indicated in FIG. 5, and accumulates therein information on other players acquired over beacons from other game apparatuses 1. FIG. 31 shows in detail the passing log data. The passing log data includes information on up to 30 players. When information on a new player is acquired, information on the oldest player is deleted, and the information on the new player is added to the passing log data. A "player ID" is an identifier to identify players. The "profile information" is information necessary for generating an image indicated in FIG. 9. "Latest game status" and "last beacon reception time" are information necessary for generating an image indicated in FIG. 10.

The display icon data and display message data correspond to icons and messages indicated in FIG. 7.

The research result data is accumulation of data collected through the time-based research and the number of subjects-based research indicated in FIG. 21 (i.e., data relating to tastes of other players which are acquired over beacons from other game apparatuses 1).

Figure 32:
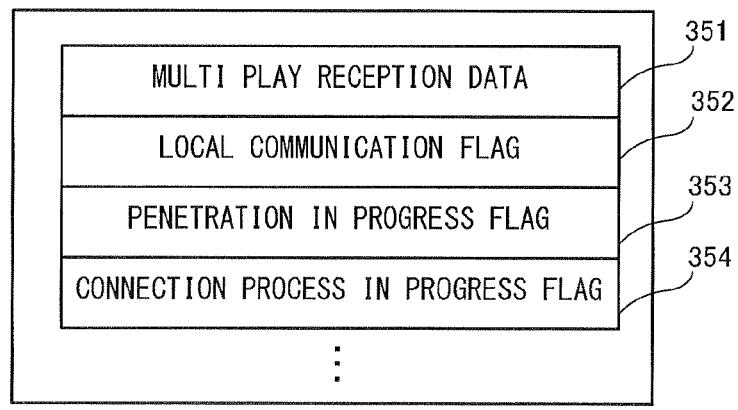
FIG. 32 shows an example of data structure of multi play process data 310.

With reference back to FIG. 28, the multi play process data 310 is data used for the processes in the multi play mode. FIG. 32 is a diagram showing an example of a data structure of the multi play process data 310. The multi play process data 310 is composed of multi play reception data 351, a local communication flag 352, a penetration in progress flag 353, a connection process in progress flag 354, and the like.

The multi play reception data 351 stores therein data received from other game apparatuses while the game apparatus 1 is in the multi play mode.

The local communication flag 352 indicates whether the game apparatus 1 is performing the local communication to be described below. In this embodiment, performing the local communication indicates the multi play mode. When the flag is set ON, it is indicated that the local communication is being performed, whereas when the flag is set OFF, it is indicated that the local communication is not being performed.

The penetration in progress flag 353 indicates whether a player is currently penetrating the game world of another player. When the flag is set ON, the player is penetrating the game world of another player.

The connection process in progress flag 354 indicates whether the connection process is being currently performed. That is, the flag is used for determination of whether a game apparatus 1 is in a state where it has made a connection request, and a local communication connection is to be actually established.

With reference back to FIG. 28, the character data 311 is data of various characters used in the game processing according to this embodiment. The map data 312 is data used for constructing a game world of the game according to this embodiment.

In addition, data necessary for game processing such as sound data and the like is also stored in the main memory 32.

Next, with reference to FIGS. 33 to 40, a flow of the game processing performed on the game apparatus 1 will be described. FIG. 33 is a flowchart showing the flow of the game processing performed on the game apparatus 1.

To begin with, in step S1, the CPU 31 executes a process of initializing data to be used in the subsequent processes. Further, the CPU 31 constructs a game world. A game image representing the game world is generated and displayed as appropriated on the upper LCD 22 and the lower LCD 12. Thereafter, a process loop from the steps S2 to S10 is repeated at a predetermined cycle (e.g., 1/30 sec., or 1/60 sec., which is a frame rendering cycle), and thereby the game progresses.

Next, in step S2, the CPU 31 reads the operation data 308 stored in the main memory 32.

Next, in step S3, the CPU 31 determines whether the current mode of the game processing is the multi play mode. That is, whether the local communication flag 352 is set ON is determined. If the local communication flag 352 is set ON, the CPU 31 determines that the current mode is the multi play mode. As a result of the determination, if the current mode is the multi play mode (YES in step S3), the CPU 31 performs the multi play process in step S7. On the other hand, if the current mode is not the multi play mode (NO in step S3), the CPU 31 performs the single play process in step S4.

Figure 34:
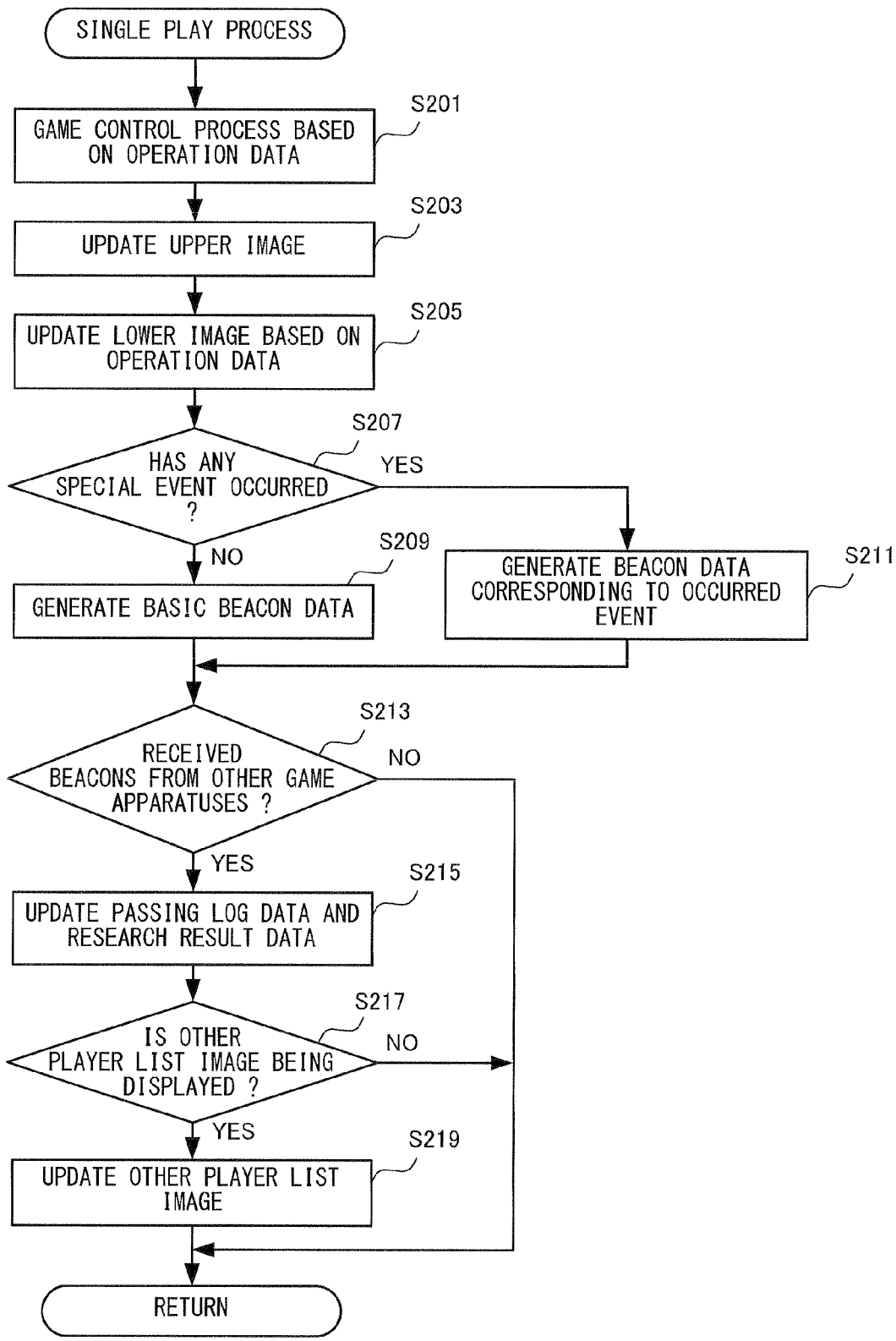
FIG. 34 is a flowchart showing in detail a single play process shown in step S4 in FIG. 33.

FIG. 34 is a flowchart showing in detail the single play process in step S4. To begin with, in step S201, the CPU 31 acquires operation data based on signals from the operation buttons 14 and the touch panel 13, and performs a game control process based on the operation data. Examples of the game control process include, for example, to move a player character based on operations performed with the operation buttons 14, or to cause a monster accompanying with a player character to fight a battle with a wild monster.

In step S203, the CPU 31 updates, based on the result of the game control process, a game image (hereinafter referred to as an upper image) which is stored in a frame buffer (not shown) and is to be displayed on the upper LCD 22.

In step S205, the CPU 31 updates, based on the operation data, an image (hereinafter referred to as a lower image) which is stored in the frame buffer (not shown) and is to be displayed on the lower LCD 12. This means, for example, a change from a lower image shown in FIG. 4 to a lower image shown in FIG. 5.

In step S207, the CPU 31 determines whether a specific event has occurred. If the specific event has occurred, the processing proceeds to step S211, whereas if not, the processing proceeds to step S209. The specific event is such an event to be noticed to other players who play games nearby, and for example includes the following events.

Start of a battle with a wild monster.
Winning a battle with a wild monster.
Capture of a wild monster.
Increase in the level of the mate monster.
Activation of a special power by the player.
Play time exceeding a required time (10 hours, 30 hours, 50 hours, 100 hours).
Instruction by the player to transmit a thank-you message.
Decrease of the strength of the mate monster to half or less of the maximum power.
Instruction by the player to transmit a quick word message.

In step S209, the CPU 31 generates basic beacon data. The basic beacon data is data constantly outputted over beacons in the single play mode, and for example includes information such as player ID, player name, greeting message, and the like.

In step S211, the CPU 31 generates beacon data corresponding to the generated event. For example, the generated event indicates the "start of a battle with a wild monster", the CPU 31 generates beacon data while adding thereto the identifier of the event, the name of the wild monster or the like.

In this embodiment, in accordance with the type of the generated event, beacon data corresponding to the event is repeatedly transmitted during a transmission period (transmission life) preliminarily set according to the type of the event. For example, if the generated event indicates the "start of a battle with a wild monster", the beacon data corresponding to the event is transmitted repeatedly for 10 seconds after the event is generated, whereas if the generated event indicates the "activation of a special power by the player", the beacon data corresponding to the event is transmitted repeatedly for 20 seconds after the event is generated. In this manner, since beacons notifying generation of a certain event are transmitted a plurality of numbers of times, another game apparatus is less likely to fail to receive the beacons. Accordingly, an event generated by a certain game apparatus can be securely notified to a player of another game apparatus.

The beacon data, which is serially repeatedly transmitted for a predetermined period of time according to the generated event, includes common identification information ("transmission number" in FIG. 19). The transmission number is incremented each time a new event to be notified to other players is generated. Accordingly, game apparatuses can identify whether a plurality of beacon signals received from another game apparatus indicate a part of the beacon data notifying generation of a single event, or notifying generation of a plurality of events generated at different times. Therefore, even when a series of beacons notifying generation of a single event (e.g., the event indicating the "increase in the level of the mate monster" are received, it is possible to prevent the message window P14 notifying generation of the event from being displayed a plurality of numbers of times as if the event was generated the plurality of numbers of times. The process like this (beacon cancellation process) will be described below in detail with reference to the flowchart shown in FIG. 44.

Further, in this embodiment, priority is preliminarily set depending on the types of the events. For example, the event indicating the "start of a battle with a wild monster" has a "low" priority, whereas the event indicating the "activation of a special power by the player" has a "high" priority. In addition, while beacon data corresponding to a certain event is repeatedly transmitted for a predetermined period of time, if an event having the same or higher priority than the certain event is generated, transmission of the beacon data corresponding to the former event (certain event) is cancelled, and beacon data corresponding to the later generated event is transmitted preferentially. Meanwhile, while beacon data corresponding to a certain event is repeatedly transmitted for a predetermined period of time, if an event having a lower priority than the certain event is generated, the beacon data corresponding to the certain event is continuously preferentially transmitted. Accordingly, information of high importance (or of great interest) for other players will be notified preferentially to the other players.

In step S213, the CPU 31 determines whether the game apparatus has received beacons from another game apparatus. If it has received beacons, the processing proceeds to step S215, if not, the single play process ends.

In step S215, the CPU 31 updates the passing log data and the research result data (see FIG. 30), based on the beacon data included in the received beacons.

In step S217, the CPU 31 determines whether the other player list image is being displayed on the lower LCD 12. If the other player list image is being displayed, the processing proceeds to step S219, whereas if not, the single play process ends.

In step S219, the CPU 31 updates the other player list image displayed on the lower LCD 12, based on the passing log data updated in step S215. This means, for example, a change from the lower image shown in FIG. 5 to a lower image shown in FIG. 6. Upon completion of the process in step S219, the single play process ends.

With reference back to FIG. 33, after the process in step S4, the CPU 31 performs in step S5 a master unit-side connection process. The process is performed when the game apparatus is a master unit (penetrating side). If the above-described example is used, the process is mainly performed by a game apparatus in the situation of the game apparatus A. That is, as shown in FIG. 24, the process is performed when the player character reaches the bridge (gate region), and is performed to attempt a local connection with another game apparatus.

Figure 35:
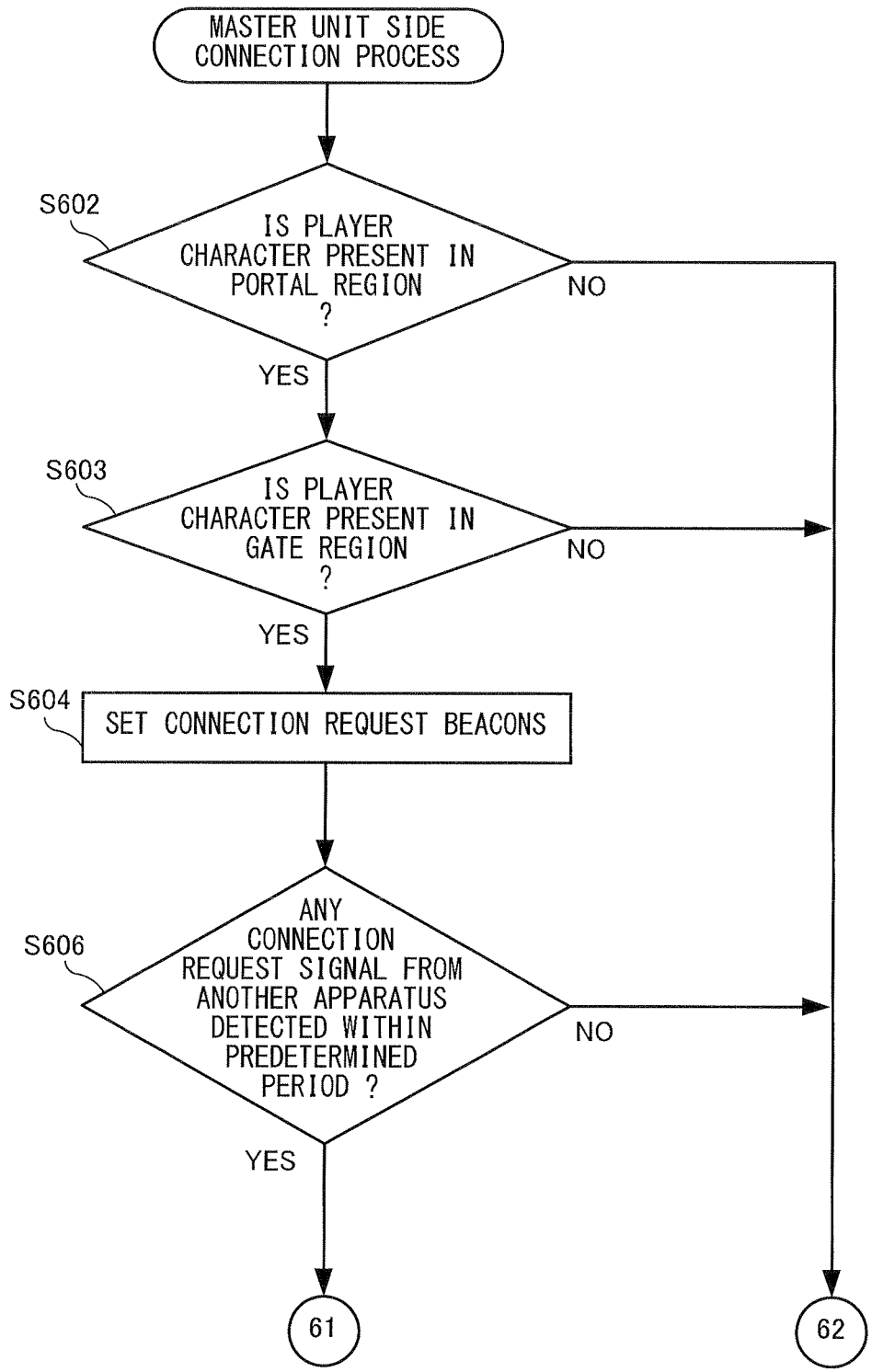
FIG. 35 is a flowchart showing in detail the first half of a master unit-side connection process shown in step S5 in FIG. 33.
Figure 36:
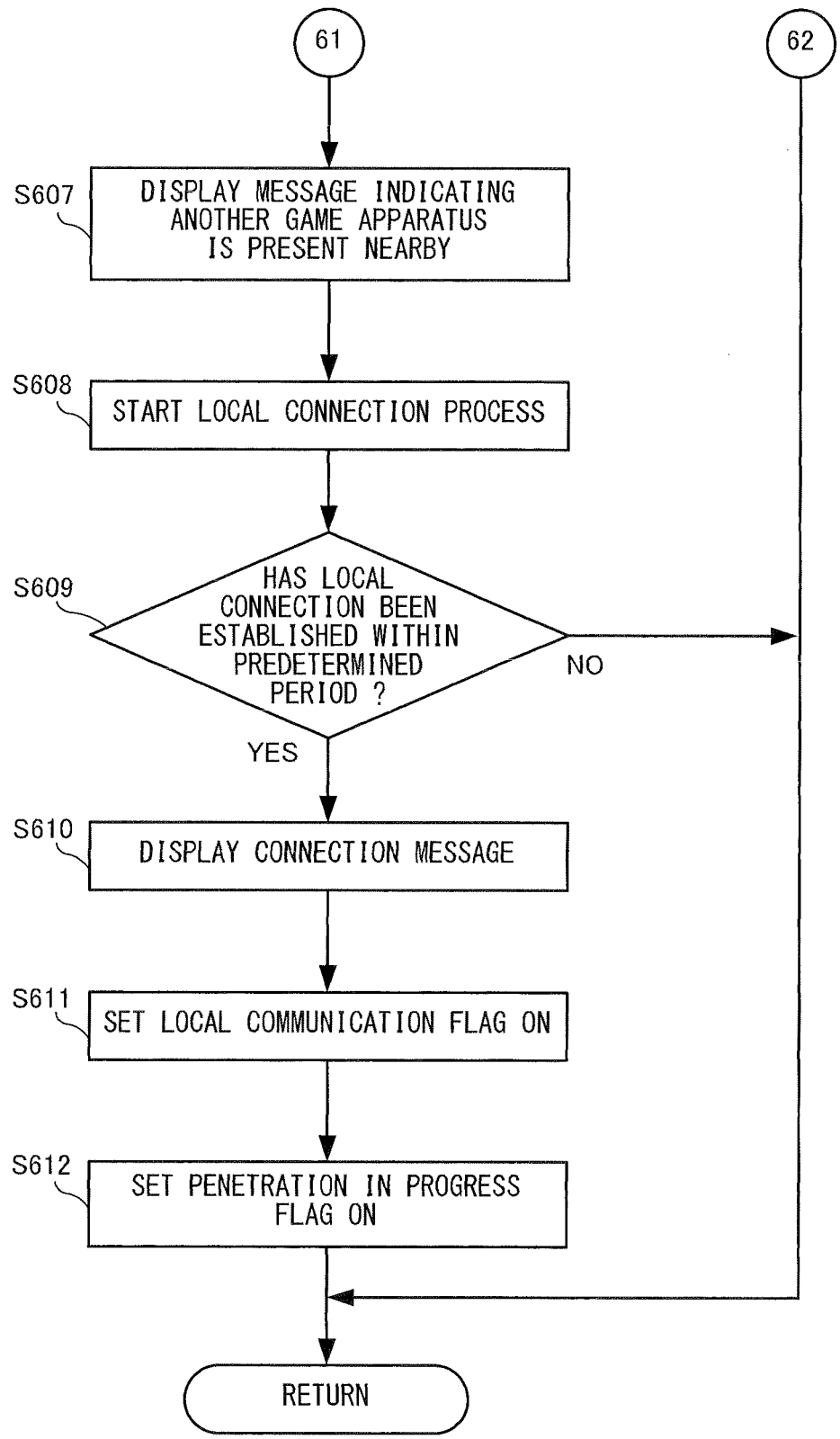
FIG. 36 is a flowchart showing in detail the second half of the master unit-side connection process shown in step S5 in FIG. 33.

FIGS. 35 to 36 each show a flowchart showing in detail the master unit-side connection process in step S5. As shown in FIG. 35, in step S602, the CPU 31 determines whether a player character is present within the portal region. As a result, if the CPU 31 determines that the player character is not present within the portal region (NO in step S602), the CPU 31 ends the master unit-side connection process.

On the other hand, if the CPU 31 determines that the player character is present within the portal region (YES in step S602), the CPU 31 next determines in step S603 whether the player character is present in the gate region (the bridge in FIG. 24). As a result, when the CPU 31 determines that the player character is not present (NO in step S603), the CPU 31 ends the master unit-side connection process.

On the other hand, if the CPU 31 determines that the player character is present in the gate region (YES in step S603), the CPU 31 then changes in step S604 the details of the beacon data 307 from the beacon details shown in FIG. 29 to beacon details including information indicating a request for connection with another game apparatus (which is not shown). Hereinafter, the changed beacons are referred to as connection request beacons. The connection request beacons having been changed like this are to be broadcast in the beacon output process in step S6 to be described later. As the details of the connection request beacons, the following data is set to the common transmission data shown in FIG. 29. To begin with, a value indicating "multi play data" is set to the "game service ID. In addition, a value indicating "penetration to another game apparatus" is set to the "beacon type". Further, information necessary for establishing a local connection such as information for identifying the game apparatus 1 itself (address information) is included in the connection request beacons, although not shown. Another game apparatus 1 having received the connection request beacons is to return a connection request signal for establishing a local connection if the other game apparatus 1 satisfies a predetermined condition (connection condition) (a slave unit-side connection process to be described later).

Next, in step S606, the CPU 31 determines whether the connection request signal for establishing a local connection, which is a response to the connection request beacons, is detected within a predetermined period of time. As a result, if the connection request signal from the other game apparatus 1 is not detected within the predetermined period of time (NO in step S606), the CPU 31 ends the penetrating side connection process. In this case, a message indicating that no other game apparatus connectable is present near the game apparatus 1 may be displayed on the message window.

On the other hand, as a result of the determination in step S606, if the connection request signal is detected within the predetermined period of time (YES in step S606), the CPU 31 displays in step S607 a message indicating that another game apparatus is present near the game apparatus 1. In the subsequent step S608, the CPU 31 starts a process for establishing a local connection. Next, in step S609, the CPU 31 determines whether a local connection has been established within a predetermined period of time. As a result, if the local connection has failed to be established within the predetermined period of time (NO in step S609), the CPU 31 ends the penetrating side connection process. In this case, a message indicating that a connection has failed to be established may be displayed on the message window.

On the other hand, when a local connection has been established within the predetermined period of time (YES in step S609), the CPU 31 displays in step S610 a message indicating that a connection has been established on the message window. Further, in step S611, the CPU 31 sets the local communication flag 352 ON. In this manner, upon establishment of the local connection between the game apparatuses 1, positional information of characters operated by the players within the respective game worlds, or information indicating the states of the respective characters (whether they are in a battle, or the like) is transmitted/received therebetween. Next, in step S612, the CPU 31 sets the penetration in progress flag 353 ON. Thereafter, the master unit-side connection process ends.

With reference back to FIG. 33, subsequently to the process in step S5, the CPU 31 performs in step S6 the beacon output process. The process is to output via a local communication module, beacons including the beacon data 307, based on the beacon data 307 which is generated in step S4 or which is changed in step S5.

Figure 37:
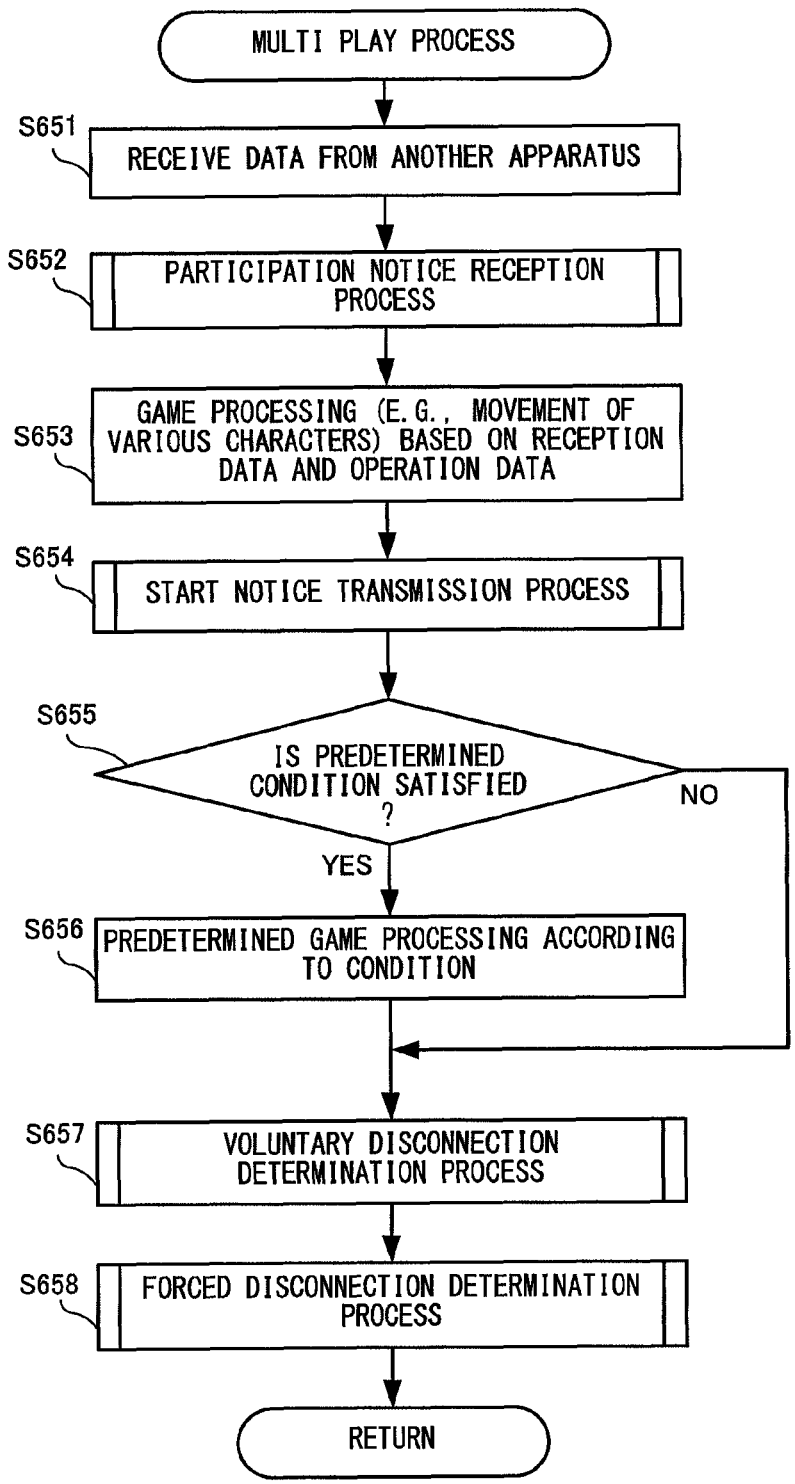
FIG. 37 is a flowchart showing in detail multi play process shown in step S8 in FIG. 33.

Next, a multi play process in step S7 will be described. FIG. 37 is a flowchart showing in detail the multi play process in step S7. In this process, mainly performed is a process of reflecting operations or the like of characters operated by other players, based on the positional information of the characters and data indicating the state of the characters which are transmitted from other game apparatuses with which a local connection have been established.

In FIG. 37, the CPU 31 firstly receives in step S651 data transmitted from the other game apparatus, and stores the data into the multi play reception data 351. The data indicates the positional information of the player character or the like operated by the other player of the other game apparatus and the state of the character.

Next, in step S652, the CPU 31 performs a participation notice reception process. This process is performed on the game apparatus C when it is to receive a notice of mission participation from the game apparatus A, under a state where a local connection is established among three of the game apparatuses A, B, and C, and they are in the multi play mode.

Figure 42:
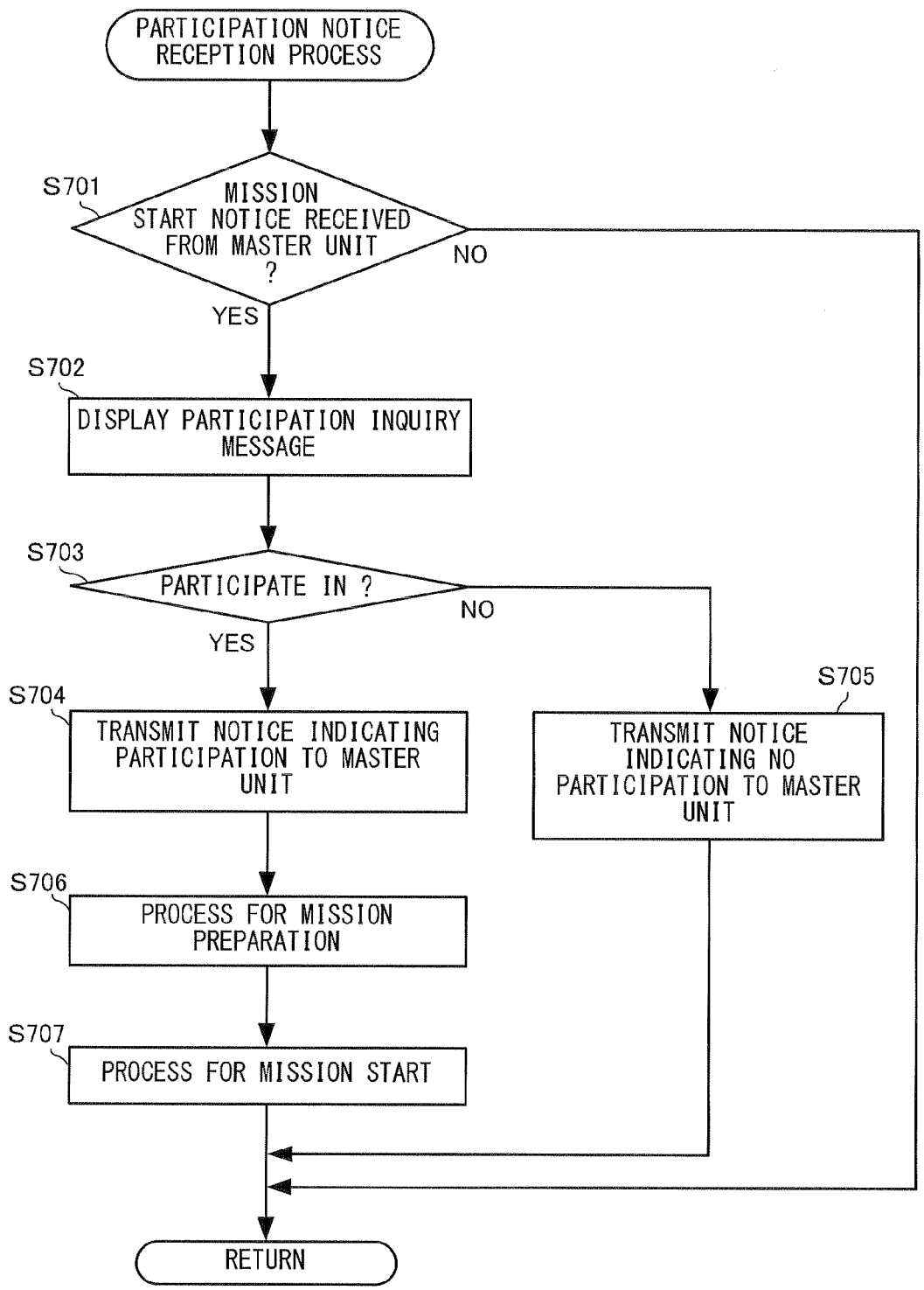
FIG. 42 is a flowchart showing in detail a participation notice reception process shown in step S652 in FIG. 37.

FIG. 42 is a flowchart showing in detail the participation notice reception process in step S652. As shown in FIG. 42, the CPU 31 refers in step S701 to beacons having received most recently to determine whether it has received a mission start notice (to be described below) transmitted from the master unit (the game apparatus A in the above example). As a result, if the mission start notice is yet to be received (NO in step S701), the participation notice reception process ends.

On the other hand, when the mission start notice is received (YES in step S701), the CPU 31 displays on the screen, in step S702, a message indicating that a penetration mission is to start on the master unit side and a message inquiring about whether the player C is to participate in the penetration mission. Next, in step S703, the CPU 31 determines whether the response of the player C to the inquiry indicates participation in the penetration mission. As a result, if the response indicates participation (YES in step S703), the CPU 31 transmits in step S704 a notice indicating participation in the penetration mission to the master unit (game apparatus A in this case). Next, in step S706, the CPU 31 performs a process of preparing for the penetration mission by appropriately performing communication with the master unit. For example, the CPU 31 performs a process of, for example, rendering a space warp to the game world of the player B, and also performs, for example, a process of synchronizing operations on the game apparatus C with those on the game apparatus A, whereby preparing for starting a multiplayer penetration mission together with the player A. At this time, the CPU 31 sets the penetration in progress flag 353 ON. This is because the character of the game apparatus C is to penetrate the game world on the game apparatus B.

Next, in step S707, the CPU 31 starts the penetration mission. Thereafter, the process relating to the penetration mission is performed by transmitting/receiving operation data as appropriate to/from the master unit (game apparatus A).

On the other hand, if the response indicates no participation as a result of the determination in step S703 (NO in step S703), the CPU 31 transmits in step S705 a notice indicating that the apparatus C will not participate in the penetration mission to the master unit. Thereafter the participation notice reception process ends.

With reference back to FIG. 37, next in step S653, the CPU 31 performs, based on the multi play reception data 351 and the operation data 308 of each game apparatus, various processes such as movement of various characters, a battle process, and various game processing in the multi play mode (a process for the penetration mission in the case of the master unit and the slave unit which participate in the penetration mission, a process for reflecting operation data transmitted from other game apparatuses in the case of the slave unit being penetrated, and the like). Further, during the game processing, the positional information on the player character moved based on the operation by each player and the data indicating the state of the player character are transmitted among the game apparatuses as appropriate through local communication.

Next, in step S654, CPU 31 performs a start notice transmission process. The process is performed on the game apparatus A when the game apparatus A notifies to the game apparatus C of the penetration mission start thereby to inquire of the player C as to participation, under the state where a local connection is established among three of the game apparatuses A, B, and C, and they are in the multi play mode.

Figure 43:
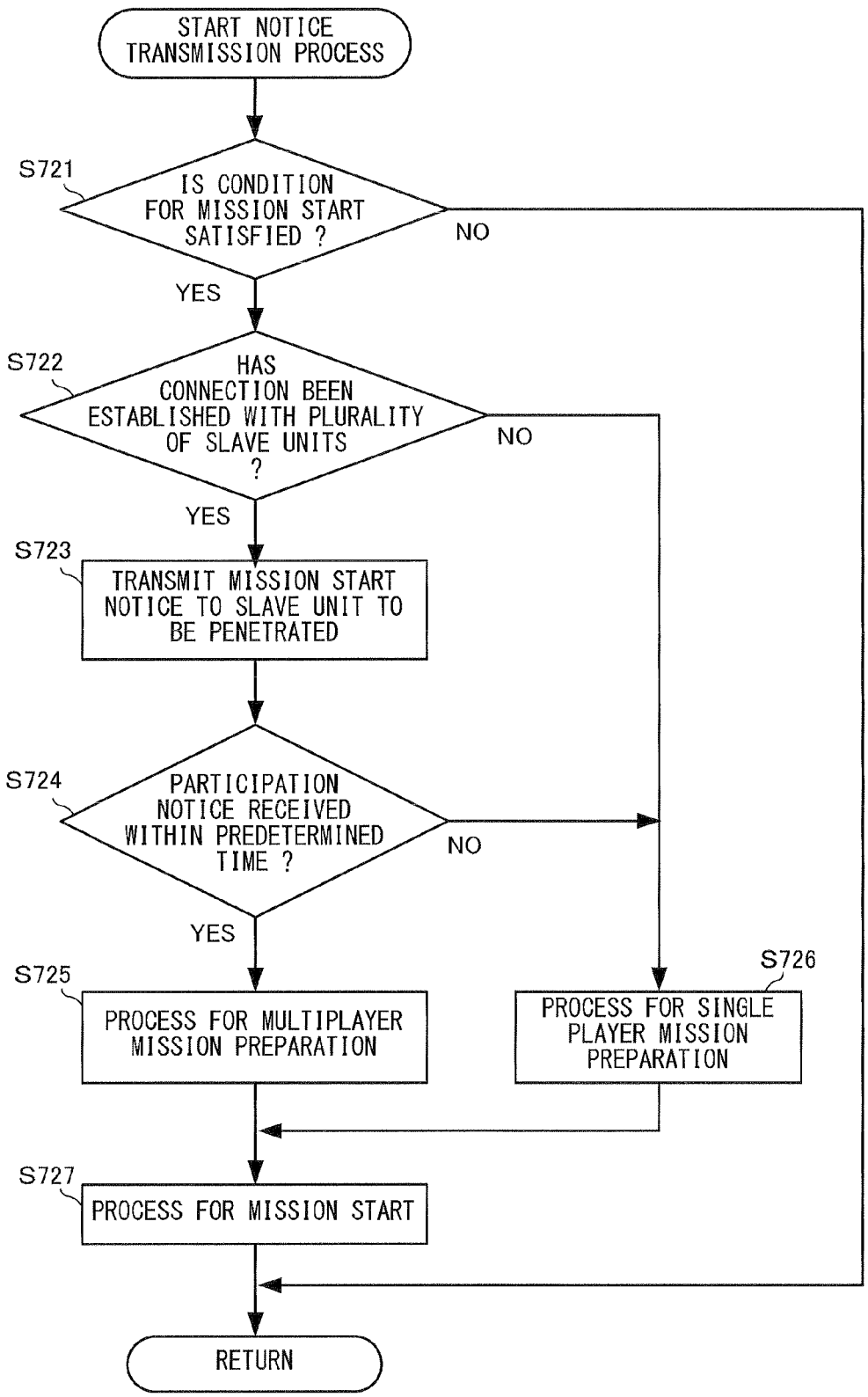
FIG. 43 is a flowchart showing in detail a start notice transmission process shown in step S654 in FIG. 37.

FIG. 43 is flowchart showing in detail a start notice transmission process in step S654. To begin with, in step S721, the CPU 31 determines whether conditions to start the penetration mission are satisfied. For example, the CPU 31 determines whether the character of the player A comes into contact with a predetermined character, and the predetermined character has accepted the penetration mission. As a result of the determination, if the conditions to start the penetration mission are not satisfied (NO in step S721), the start notice transmission process ends. On the other hand, if the conditions to start the penetration mission are satisfied (YES in step S721), the CPU 31 next determines in step S722 whether the local communication connection is established with a plurality of slave units. In the above example, the CPU 31 of the game apparatus A determines whether the local communication is established between the game apparatus A and the game apparatus B as well as between the game apparatus A and the game apparatus C. As a result, if local connection is established with the plurality of slave units (YES in step S722), the CPU 31 transmits in step S723 a penetration mission start notice (this notice is a target to be determined in step S701) to the slave unit that is not the penetrated side (in the above example, the game apparatus C).

Next in step S724, the CPU 31 determines whether a notice indicating participation in the penetration mission is received from the transmission destination (game apparatus C in this embodiment) within a predetermined period of time after transmission of the penetration mission start notice. As a result, when the notice indicating the participation (transmitted in step S704) is received within the predetermined period of time (YES in step S724), the CPU 31 performs in step S725 a process of preparing for the multiplayer penetration mission while communicating as appropriate with the slave unit which has indicated its participation. For example, CPU 31 performs a process of displaying a message of "wait for a while until the slave unit is ready, or a process of synchronizing the game apparatus A with the slave unit.

On the other hand, as a result of the determination in step S724, when the notice indicating the participation is not received within the predetermined period of time, or when a notice indicating no participation, which is transmitted in step S705, is received within the predetermined period of time (NO in step S724), the CPU 31 performs in step S726 a process of preparing for a single player penetration mission, which is to be performed by only the player of the master unit.

When the penetration mission becomes ready in step S725 or in S726, the CPU 31 performs in step S727 a process of starting the multiplayer or single player penetration mission. Thereafter, the start notice transmission process ends.

With reference back to FIG. 37, the CPU 31 determines in the step S655 whether a predetermined condition relating to the game progress is satisfied. Specifically, the CPU 31 determines whether conditions to achieve the penetration mission are satisfied (in the case of the master unit and the slave unit that have participated in the penetration mission). As a result, when the predetermined condition is satisfied (i.e., when the penetration mission has been achieved) (YES in step S655), the CPU 31 performs in step S656 game processing corresponding to the predetermined condition. Specifically, the CPU 31 performs a process of giving the player character a bonus as a reward for success in achieving the penetration mission. For example, The CPU 31 performs a process of providing a predetermined item to the player character as his/her personal belonging. On the other hand, when the predetermined condition is not satisfied (NO in step S655), the CPU 31 omits the process in step S656 since it is considered that the penetration mission is being in progress, for example.

Next, in step S657, the CPU 31 performs a voluntary disconnection determination process. This process is a process of voluntarily disconnecting the local communication performed on the game apparatus on the penetrating side (the game apparatus A or C in this example). In this embodiment, for example, when the player character reaches a predetermined region in the game world (an exit region, represented for example as a space warp point in the game), the CPU 31 inquires of the player whether to return to his/her own game world, thereby to perform the process of disconnecting the local communication. Further, the CPU 31 also performs the process of disconnecting the local communication when three minutes has elapsed after start of the local communication.

Figure 38:
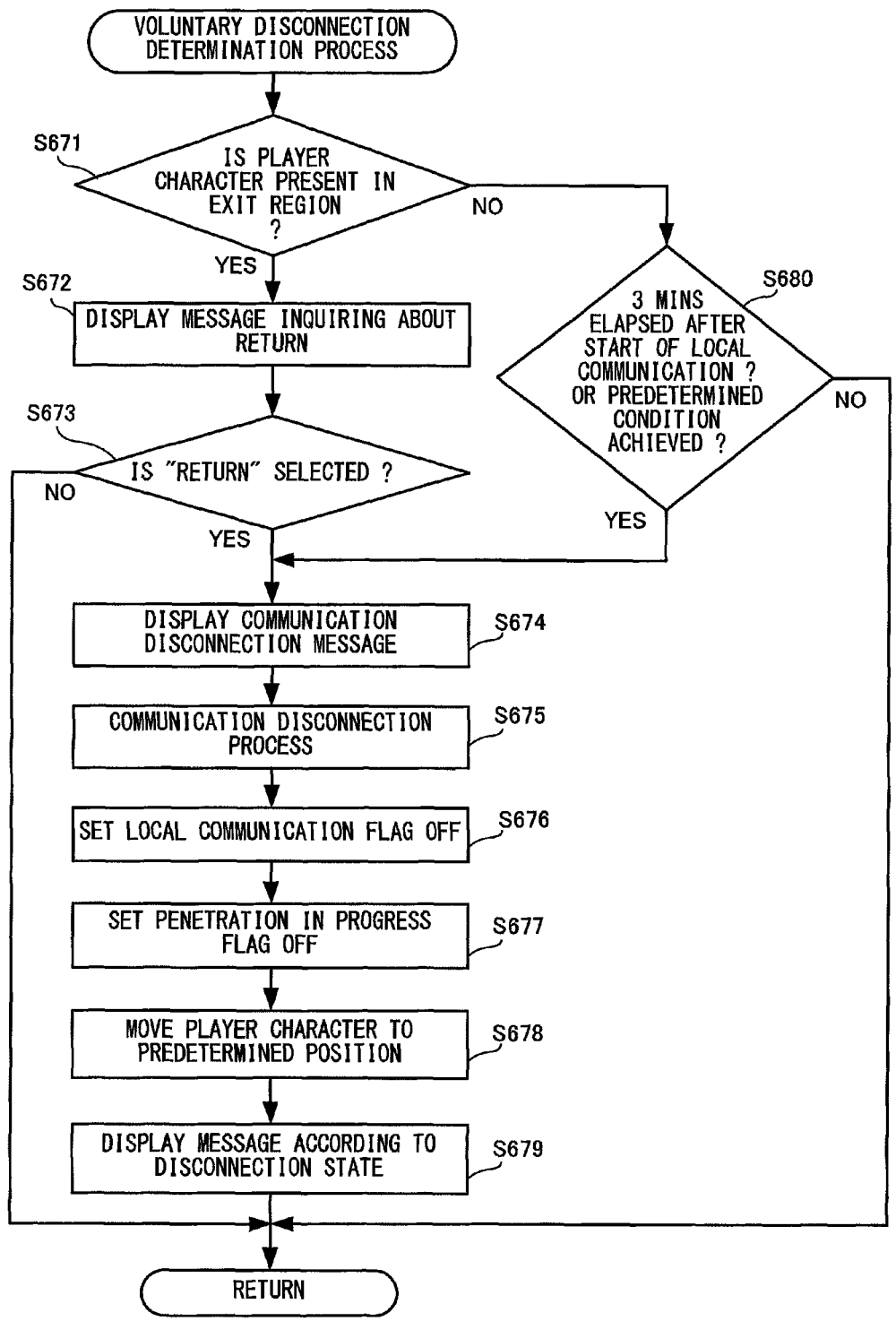
FIG. 38 is a flowchart showing in detail a voluntary disconnection determination process shown in step S655 in FIG. 37.

FIG. 38 is a flowchart showing the voluntary disconnection determination process in step S657. In FIG. 38, to begin with, the CPU 31 determines in step S671 whether the player character is present in the exit region. As a result, if the player character is not present in the exit region (NO in step S671), the CPU 31 determines in step S680 whether three minutes has elapsed after start of the local communication, or whether the predetermined condition indicated in step S655 is satisfied (whether the mission has been achieved). As a result, if none of the conditions are satisfied (three minutes is yet to elapse, and the mission is yet to be achieved) (NO in step S680), the CPU 31 ends the voluntary disconnection determination process. On the other hand, when if the three minutes has elapsed, or when the predetermined condition is satisfied (YES in step S680), the CPU 31 advances the processing to subsequent step S674, and performs a process for disconnecting the local communication.

On the other hand, as a result of the determination in step S671, when the player character is present in the exit region (YES in step S671), the CPU 31 displays in step S672 a confirmation message indicating whether to disconnect the local communication, and waits until a response thereto is inputted. The detail of the message is, for example, to inquire of the player whether to return the player character penetrating another game apparatus 1 to his/her own game world.

Next, in step S673, the CPU 31 determines whether the response to the message indicating disconnection of the local communication, for example, whether "return to the own game world" is selected. As a result, if "return to the own game world" is not selected (NO in step S673), the CPU 31 ends the voluntary disconnection determination process. On the other hand, when "return to the own game world" has been selected (YES in step S673), the CPU 31 displays in step S674 a message indicating communication disconnection. Next, in step S675, the CPU 31 performs a process of disconnecting the local communication. In subsequent step S676, the CPU 31 sets the local communication flag 352 OFF. Next, in step S677, the CPU 31 sets the penetration in progress flag 353 OFF. Further, in step S678, the CPU 31 moves the player character to a predetermined position in the game world (for example, a position at which the player character was present before penetration to the other game world).

Next, in step S679, the CPU 31 displays a predetermined message corresponding to the communication disconnection state. This process is performed to display different messages between the case of the communication disconnection which is caused by the player character's returning from the exit region and the case of the communication disconnection which is caused by the elapse of three minutes after start of the local communication. For example, when the local communication is disconnected by the player character's returning from the exit region, a message indicating "returned" is displayed, whereas when the local communication is disconnected by the elapse of three minutes, a message indicating "mission failure due to time out" is displayed. Further, when the local communication is disconnected after achievement of the penetration mission, a message indicating "mission clear" is displayed. Thereafter the voluntary disconnection determination process ends.

With reference back to FIG. 37, subsequently to step S657, the CPU 31 performs a forced disconnection determination process in step S658. This process is performed when the communication has been disconnected without anticipation by the player, e.g., when the communication has been disconnected by the other game apparatus.

Figure 39:
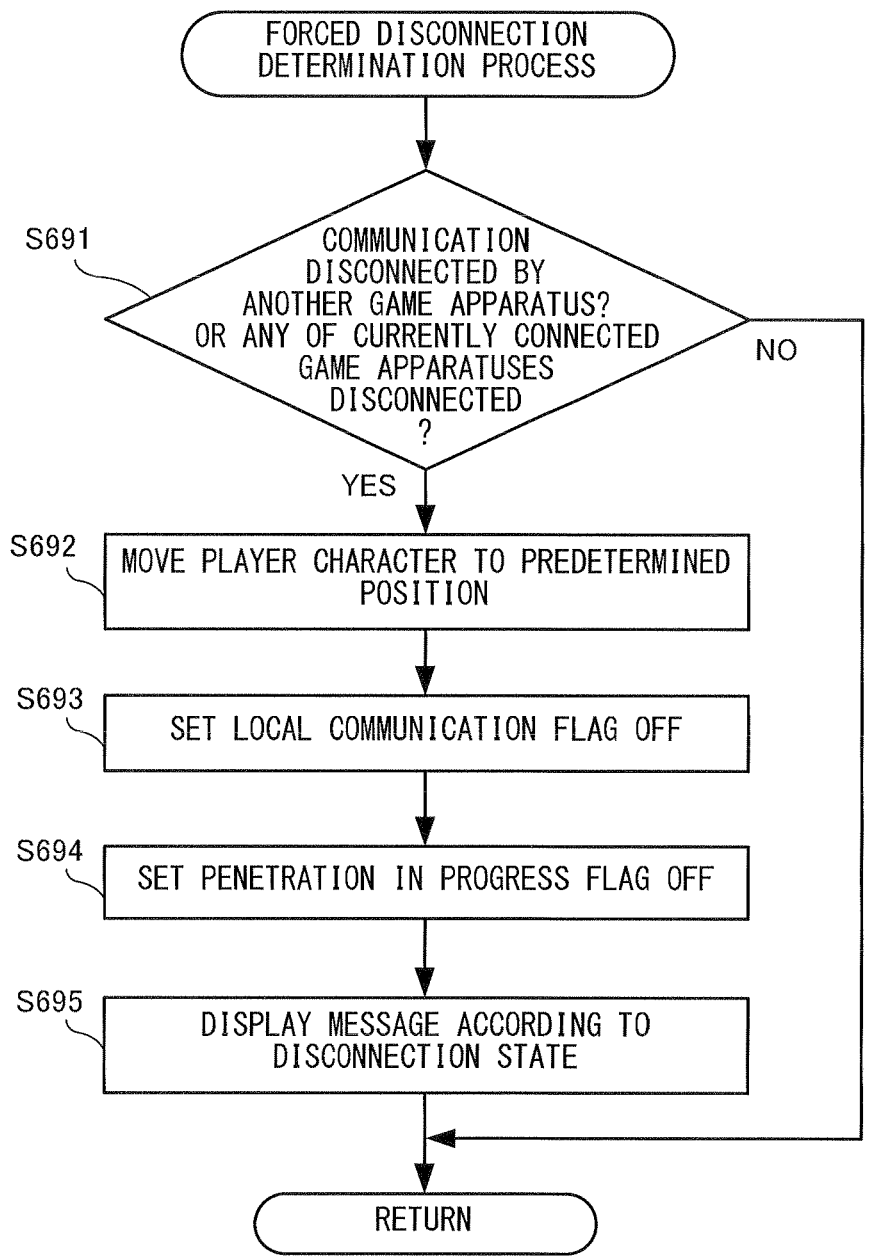
FIG. 39 is a flowchart showing in detail a forced disconnection determination process shown in step S656 in FIG. 37.

FIG. 39 is a flowchart showing in detail the forced disconnection determination process in step S658. As shown in FIG. 39, to begin with, in the step S691, the CPU 31 determines whether the communication disconnection has occurred. Specifically, in the case of the master unit, the CPU 31 determines whether the local communication is disconnected by any of the other game apparatuses on the slave unit side. Meanwhile, in the case of the slave unit, the CPU 31 determines whether the local communication is disconnected by the game apparatus on the master unit side with which a connection is established. As a result of the determination, when the local communication disconnection has not occurred (NO in step S691), the CPU 31 ends the forced disconnection determination process. On the other hand, when the communication disconnection has occurred (YES in step S691), the CPU 31 moves in step S692 the player character to a predetermined position in the game world. The process is the same as in step S678.

Next, in step S693, the CPU 31 sets the local communication flag 352 OFF. Further, in step S694, the CPU 31 sets the penetration in progress flag 353 OFF. In step S695, the CPU 31 then displays a predetermined message corresponding to the disconnection state. For example, in the case of the game apparatus that penetrates another game apparatus (in the case of the game apparatus A or the game apparatus C in the above example), a message indicating "communication is disconnected by the other game apparatus" or the like is displayed. In the case of the game apparatus which is penetrated by another game apparatus, message relating to disconnection will not be displayed even if communication is disconnected by the other game apparatus. This is because it is set such that the penetrated side does not notice that it is penetrated by someone else. Thereafter the forced disconnection determination process ends.

With reference back to FIG. 37, upon completion of the process in step S658, the multi play process ends.

With reference back to FIG. 33, subsequently to step S6 or S7, the CPU 31 performs in step S8 the slave unit-side connection process. The process is performed on the game apparatus on the slave unit side. In the above example, the process is performed on the game apparatus B or the game apparatus C. In the process, when the connection request beacons are detected, and when the game progress on the own game apparatus indicates that the game apparatus is connectable to another game apparatus, the CPU 31 requests a local connection with the other game apparatus thereby to perform a process of establishing the connection.

Figure 40:
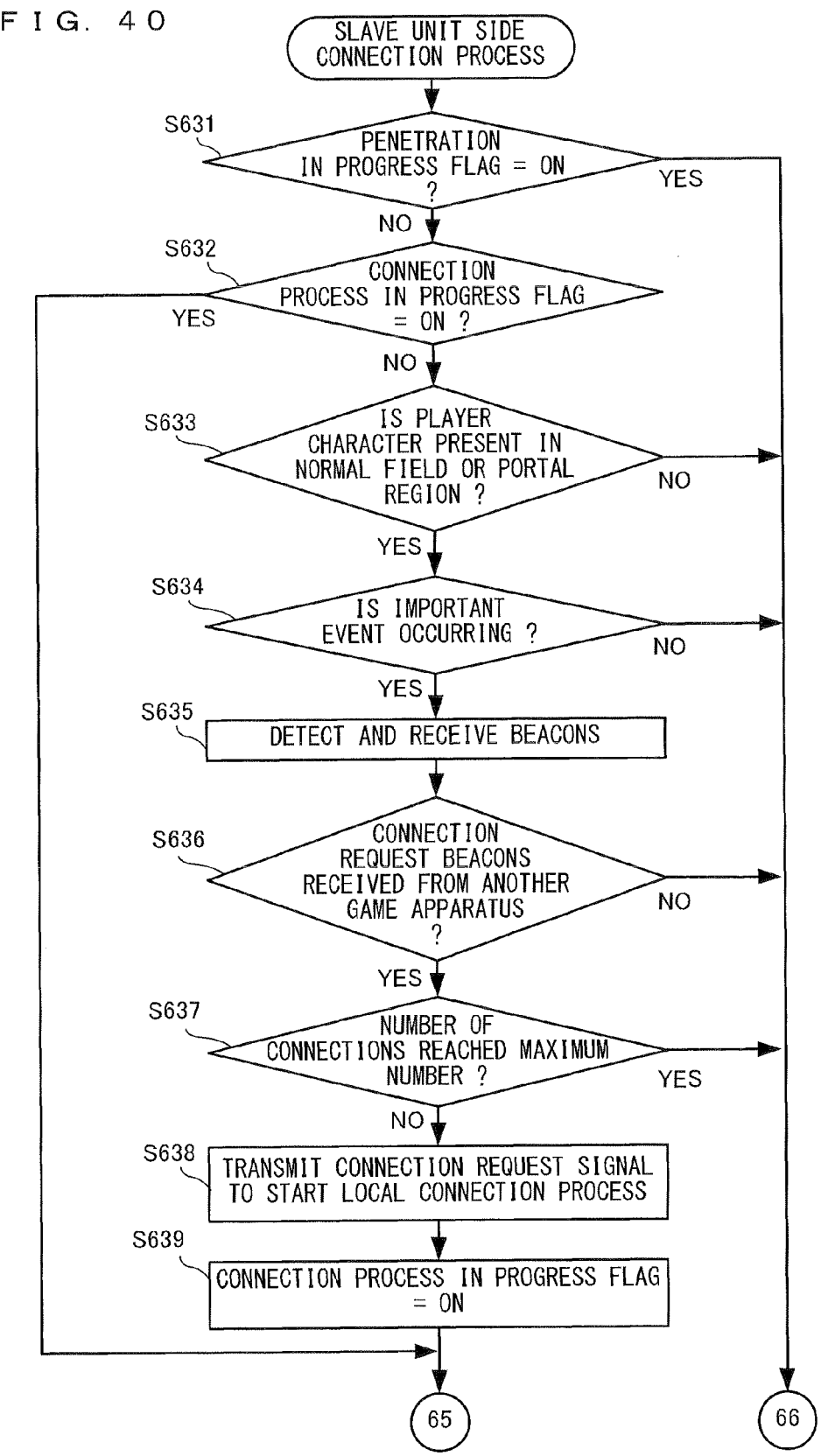
FIG. 40 is a flowchart showing in detail the first half of a slave unit-side connection process shown in step S8 in FIG. 33.
Figure 41:
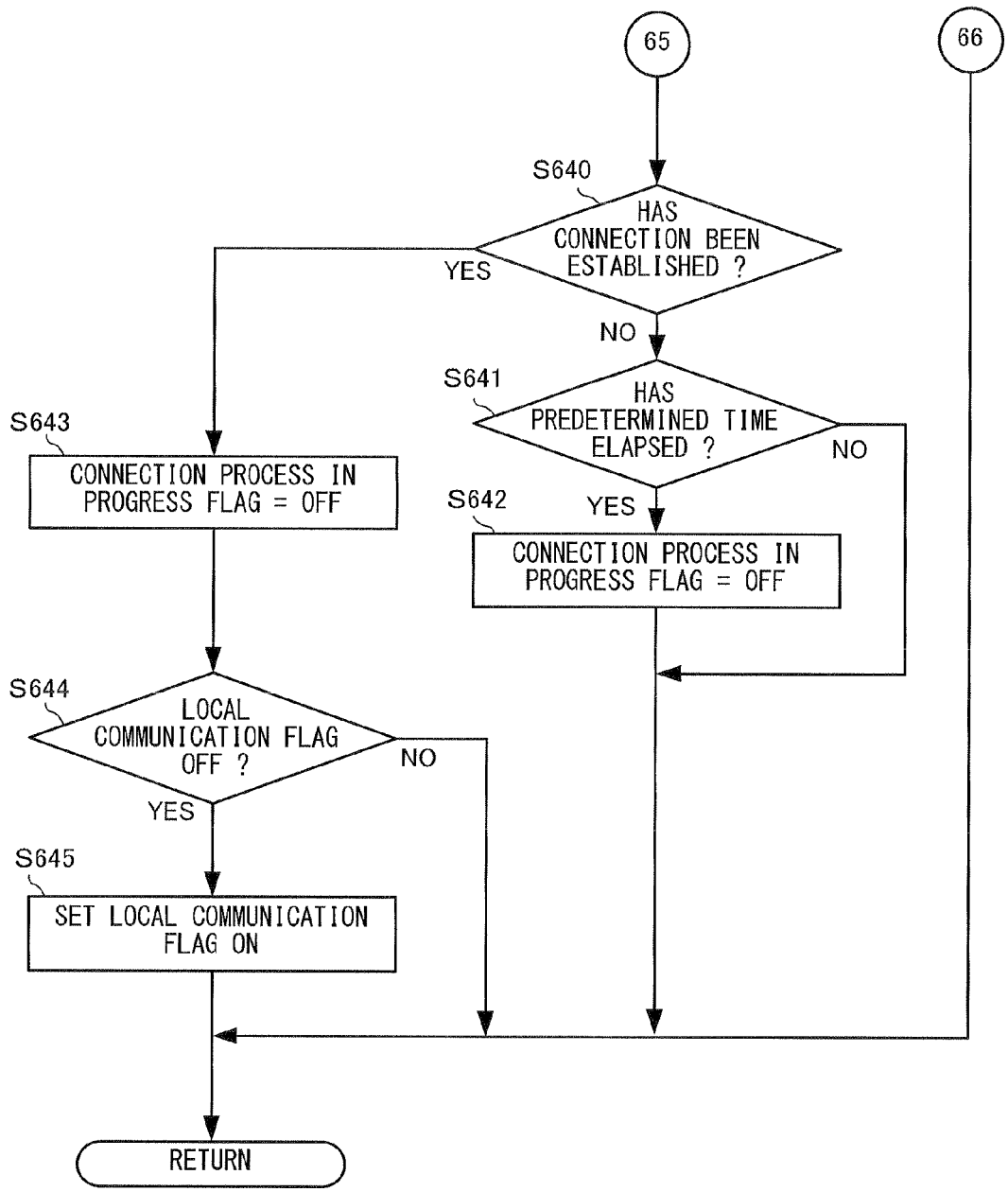
FIG. 41 is a flowchart showing in detail the second half of the slave unit-side connection process shown in step S8 in FIG. 33.

FIGS. 40 and 41 are flowcharts showing in detail the slave unit-side connection process in step S8. As shown in FIG. 40, to begin with, the CPU 31 determines in step S631 whether the penetration in progress flag 353 is ON. As a result, when the penetration in progress flag 353 is ON (YES in step S631), the CPU 31 ends the slave unit-side connection process. That is, when the player character of the game apparatus is penetrating a game world of another game apparatus (in a state of the master unit), the game apparatus will not accept penetration by a character operated by another player. That is, the game apparatus acting as the master unit will not accept such a connection that makes the apparatus act as the slave unit.

On the other hand, when the penetration in progress flag 353 is OFF (NO in step S631), the CPU 31 then determines whether the connection process in progress flag 354 is set ON. That is, the CPU 31 determines whether the process for establishing a connection is being performed. As a result, if the flag in ON (YES in step S632), the CPU 31 continues the process for establishing the connection, and then proceeds to the process in step S640 described below.

On the other hand, as a result of the determination in step S632, when the connection process in progress flag 354 is not ON (NO in step S632), the CPU 31 performs various determinations as to whether the game progress satisfies the condition for connection with another game apparatus. Specifically, to begin with, the CPU 31 determines in step S633 whether the position of the player character in the game world is in the normal field or in the portal region. That is, in the case of the game apparatus on the slave unit side, the game apparatus will not accept penetration by another game apparatus when, for example, the player character of the apparatus is in a "shop" or a "dungeon" in the game world. Further, in this step, the CPU 31 also determines whether the game apparatus 1 is in the opened state (not in the closed state), or whether such a game setting has been made that prohibits the game apparatus 1 from establishing a connection with other game apparatuses.

As a result of the determination in step S633, when the position of the player character is not in the normal field or in the portal region, that is, when the game apparatus is not connectable to another game apparatus (NO in step S633), the CPU 31 ends the slave unit-side connection process. On the other hand, when the position of the player character is in the normal field or in the portal region, that is, when the game apparatus is connectable to another game apparatus (YES in step S633), the CPU 31 then determines in step S634 whether any important event is currently occurring in the game. That is, the CPU 31 determines, even in the case where the player character of the game apparatus is in the normal field, for example, whether it is an undesired timing for the game apparatus and another game apparatus to perform a multi play in terms of the game progress. As a result of the determination, when the CPU 31 determines that an important event is occurring (YES in step S634), the CPU 31 ends the slave unit-side connection process. On the other hand, when the CPU 31 determines that any important event is not occurring (NO in step S634), the CPU 31 performs in step S635 detection and reception of beacons. In subsequent step S636, the CPU 31 determines whether the connection request beacons transmitted from another game apparatus have been received. Specifically, the CPU 31 determines whether the "game service ID" included in the received beacons is set to a value indicating "multi play data" and whether the "beacon type" is set to a value indicating "penetration to another game apparatus" (these values are set in step S604). As a result, if the connection request beacons is yet to be received (NO in step S636), the CPU 31 ends the slave unit-side connection process.

On the other hand, when the connection request beacons have been received (YES in step S636), the CPU 31 determines in step S637 whether the number of the connections based on which the beacons have been received reaches the maximum number of connections. Specifically, the CPU 31 determines whether the "number of current participants" included in the received beacons is smaller than the "maximum number of participants" also included in the received beacons. In this embodiment, since up to three apparatus can be connected to one another concurrently, when the "number of current participants" is equal to or more than the "maximum number of participants", it is determined that the number of connections reaches the maximum number of connections. As a result of the determination, when if the number is determined to have reached the maximum number of connections (YES in step S637), the CPU 31 does not respond to the connection request beacons, and ends the slave unit-side connection process.

On the other hand, when the number is determined is yet to reach the maximum number of connections (NO in step S637), the CPU 31 generates and transmits in step S638 connection request signals for establishing a local connection as a response to the connection request beacons. Then the CPU 31 starts the process for establishing a local communication with the game apparatus which is the transmission source of the connection request beacons.

Next, in step S639, the CPU 31 sets the connection process in progress flag 354 ON. In subsequent step S640 (FIG. 41), the CPU 31 determines whether the local connection has been established. As a result, when the local connection is yet to be established (connection in progress) (NO in step S640), the CPU 31 determines in step S641 whether a predetermined period of time has elapsed after start of the connection process. That is, the CPU 31 determines time out. As a result, if the predetermined period of time is yet to have elapsed (NO in step S641), the CPU 31 ends the slave unit-side connection process of the current frame. On the other hand, when the predetermined period of time has elapsed (YES in step S641), the CPU 31 ends in step S642 the connection process due to time out, and sets the connection process in progress flag 354 OFF. Then the CPU 31 ends the slave unit-side connection process.

On the other hand, as a result of the determination in step S640, if the connection has been established (YES in step S640), the CPU 31 sets in step S643 the connection process in progress flag 354 OFF.

Next, in step S644, the CPU 31 determines whether the local communication flag 352 is set OFF. As a result, if the flag is OFF (YES in step S644), the CPU 31 sets in step S645 the local communication flag 352 ON. On the other hand, when the flag is set ON (NO in step S644), the CPU 31 omits the process in step S645. Thereafter the slave unit-side connection process ends.

With reference back to FIG. 33, next the CPU 31 performs a display process in step S9. That is, the CPU 31 displays on the upper LCD 22 an image indicating a game world while reflecting thereon the results of the above processes, and generates an image to be displayed on the lower LCD 12 as appropriate thereby to display the generated image on the lower LCD 12. Subsequently to step S9, in step S10, the CPU 31 determines whether to end the game. If YES, the CPU 31 ends the game processing, whereas if NO, the CPU 31 repeats the game processing after return the processing to step S2.

Next, with reference to a flowchart in FIG. 44, the beacon cancellation process will be described in detail. The beacon cancellation process is performed to prevent duplicate processing of information in a series of beacons which are received from a single game apparatus and which notify generation of a single event.

Figure 44:
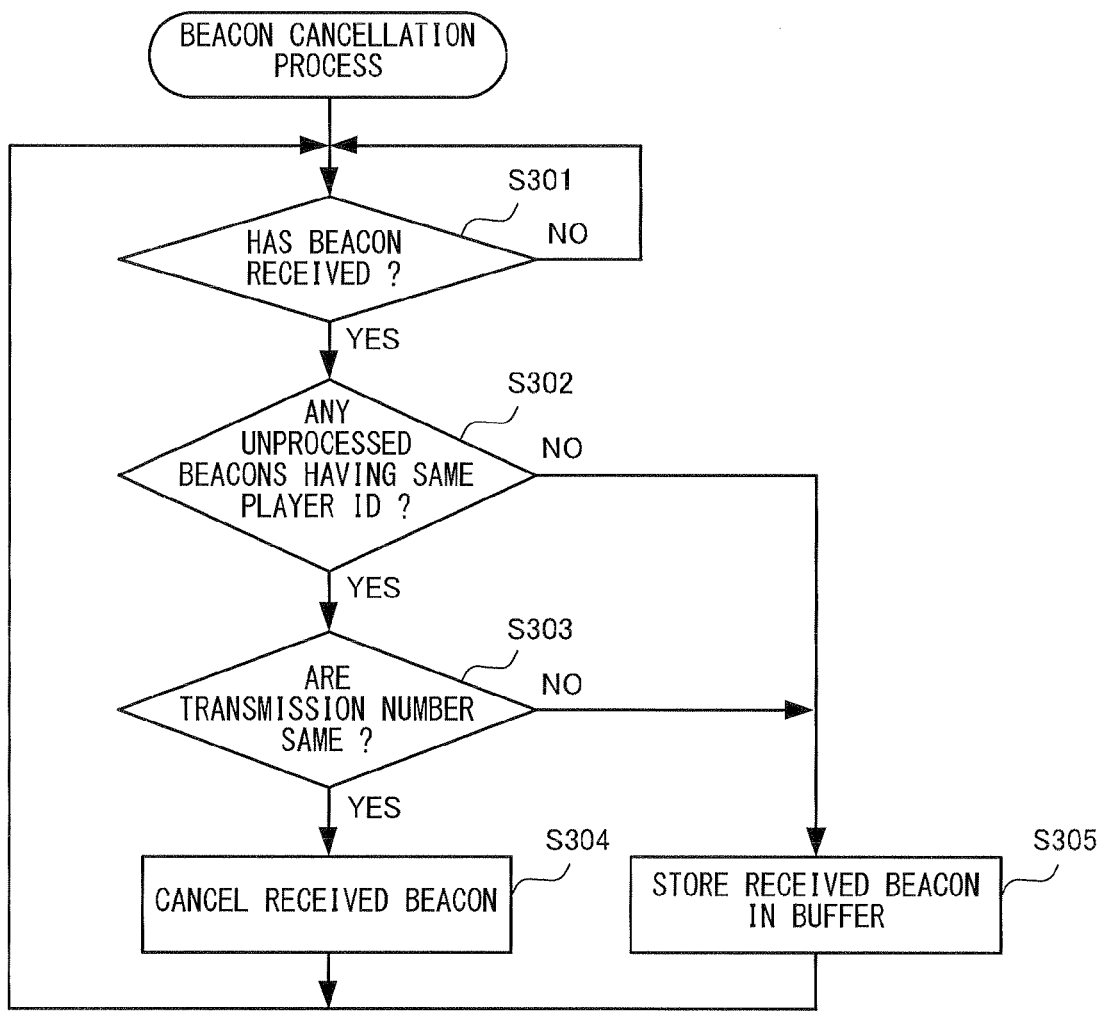
FIG. 44 is a flowchart showing a flow of a beacon cancellation process.

In step S301 in FIG. 44, the CPU 31 determines whether a new beacon has been received, and when such a beacon has been received, the CPU 31 advances the processing to step S302.

In step S302, the CPU 31 determines whether a buffer which temporarily retains unprocessed beacons (i.e., beacon received but yet to be processed (in a beacon-based passing log data updating process or the like)) includes any beacon that has the same player ID as the newly received beacon. If the buffer includes the beacon having the same player ID as the newly received beacon, the processing proceeds to step S303, whereas if not, the processing proceeds to step S305.

In step S303, the CPU 31 determines whether the newly received beacon has the same transmission number as the unprocessed beacons that also has the same player ID as the newly received beacon. If they have the same transmission number, the processing proceeds to step S304, whereas if not, the processing proceeds to step S305.

In step S304, the CPU 31 cancels the newly received beacon. The processing then returns to step S301.

In step S305, the CPU 31 stores the newly received beacon in the buffer. Specifically, if the buffer does not include any unprocessed beacons having the same player ID as the newly received beacon, the CPU adds the newly received beacon to the buffer. If the buffer includes any unprocessed beacon having the same player ID, the unprocessed beacon is overwritten with the newly received beacon. It should be noted that even after the unprocessed beacon has been processed, the player ID and the transmission number of the beacon will not be deleted. Accordingly, when a new beacon having the same player ID and the same transmission number as the processed beacons is received, the newly received beacon will be cancelled. Thus, it is possible to prevent duplicate processing of beacons which are received from a single game apparatus and which notify generation of a single event.

Next, with reference to a flowchart in FIG. 45, the research mission process will be described in detail. The research mission process is performed to realize the research mission function.

Figure 45:
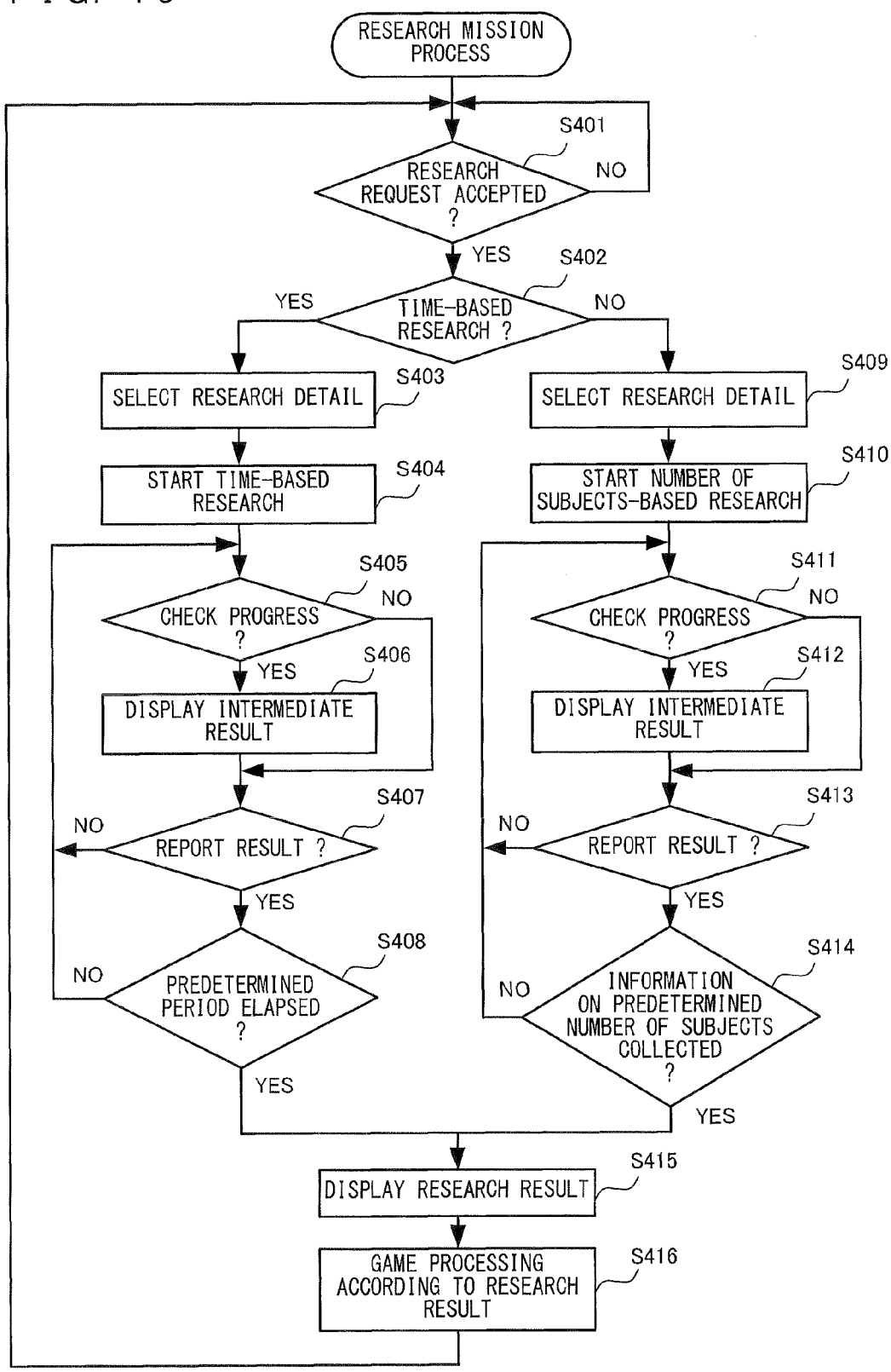
FIG. 45 is a flowchart showing a flow of a research mission process.

In step S401 in FIG. 45, the CPU 31 determines whether the player has accepted a research request (i.e., whether the player has touched the button image P20 in FIG. 20). If the player accepts the research request, the processing proceeds to step S402.

In step S402, the CPU 31 determines whether the player has selected the time-based research (i.e., whether the player has touched the button image P23 in FIG. 21). If the player selects the time-based research, the processing proceeds to step S403, whereas if not (i.e., when the player selects the number of subjects-based research), the processing proceeds to step S409.

In step S403, the CPU 31 selects the details of the research, based on the player's instruction (the touch operation of the button image P25 in FIG. 22), and stores the selected details of the research into the main memory 32 (or into the saved data memory 34 or the like).

In step S404, the CPU 31 starts the time-based research in relation to the details of the research selected in step S403. Specifically, the CPU 31 stores a flag indicating that the time-based research has started into the main memory 32 (or the saved data memory 34 or the like), and stores the current time obtained from the RTC 39 into the main memory 32 (or the saved data memory 34 or the like) as the start time of the time-based research.

In step S405, the CPU 31 determines whether an instruction for progress check has been inputted (i.e., whether the player has touched the button image P22 in FIG. 20). If the instruction for progress check is inputted, the processing proceeds to step S406, whereas if not, the processing proceeds to step S407.

In step S406, the CPU 31 displays, for example, on the upper LCD 22 an intermediate result of the research currently performed, based on the research result data stored in the main memory 32 (or in the saved data memory 34 or the like).

In step S407, the CPU 31 determines whether an instruction for result report has been inputted (i.e., whether the player has touched the button image P21 in FIG. 20). If the instruction for result report is inputted, the processing proceeds to step S408, whereas if not, the processing returns to step S405.

In step S408, the CPU 31 determines whether a predetermined period of time has elapsed from the start time of the time-based research. If the predetermined period of time has elapsed, the processing proceeds to step S415, whereas if not, the processing returns to step S405. The elapsed time from the start time of the time-based research can be calculated based on the current time obtained from the RTC 39 and on the start time of the time-based research stored in the main memory 32 (or the saved data memory 34 or the like).

In step S409, the CPU 31 selects the details of the research, based on the instruction by the player (touch operation of the button image P25 in FIG. 22), and stores the selected details of the research into the main memory 32 (or in the saved data memory 34 or the like).

In step S410, the CPU 31 starts the number of subjects-based research in relation to the details of the research selected in step S409. Specifically, the CPU 31 stores a flag indicating that the number of subjects-based research has started into the main memory 32 (or in the saved data memory 34 or the like).

In step S411, the CPU 31 determines whether the instruction for progress check has been inputted (i.e., whether the player has touched the button image P22 in FIG. 20). If the instruction for progress check is inputted, the processing proceeds to step S412, whereas if not, the processing proceeds to step S413.

In step S412, the CPU 31 displays, for example, on the upper LCD 22, the intermediate result of the research currently performed, based on the research result data stored in the main memory 32 (or in the saved data memory 34 or the like).

In step S413, the CPU 31 determines whether the instruction for the result report has been inputted (i.e., whether the player has touched the button image P21 in FIG. 20). If the instruction for the result report is inputted, the processing proceeds to step S414, whereas if not, the processing returns to step S411.

In step S414, the CPU 31 determines, based on the research result data stored in the main memory 32 (or in the saved data memory 34 or the like), whether information on a predetermined number of people (information included in beacons received from other game apparatuses, such as "profile information" and "questionnaire answers") has been collected after the number of subjects-based research has started. If information on a predetermined number of people is collected, the processing proceeds to step S415, whereas if not, the processing returns to step S411.

In step S415, the CPU 31 displays, for example on the upper LCD 22, the result of the time-based research or the number of subjects-based research, based on the research result data stored in the main memory 32 (or in the saved data memory 34 or the like).

In step S416, the CPU 31 performs game processing according to the research result. For example, the CPU 31 increases the rank of the player character as a researcher. As are result, game development will change. Or, the player character will obtain an item which allows the player to progress the game advantageously. Thereafter, the processing returns to step S401.

It should be noted that, in this embodiment, the processes shown in FIGS. 33 to 45 are performed by the CPU 31. However, in another embodiment, some or all of the processes may be performed by a processor different from the CPU 31, or by a dedicated circuit.

This is the end of the description of the game processing according to this embodiment.

In this manner, according to this embodiment, as in the case of the multi play mode, if a predetermined condition is satisfied during a game, a game apparatus automatically searches for another game apparatus. When another game apparatus has been found, the game apparatus performs a process for establishing a connection therewith without requesting the player of the other game apparatus to perform operation for establishing the connection. Accordingly, the player of the game apparatus can feel a sensation, as if s/he penetrates the game world on the other game apparatus without being noticed by the other player of the other game apparatus. That is, the player can obtain a novel way of entertaining.

In the process in the multi play mode, to establish a local communication connection, the connection request beacons are transmitted (for search) from the game apparatus on the penetrating side, and a connection request for the local communication is transmitted from the penetrated side to the penetrating side. Alternatively, the game apparatus on the penetrating side may receive beacons from another game apparatus (for search), thereby to transmit a connection request for local communication to any other game apparatus having been found.

Further, in the above-described embodiment, a case has been described where a series of processes for game processing is performed by a single apparatus (game apparatus 1). However, in another embodiment, the series of processes may be performed by an information processing system composed of a plurality of information processing apparatuses. For example, in an information processing system including terminal apparatuses and a server apparatus which is communicable with the terminal apparatuses through a network, some of the series of processes may be performed by the server apparatus. Further, it may be set such that, in an information processing system including terminal apparatuses and a server apparatus which is communicable with the terminal apparatuses through a network, main processes among the series of processes are performed by the server apparatus, and some of the other processes are performed by the terminal apparatuses. Further, in the information processing system, the system on the server side may be composed of a plurality of information processing apparatuses so that the processes to be performed by the server are shared and then performed by the plurality of information processing apparatuses.

Figure 33:
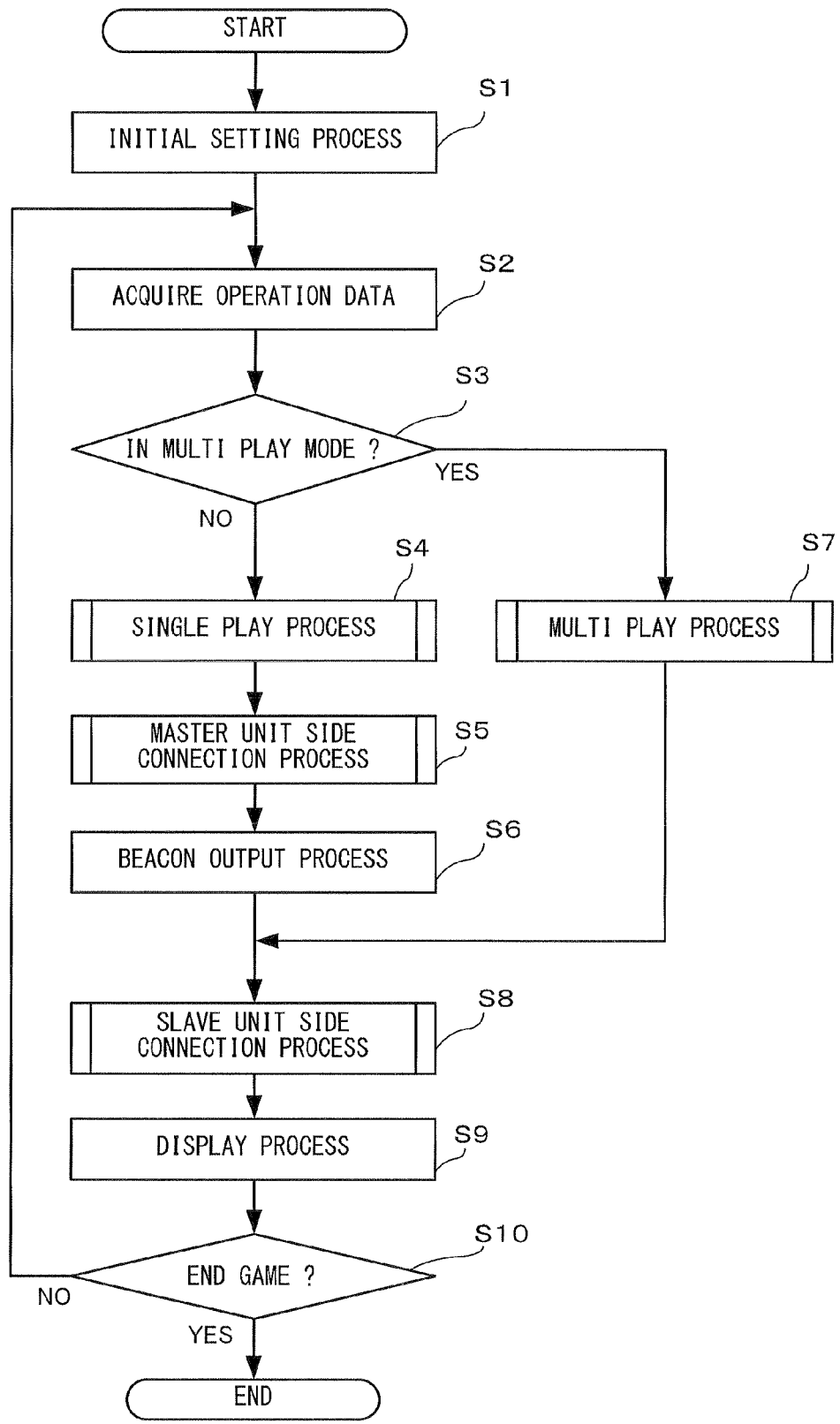
FIG. 33 is a flowchart showing a flow of game processing performed on the game apparatus 1.

In the above-described embodiment, the beacon output process is performed in step S6 in FIG. 33, and the beacon reception process is performed in step S213 in FIG. 34. However, when beacons are transmitted and received is not limited to these timings. Hereinafter, with reference to the flowchart in FIG. 46, a modification of the beacon transmission/reception process will be described.

Figure 46:
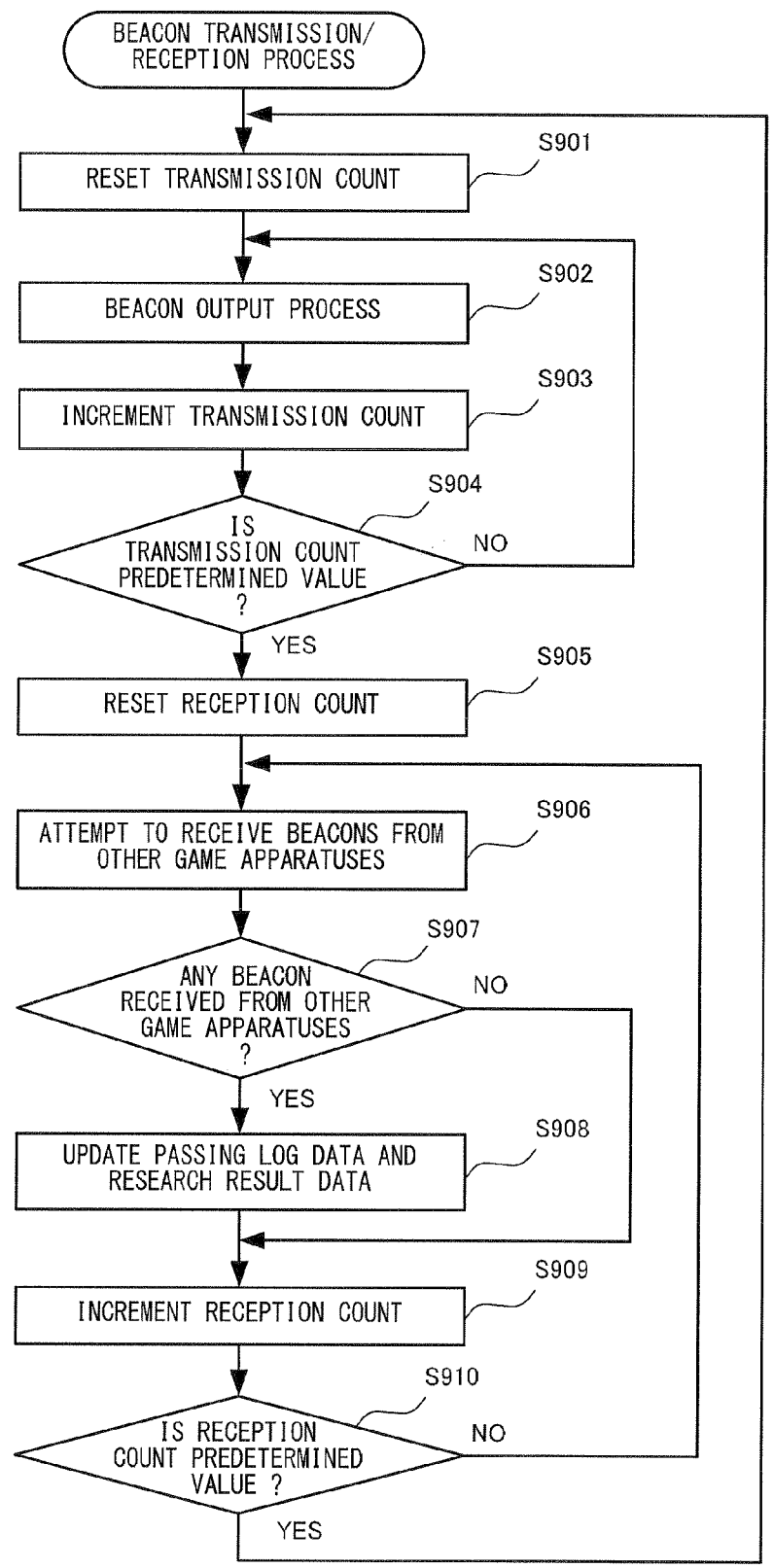
FIG. 46 is a flowchart showing a flow of a beacon transmission/reception process.

FIG. 46 shows an example of repeating alternately the process of transmitting beacons repeatedly a predetermined number of times and the process of receiving (attempting to receive) beacons repeatedly a predetermined number of times, based on a time-division system. In this modification, the processes in the flowchart in FIG. 46 are performed concurrently with the processes in the flowchart in FIG. 33. Thus, if the modification is employed, step S6 in FIG. 33, and steps S213 and S215 in FIG. 34 are not necessary.

In step S901 in FIG. 46, the CPU 31 resets a "transmission count", which is one of variables stored in the main memory 32, to 0.

In step S902, the CPU 31 starts the beacon output process. In this case, beacons generated in step S209, step S211, and the like in FIG. 34 are to be transmitted.

In step S903, the CPU 31 increments the transmission count.

In step S904, the CPU 31 determines whether the transmission count has reached a predetermined value (first predetermined value). If the transmission count has reached the predetermined value, the processing proceeds to step S905, whereas if not, the processing returns to step S902.

In step S905, the CPU 31 resets a "reception count", which is one of variables stored in the main memory 32, to 0.

In step S906, the CPU 31 attempts to receive beacons from other game apparatuses.

In step S907, the CPU 31 determines whether beacons have been received from other game apparatuses. If beacons have been received from any other game apparatus, the processing proceeds to step S908, whereas if not, the processing proceeds to step S909.

In step S908, the CPU 31 updates the passing log data and the research result data, based on the beacon data included in the received beacons.

In step S909, the CPU 31 increments the reception count.

In step S910, the CPU 31 determines whether the reception count has reached a predetermined value (second predetermined value). If the reception count has reached the predetermined value, the processing returns to step S901, whereas if not, the processing returns to step S906. It should be noted that the second predetermined value may be the same as the first predetermined value, or may be different from that.

In this modification, a case has been described where the beacon transmission/reception process is performed by the CPU 31. However, in another embodiment, the process may be performed by a processor different from the CPU 31, or by a dedicated circuit.

While example embodiments of the invention has been described in detail, the foregoing description is in all aspects illustrative and not restrictive. It will be understood that numerous other modifications and variations can be devised without departing from the scope of the invention.

What is claimed is:

1. A non-transitory computer-readable storage medium having stored therein a game program causing a computer of an information processing apparatus having a wireless communication function to provide functionality comprising:
   game application execution for executing a game application;
   transmission for automatically repeatedly transmitting, while the game application is being executed by the game application execution, game data indicating a game status, to other unspecified information processing apparatuses, by using the wireless communication function;
   reception attempting for automatically repeatedly attempting, while the game application is being executed by the game application execution, reception of game data from the other unspecified information processing apparatuses, by using the wireless communication function; and
   output for outputting, upon reception of the game data from the other information processing apparatuses by the reception attempting, the game data sequentially.

2. The non-transitory computer-readable storage medium according to claim 1, wherein
   the information processing program further causes the computer of the information processing apparatus to provide functionality comprising accumulation for accumulating game data from the other information processing apparatuses received by the reception attempting, and
   the output outputs the game data accumulated in the accumulation in chronological order of reception of the game data.

3. The non-transitory computer-readable storage medium according to claim 1, wherein
   the information processing program further causes the computer of the information processing apparatus to provide further functionality comprising: execution status determination for determining whether a game status by the game application execution satisfies one or more predetermined conditions, the transmission transmits, when the execution status determination determines that the predetermined conditions are satisfied, game data indicating the game status, and the output outputs the game data indicating the game status.

4. The non-transitory computer-readable storage medium according to claim 3, wherein the transmission transmits the game data indicating the game status a plurality of numbers of times when the execution status determination determines that the predetermined conditions are satisfied, and the reception attempting attempts the reception of game data a plurality of numbers of times, during a period when the transmission is not being performed.

5. The non-transitory computer-readable storage medium according to claim 4, wherein when transmitting the game data indicating the game status the plurality of number of times, the transmission transmits the data by adding thereto common identification information each time, of the plurality of numbers of times, the data is transmitted, the information processing program further causes the computer to provide functionality comprising:

determination for determining, when the reception attempting has received a plurality of pieces of game data from the other information processing apparatuses, whether identification information added to the plurality of pieces of game data is identical; and cancellation for cancelling the received plurality of pieces of game data depending on a result of the determination by the determination.

6. The non-transitory computer-readable storage medium according to claim 3, wherein the one or more predetermined conditions used by the execution status determination comprise a plurality of conditions having assigned thereto priorities different from one another, the transmission transmits a piece of the game data indicating the game status which satisfies one of the plurality of the conditions having a relatively high priority more preferentially than another piece of the game data which satisfies another one of the plurality of the conditions having a relatively low priority.

7. The non-transitory computer-readable storage medium according to claim 1, wherein the information processing program further causes the computer of the information processing apparatus to provide functionality comprising acceptance for accepting an input by a user, the transmission transmits game data relating to a change added to the application, based on the input accepted by the acceptance, and when the reception attempting has received the game data from the other information processing apparatuses, the game application execution adds to the application a change corresponding to the received game data.

8. The non-transitory computer-readable storage medium according to claim 1, wherein the information processing program further causes the computer of the information processing apparatus to provide functionality comprising:

collection for collecting the sum of the game data from the other information processing apparatuses received by the reception attempting until the sum of the game data satisfies a predetermined condition; and change adding for adding a change to the application executed by the game application execution when the sum collected by the collection satisfies the predetermined condition.

9. The non-transitory computer-readable storage medium according to claim 8, wherein the predetermined condition represents the number of the other information processing apparatuses from which the game data has been received, and the change adding adds the change to the application when the number of the other information processing apparatuses reaches a predetermined number.

10. The non-transitory computer-readable storage medium according to claim 8, wherein the predetermined condition represents time, and the change adding adds the change to the application when the time reaches a predetermined value.

11. The non-transitory computer-readable storage medium according to claim 8, wherein the information processing program further causes the computer of the information processing apparatus to provide functionality comprising condition selection for causing a user to select either a first condition indicating the number of the other information processing apparatuses from which the game data has been received or a second condition indicating a duration, and the collection collects the sum until the sum reaches the first condition or the second condition selected by the condition selection.

12. The non-transitory computer-readable storage medium according to claim 1, wherein the information processing apparatus is a hand-held terminal, and the wireless communication function is a short-distance wireless communication.

13. An information processing apparatus having a wireless communication function, the information processing apparatus comprising:

a game application execution unit for executing a game application;

a transmission unit for automatically repeatedly transmitting, while the game application is being executed by the game application execution unit, game data indicating a game status to other unspecified information processing apparatuses, by using the wireless communication function;

a reception attempting unit for automatically repeatedly attempting, while the game application is being executed by the game application execution unit, reception of game data from the other unspecified information processing apparatuses, by using the wireless communication function; and an output unit for outputting, upon reception of the game data from the other information processing apparatuses by the reception attempting unit, the game data sequentially.

14. An information processing system having a wireless communication function, the information processing system comprising:

a game application executor for executing a game application;

a transmitter for automatically repeatedly transmitting, while the game application is being executed by the game application executor, game data indicating a game status to other unspecified information processing apparatuses, by using the wireless communication function;

a reception attempter for automatically repeatedly attempting, while the game application is being executed by the game application executor, reception of game data from the other unspecified information processing apparatuses, by using the wireless communication function; and an output for outputting, upon reception of the game data from the other information processing apparatuses by the reception attempter, the game data sequentially.

15. An information processing method using a wireless communication function, the method comprising:

executing a game application;

automatically repeatedly transmitting, while the game application is being executed, game data indicating a game status to other unspecified information processing apparatuses, by using the wireless communication function;

automatically repeatedly attempting, while the game application is being executed, reception of game data from the other unspecified information processing apparatuses, by using the wireless communication function; and outputting, upon reception of the game data from the other information processing apparatuses in attempting the reception, the game data sequentially.

16. A non-transitory computer-readable storage medium having stored therein a game program causing a computer of an information processing apparatus having a wireless communication function to provide functionality comprising:

game application execution for executing a game application;

transmission for automatically transmitting, while the game application is being executed by the game application execution, game data indicating a game status, to other unspecified information processing apparatuses, by using the wireless communication function;

reception attempting for automatically attempting, while the game application is being executed by the game application execution, reception of game data from the other unspecified information processing apparatuses, by using the wireless communication function; and output for outputting, upon reception of the game data from the other information processing apparatuses by the reception attempting, the game data sequentially.

17. An information processing apparatus having a wireless communication function, the information processing apparatus comprising:

a game application execution unit for executing a game application;

a transmission unit for automatically transmitting, while the game application is being executed by the game application execution unit, game data indicating a game status to other unspecified information processing apparatuses, by using the wireless communication function;

a reception attempting unit for automatically attempting, while the game application is being executed by the game application execution unit, reception of game data from the other unspecified information processing apparatuses, by using the wireless communication function; and an output unit for outputting, upon reception of the game data from the other information processing apparatuses by the reception attempting unit, the aame data seqeauentially.

* * * * *